United States Patent
Hu et al.

(10) Patent No.: US 12,505,808 B2
(45) Date of Patent: Dec. 23, 2025

(54) DISPLAY PANEL HAVING DRIVER CIRCUIT WITH A PLURALITY OF SHIFT REGISTERS AND DISPLAY DEVICE

(71) Applicant: Xiamen Tianma Display Technology Co., Ltd., Xiamen (CN)

(72) Inventors: Cheng Hu, Xiamen (CN); Qingjun Lai, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/795,787

(22) Filed: Aug. 6, 2024

(65) Prior Publication Data
US 2024/0395218 A1    Nov. 28, 2024

(30) Foreign Application Priority Data
Aug. 7, 2023    (CN) .......................... 202310985563.X

(51) Int. Cl.
*G09G 3/3266* (2016.01)
*G09G 3/32* (2016.01)
*G11C 19/28* (2006.01)

(52) U.S. Cl.
CPC ............ *G09G 3/3266* (2013.01); *G09G 3/32* (2013.01); *G09G 2300/0408* (2013.01); *G09G 2310/0267* (2013.01); *G09G 2310/0286* (2013.01); *G09G 2310/08* (2013.01); *G11C 19/28* (2013.01)

(58) Field of Classification Search
CPC ................................................... G09G 3/3266
USPC .......................................................... 345/204
See application file for complete search history.

(56) References Cited

U.S. PATENT DOCUMENTS

| | | | | |
|---|---|---|---|---|
| 2019/0130847 A1* | 5/2019 | Um | ...................... | G09G 3/3266 |
| 2022/0254291 A1* | 8/2022 | Lai | ......................... | G11C 19/28 |
| 2022/0328591 A1* | 10/2022 | Sun | ...................... | H10K 50/865 |
| 2023/0215381 A1* | 7/2023 | Ahn | ..................... | G09G 3/3266 |
| | | | | 345/204 |
| 2024/0265873 A1* | 8/2024 | Chen | .................... | H10D 86/425 |

FOREIGN PATENT DOCUMENTS

| | | |
|---|---|---|
| CN | 112509513 A | 3/2021 |
| CN | 116386530 A | 7/2023 |

* cited by examiner

*Primary Examiner* — Long D Pham
(74) *Attorney, Agent, or Firm* — KDW Firm PLLC

(57) ABSTRACT

Provided are a display panel and a display device which belong to the field of display technology. The display panel includes a driver circuit including a shift register, where the shift register includes an input circuit connected to at least an input signal terminal, a first clock signal line, and a first node; a control circuit connected to at least a first voltage signal line, a second voltage signal line, the first node, a second node, and a third node, where the first node and the third node are directly connected or connected through a first adjustment circuit; and an output circuit including a first output circuit and a second output circuit, where the first output circuit is connected to at least the first voltage signal line, the third node, and an output signal terminal.

18 Claims, 34 Drawing Sheets

DISPLAY PANEL HAVING DRIVER CIRCUIT WITH A PLURALITY OF SHIFT REGISTERS AND DISPLAY DEVICE

CROSS-REFERENCE TO RELATED APPLICATION(S)

This application claims priority to Chinese Patent Application No. 202310985563.X filed Aug. 7, 2023, the disclosure of which is incorporated herein by reference in its entirety.

TECHNICAL FIELD

The present disclosure relates to the field of display technology and, in particular, to a display panel and a display device.

BACKGROUND

With the continuous progress of science and technology, more and more electronic devices with a display function are widely applied to and bring great convenience for people's daily life and work. Such devices have become indispensable and important tools for people. A display panel is a main component of an electronic device for implementing the display function.

Currently, the display panel on the market generally includes a display region and a bezel region, where multiple pixel units are generally arranged in the display region, and each pixel unit includes a pixel circuit. The bezel region includes a peripheral driver circuit, such as a gate driving circuit, for providing control signals for the pixel units in the display region. Pixel circuits are electrically connected to the peripheral driver circuit in the bezel region separately, and the peripheral driver circuit provides control signals for the pixel circuits to control the pixel circuits to provide drive currents for light-emitting elements so that the pixel units in the display region emit light in order. The output of the gate driving circuit directly affects the display effect of the pixel units.

Therefore, the design of the peripheral driver circuit in the bezel region has always been a major research hotspot in the display field.

SUMMARY

In view of this, the present disclosure provides a display panel and a display device, where a peripheral driver circuit is disposed in a bezel region to effectively output control signals and better drive and control pixel units in a display region.

The present disclosure discloses a display panel including a driver circuit including, and the driver circuit includes a shift register, where the shift register includes an input circuit connected to at least an input signal terminal, a first clock signal line, and a first node; a control circuit connected to at least a first voltage signal line, a second voltage signal line, the first node, a second node, and a third node; and an output circuit including a first output circuit and a second output circuit. The first node and the third node are directly connected or connected through a first adjustment circuit, the first output circuit is connected to at least the first voltage signal line, the third node, and an output signal terminal, and the second output circuit is connected to at least the second voltage signal line, the second node, and the output signal terminal.

Based on the same inventive concept, the present disclosure further discloses a display device including the preceding display panel.

Other features and advantages of the present disclosure will become apparent from the following detailed description of example embodiments of the present disclosure with reference to the drawings.

BRIEF DESCRIPTION OF DRAWINGS

The drawings, which are incorporated in the specification and form part of the specification, illustrate embodiments of the present disclosure and are intended to explain the principles of the present disclosure together with the description of the drawings.

FIG. 32 is a schematic diagram of an electrical connection structure of a pixel unit in

FIG. 31;

DETAILED DESCRIPTION

Figure 1:
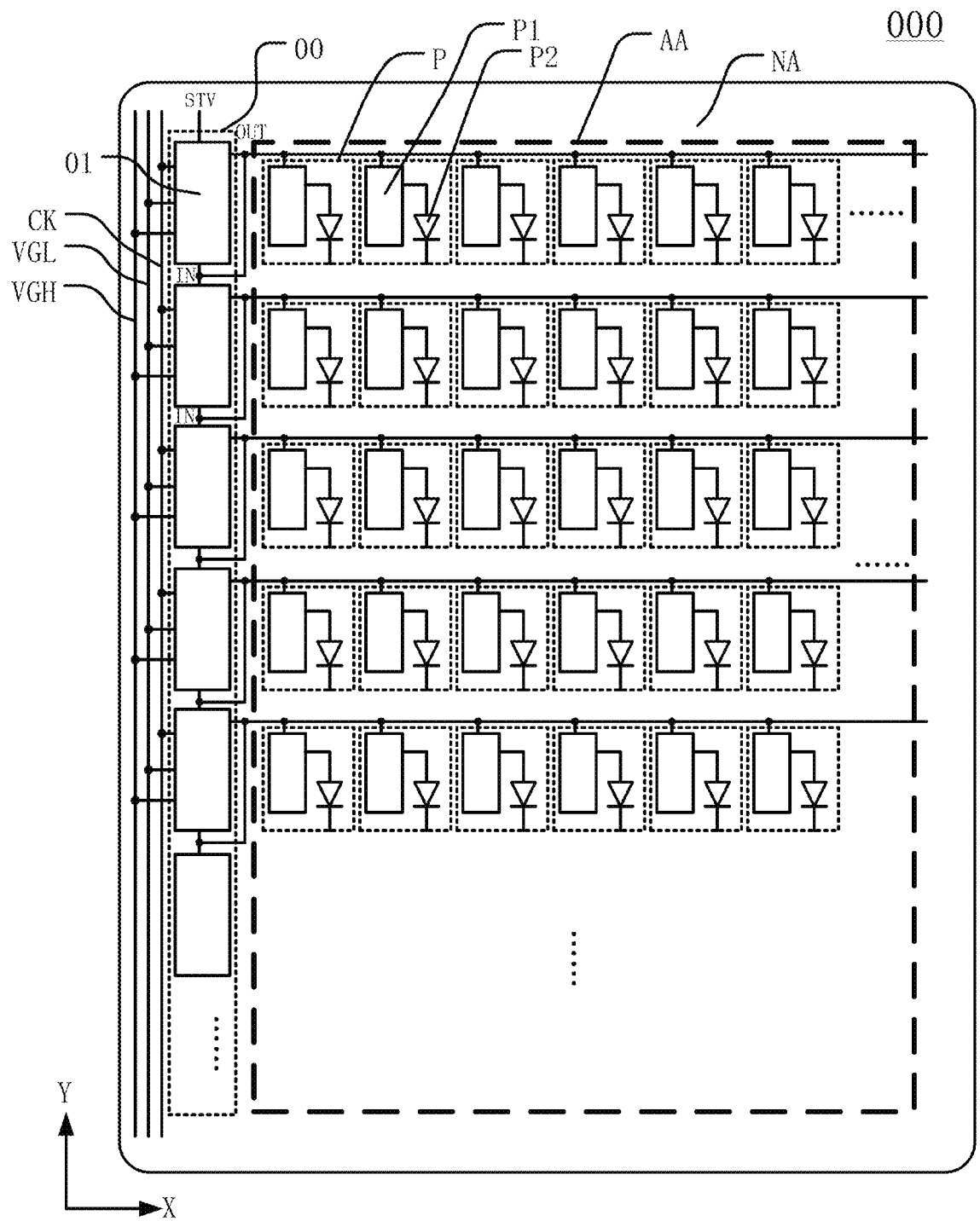
FIG. 1 is a plan view of a display panel according to an embodiment of the present disclosure.

Example embodiments of the present disclosure are described in detail with reference to the drawings. It is to be noted that relative arrangements of components and steps, numerical expressions, and numerical values set forth in these embodiments do not limit the scope of the present disclosure unless otherwise specifically indicated.

The following description of at least one example embodiment is illustrative in nature and is definitely not intended to limit the present disclosure or an application or use thereof.

Techniques, methods, and devices known to those of ordinary skill in the art may not be discussed in detail, but where appropriate, such techniques, methods, and devices should be considered as part of the specification.

In all examples shown and discussed herein, any specific values are to be construed as exemplary and non-limiting. Therefore, other examples of the example embodiments may have different values.

It is apparent to those skilled in the art that various modifications and variations can be made to the present disclosure without departing from the spirit or scope of the present disclosure. Therefore, the present disclosure is intended to cover modifications and variations of the present disclosure that fall within the scope of the corresponding claims (the claimed technical solutions) and equivalents thereof. It is to be noted that if not in collision, embodiments of the present disclosure may be combined with each other.

It is to be noted that similar reference numerals and letters represent similar items in the following drawings. Therefore, once a particular item is defined in one drawing, the particular item does not need to be further discussed in subsequent drawings.

Figure 2:
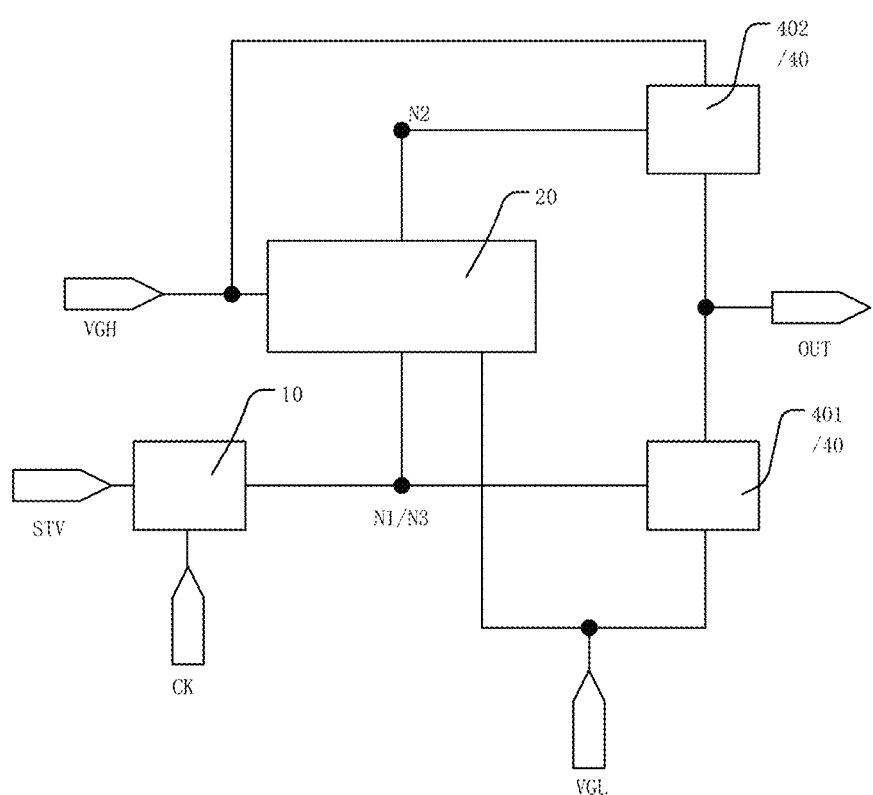
FIG. 2 is a schematic diagram of a module connection of a shift register in FIG. 1.
Figure 3:
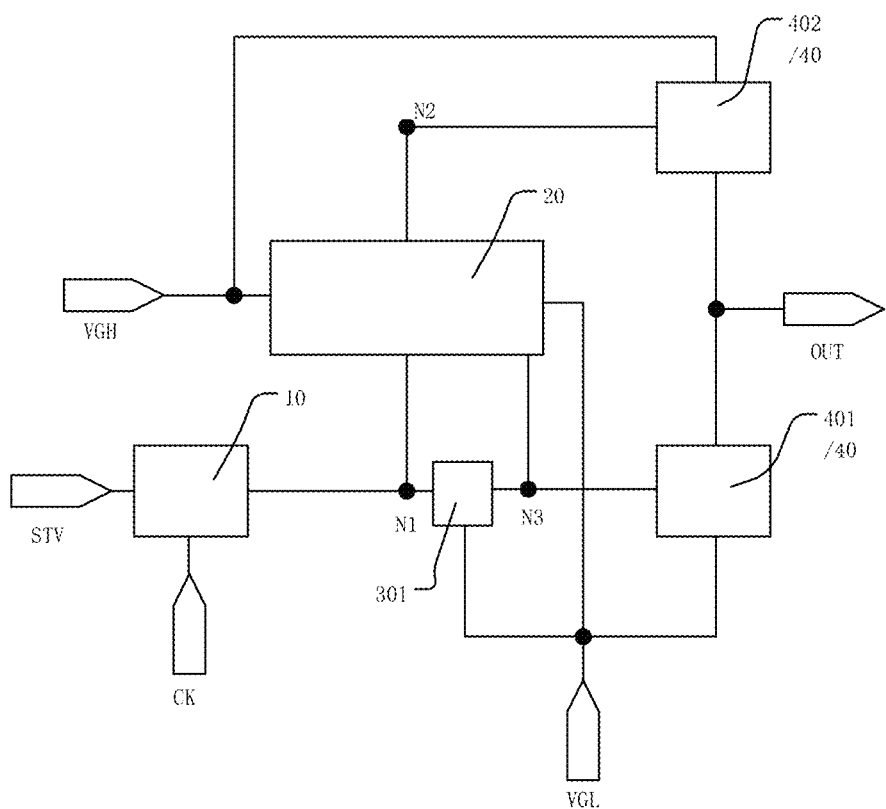
FIG. 3 is a schematic diagram of another module connection of a shift register in FIG. 1.

Reference is made to FIGS. 1, 2, and 3. FIG. 1 is a plan view of a display panel according to an embodiment of the present disclosure. FIG. 2 is a schematic diagram of a circuit connection of a shift register in FIG. 1. FIG. 3 is a schematic diagram of another circuit connection of a shift register in FIG. 1. A display panel 000 provided in this embodiment includes a driver circuit 00.

The driver circuit 00 includes a shift register 01, where the shift register 01 includes an input circuit 10, a control circuit 20, and an output circuit 40.

The input circuit 10 is connected to at least an input signal terminal STV, a first clock signal line CK, and a first node N1.

The control circuit 20 is connected to at least a first voltage signal line VGL, a second voltage signal line VGH, the first node N1, a second node N2, and a third node N3, where the first node N1 and the third node N3 are directly connected or connected through a first adjustment circuit 301.

The output circuit 40 includes a first output circuit 401 and a second output circuit 402, where the first output circuit 401 is connected to at least the first voltage signal line VGL, the third node N3, and an output signal terminal OUT, and the second output circuit 402 is connected to at least the second voltage signal line VGH, the second node N2, and the output signal terminal OUT.

Specifically, the display panel 000 provided in this embodiment may include a display region AA and a non-display region NA (that is, a bezel region), the non-display region NA of the display panel 000 includes the driver circuit 00, the driver circuit 00 may be a gate driving circuit. The display region AA may be provided with multiple pixel units P, each pixel unit P may include a pixel circuit P1 and a light-emitting element P2 electrically connected, and the driver circuit 00 is electrically connected to the pixel circuit P1 of each pixel unit P separately. The driver circuit 00 provides a control signal (for example, the control signal may be a scan control signal or a light emission control signal) for the pixel circuit P1 to control the pixel circuit P1 to provide a drive current for the light-emitting element P2 so that the pixel units P in the display region AA emit light in order, so as to implement a display function of the display panel 000. It is to be understood that the light-emitting element P2 in this embodiment may be an organic light-emitting diode (OLED), a submillimeter light-emitting diode (mini-LED), or a micro light-emitting diode (micro-LED), which may be selected according to an actual situation in a specific implementation. The light-emitting element P2 is not limited in this embodiment. The pixel circuit P1 is illustrated by a block diagram in the drawings of this embodiment. In a specific implementation, an electrical connection structure of the pixel circuit P1 may be understood with reference to structures in the related art. The details are not repeated here.

The driver circuit 00 in this embodiment includes the shift register 01. Optionally, the driver circuit 00 may include multiple cascaded shift registers 01, a first-stage shift register 01 is connected to the input signal terminal STV, an input signal terminal of a second-stage shift register 01 or a subsequent shift register 01 may be understood as an input signal terminal IN, and the input signal terminal IN of the second-stage shift register 01 or the subsequent shift register 01 is connected to an output signal terminal OUT of an upper-stage shift register to implement a shift control function of the driver circuit 00.

It is to be understood that in this embodiment, the driver circuit 00 is disposed on a side of the display region AA in FIG. 1 (for example, the driver circuit 00 is disposed on a left side of the display region AA in FIG. 1) and provides control signals for the pixel units P in the display region AA through the multiple cascaded shift registers 01. Among the multiple cascaded shift registers 01 included in the driver circuit 00, the first-stage shift register may be electrically connected to pixel circuits P1 of pixel units P in the first row, the second-stage shift register may be electrically connected to pixel circuits P1 of pixel units P in the second row, and in the same manner, a last-stage shift register may be electrically connected to pixel circuits P1 of pixel units P in the last row. In some other optional embodiments, the driver circuit 00 may be disposed on different sides of the display region AA (which is not illustrated in the drawings), that is, the driver circuit 00 is disposed on both two sides of the display region AA to achieve a bilateral driving effect for the pixel units P in the display region AA. When the driver circuit 00 is disposed on the two sides of the display region AA, first-stage shift registers on the two sides of the display region AA may both be electrically connected to the pixel circuits P1 of the pixel units P in the first row, second-stage shift registers on the two sides of the display region AA may both be electrically connected to the pixel circuits P1 of the pixel units P in the second row, and in the same manner, last-stage shift registers on the two sides of the display region AA may both be electrically connected to the pixel circuits P1 of the pixel units P in the last row. Alternatively, when the driver circuit 00 is disposed on the two sides of the display region AA, it may be set that the first-stage shift register on one side of the display region AA is electrically connected to the pixel circuits P1 of the pixel units P in the first row, the first-stage shift register on the other side of the display region AA is electrically connected to the pixel circuits P1 of the pixel units P in the second row, the second-stage shift register on one side of the display region AA is electrically connected to pixel circuits P1 of pixel units P in the third row, the second-stage shift register on the other side of the display region AA is electrically connected to pixel circuits P1 of pixel units P in the fourth row, and in the same manner, the driver circuit on different sides of the display region AA drives the pixel units P in the display region AA in a left and right alternate manner. In this embodiment, the details are not repeated here and may be specifically understood with reference to an arrangement of the gate driving circuit in the related art.

When the driver circuit 00 in this embodiment is configured to include the multiple cascaded shift registers 01, the shift register 01 includes at least the input circuit 10, the control circuit 20, and the output circuit 40, where the circuit connection structure may be described as follows: the input circuit 10 is connected to at least the input signal terminal STV, the first clock signal line CK, and the first node N1. Optionally, the input circuit 10 receives at least an input signal provided by the input signal terminal STV and a first clock signal provided by the first clock signal line CK and controls a signal of the first node N1. A control terminal of the input circuit 10 is connected to the first clock signal line CK, and a first terminal and a second terminal of the input circuit 10 are connected to the input signal terminal STV and the first node N1, respectively. The input circuit 10 may be turned on or off under the control of the first clock signal provided by the first clock signal line CK to transmit the input signal provided by the input signal terminal STV at the first terminal of the input circuit 10 to the second terminal of the input circuit 10 and control a potential signal of the first node N1 under the control of the first clock signal provided by the first clock signal line CK. It is to be understood that the input circuit 10 in the first-stage shift register 01 is connected to at least the input signal terminal STV, the input circuit 10 in another stage of shift register 01 is connected to at least the input signal terminal IN, and the input signal terminal IN of another stage of shift register 01 is connected to the output signal terminal OUT of the upper-stage shift register to implement the shift control function of the driver circuit 00.

The control circuit 20 is connected to at least the first voltage signal line VGL, the second voltage signal line VGH, the first node N1, the second node N2, and the third node N3. Optionally, the control circuit 20 receives at least a first voltage signal provided by the first voltage signal line VGL, a second voltage signal provided by the second voltage signal line VGH, the signal of the first node N1, and a signal of the third node N3 and controls a signal of the second node N2. As shown in FIG. 2, the first node N1 and the third node N3 may be directly connected, a control terminal of the control circuit 20 may be connected to the first node N1 (that is, the third node N3), two first terminals of the control circuit 20 may be connected to the first voltage signal line VGL and the second voltage signal line VGH separately, and a second terminal of the control circuit 20 may be connected to the second node N2. The control circuit 20 may be turned on or off under the control of the signal of the first node N1 (that is, the third node N3) so that the control circuit 20 being on transmits the first voltage signal provided by the first voltage signal line VGL and the second voltage signal provided by the second voltage signal line VGH connected to the first terminals of the control circuit 20 to the second terminal of the control circuit 20 at different occasions to control a potential signal of the second node N2.

Alternatively, as shown in FIG. 3, the first node N1 and the third node N3 may be connected through the first adjustment circuit 301, where the first adjustment circuit 301 may be an always conducted circuit, that is, two terminals of the first adjustment circuit 301 remain conducted, and two control terminals of the control circuit 20 may be connected to the first node N1 and the third node N3 separately. The two first terminals of the control circuit 20 may be connected to the first voltage signal line VGL and the second voltage signal line VGH separately, and the second terminal of the control circuit 20 may be connected to the second node N2. The control circuit 20 may be turned on or off under the control of the signal of the first node N1 so that the control circuit 20 being on transmits the second voltage signal provided by the second voltage signal line VGH connected to the first terminal of the control circuit 20 to the second terminal of the control circuit 20 to control the potential signal of the second node N2; and the control circuit 20 may also be turned on or off under the control of the signal of the third node N3 so that the control circuit 20 being on transmits the first voltage signal provided by the first voltage signal line VGL connected to the other first terminal of the control circuit 20 to the second terminal of the control circuit 20 to control the potential signal of the second node N2. The potential signal of the second node N2 may be the first voltage signal or the second voltage signal.

The output circuit 40 includes the first output circuit 401 and the second output circuit 402. The first output circuit 401 is connected to at least the first voltage signal line VGL, the third node N3, and the output signal terminal OUT. Optionally, the first output circuit 401 receives at least the first voltage signal provided by the first voltage signal line VGL and the signal of the third node N3 and controls an output signal of the output signal terminal OUT. The first output circuit 401 may be turned on or off under the control of the signal of the third node N3 to control, through the first voltage signal provided by the first voltage signal line VGL, a potential signal of the output signal terminal OUT to be the first voltage signal. The second output circuit 402 is connected to at least the second voltage signal line VGH, the second node N2, and the output signal terminal OUT. Optionally, the second output circuit 402 receives at least the second voltage signal provided by the second voltage signal line VGH and the signal of the second node N2 and controls the output signal of the output signal terminal OUT. The second output circuit 402 may be turned on or off under the control of the signal of the second node N2 to control, through the second voltage signal provided by the second voltage signal line VGH, the potential signal of the output signal terminal OUT to be the second voltage signal.

In this embodiment, the first voltage signal provided by the first voltage signal line VGL and the second voltage signal provided by the second voltage signal line VGH may be different logic levels of potential signals. Optionally, the first voltage signal provided by the first voltage signal line VGL may be a logic low-level signal, and the second voltage signal provided by the second voltage signal line VGH may be a logic high-level signal. The first output circuit 401 may be turned on or off under the control of the signal of the third node N3 so that the first output circuit 401 being on controls, through the first voltage signal provided by the first voltage signal line VGL, the potential signal of the output signal terminal OUT to be the logic low-level first voltage signal. The second output circuit 402 may be turned on or off under the control of the signal of the second node N2 so that the second output circuit 402 being on controls, through the second voltage signal provided by the second voltage signal line VGH, the potential signal of the output signal terminal OUT to be the logic high-level second voltage signal.

In this embodiment, the input circuit 10 transmits an initial shift signal, that is, the input signal, to each stage of shift register 01. Then, the first output circuit 401 and the second output circuit 402 are turned on at different occasions under the control of the control circuit 20 so that the output signal of the output signal terminal OUT in each stage of shift register 01 of the driver circuit 00 includes the logic low-level signal and the logic high-level signal separately, and the output signal of the output signal terminal OUT is transmitted as the control signal to the pixel circuit P1 of the pixel unit P in the display region AA, thereby driving and controlling the pixel circuit P1. In this manner, a light emission display effect of the pixel units P in the display panel 000 can be ensured.

Optionally, as shown in FIG. 3, in this embodiment, a control terminal of the first adjustment circuit 301 may be connected to the first voltage signal line VGL, and a first terminal and a second terminal of the first adjustment circuit 301 are connected to the first node N1 and the third node N3, respectively. The first voltage signal provided by the first voltage signal line VGL may control the first terminal and the second terminal of the first adjustment circuit 301 to remain conducted. The first node N1 and the third node N3 are connected through the first adjustment circuit 301 so that when the signal of the third node N3 controls the first output circuit 401 to be turned on, a potential of the third node N3 is not affected by a potential of the first node N1, so as to ensure as much as possible that the first output circuit 401 is completely on under the control of the signal of the third node N3. In this manner, a conduction effect of the first output circuit 401 can be stabilized, ensuring that the first output circuit 401 transmits the output signal to the output signal terminal OUT.

It is to be understood that circuit structures of the shift register 01 in the driver circuit 00 are illustrated only through a block diagram among the drawings of this embodiment. In a specific implementation, it may be set according to actual requirements that circuits of the shift register 01 may include electrical connection structures such as transistors and capacitors, which are not limited in this embodiment and may specifically be understood with reference to the description of subsequent embodiments.

It is to be noted that the structure of the display panel 000 is merely illustrated in the drawings of this embodiment. In a specific implementation, the structure of the display panel 000 includes, but is not limited to, the structure illustrated here and may also include other structures capable of implementing the display function, which may be understood with reference to the structure of an organic light-emitting diode display panel in the related art. The details are not repeated here in this embodiment.

Figure 4:
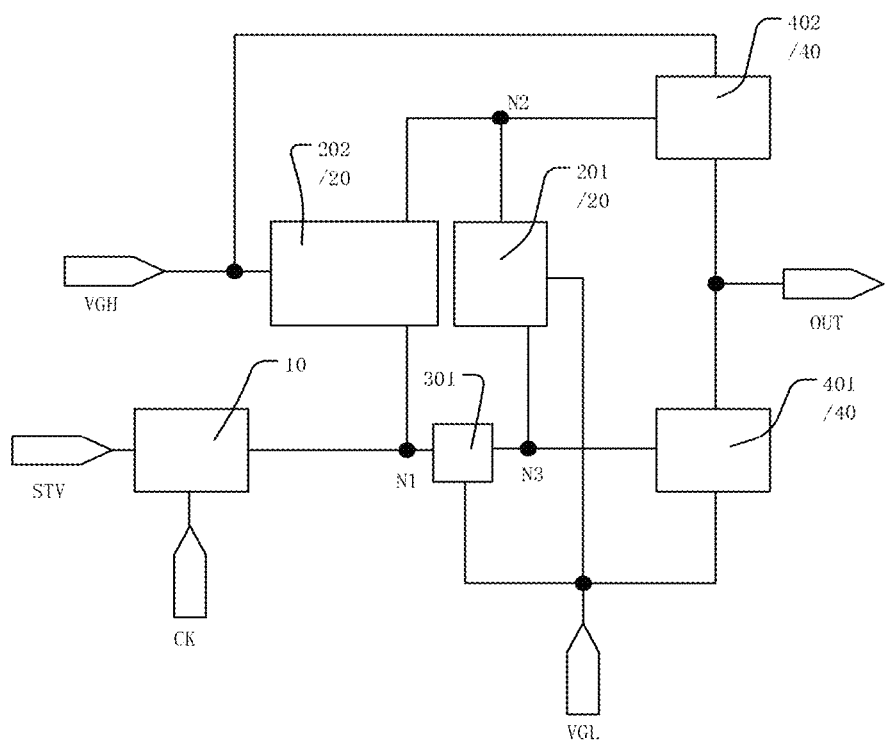
FIG. 4 is a schematic diagram of another module connection of a shift register in FIG. 1.

In some optional embodiments, reference is made to FIGS. 1 to 3 and 4. FIG. 4 is a schematic diagram of another circuit connection of a shift register in FIG. 1. In this embodiment, the driver circuit 00 of the display panel 000 includes the multiple cascaded shift registers 01, and the control circuit 20 in each shift register 01 includes a first control circuit 201 and a second control circuit 202.

The first control circuit 201 is connected to at least the first voltage signal line VGL, the second node N2, and the third node N3.

The second control circuit 202 is connected to at least the second voltage signal line VGH, the first node N1, and the second node N2.

This embodiment illustrates that the control circuit 20 includes the first control circuit 201 and the second control circuit 202. A first terminal of the first control circuit 201 may be one of the two first terminals of the control circuit 20, and a first terminal of the second control circuit 202 may be the other of the two first terminals of the control circuit 20. The first control circuit 201 is connected to at least the first voltage signal line VGL, the second node N2, and the third node N3. Optionally, the first control circuit 201 receives at least the first voltage signal provided by the first voltage signal line VGL and the signal of the third node N3 and controls the signal of the second node N2. A control terminal of the first control circuit 201 is connected to the third node N3, the first terminal of the first control circuit 201 is connected to the first voltage signal line VGL, and a second terminal of the first control circuit 201 is connected to the second node N2. Under the control of the signal of the third node N3, the first terminal and the second terminal of the first control circuit 201 are conducted, and the first voltage signal provided by the first voltage signal line VGL may be transmitted to the second node N2 to control the potential of the second node N2 to be the first voltage signal. The second control circuit 202 is connected to at least the second voltage signal line VGH, the first node N1, and the second node N2. Optionally, the second control circuit 202 receives at least the second voltage signal provided by the second voltage signal line VGH and the signal of the first node N1 and controls the signal of the second node N2. A control terminal of the second control circuit 202 is connected to the first node N1, the first terminal of the second control circuit 202 is connected to the second voltage signal line VGH, and a second terminal of the second control circuit 202 is connected to the second node N2. Under the control of the signal of the first node N1, the first terminal and the second terminal of the second control circuit 202 are conducted, and the second voltage signal provided by the second voltage signal line VGH may be transmitted to the second node N2 to control the potential of the second node N2 to be the second voltage signal.

It is to be understood that in this embodiment, the control terminal of the first control circuit 201 is connected to the third node N3 so that whether the first terminal and the second terminal of the first control circuit 201 are conducted (that is, whether the first voltage signal provided by the first voltage signal line VGL is transmitted to the second node N2) may be controlled by the signal of the third node N3. The control terminal of the second control circuit 202 is connected to the first node N1 so that whether the first terminal and the second terminal of the second control circuit 202 are conducted (that is, whether the second voltage signal provided by the second voltage signal line VGH is transmitted to the second node N2) may be controlled by the signal of the first node N1.

Optionally, as shown in FIG. 4, it is further set in this embodiment that when the signal of the third node N3 controls the first control circuit 201 to be turned on, the signal of the first node N1 controls the second control circuit 202 to be turned off; or when the signal of the third node N3 controls the first control circuit 201 to be turned off, the signal of the first node N1 controls the second control circuit 202 to be turned on. That is, when the signal of the third node N3 controls the first terminal and the second terminal of the first control circuit 201 to be conducted, and the first voltage signal provided by the first voltage signal line VGL may be transmitted to the second node N2, the signal of the first node N1 controls the second control circuit 202 to be turned off, the first terminal and the second terminal of the second control circuit 202 are not conducted, and the second voltage signal provided by the second voltage signal line VGH cannot be transmitted to the second node N2. In this case, the signal of the third node N3 controls a first terminal and a second terminal of the first output circuit 401 to be not conducted, and the first voltage signal provided by the first voltage signal line VGL cannot be transmitted to the output signal terminal OUT. Therefore, the signal of the third node N3 controls the first terminal and the second terminal of the first control circuit 201 to be conducted, the first voltage signal, the logic low-level signal, provided by the first voltage signal line VGL may be transmitted to the second node N2, a first terminal and a second terminal of the second output circuit 402 are conducted, and the logic high-level second voltage signal provided by the second voltage signal line VGH can be transmitted to the output signal terminal OUT so that the output signal of the output signal terminal OUT in the shift register 01 is the logic high-level second voltage signal. When the signal of the third node N3 controls the first terminal and the second terminal of the first control circuit 201 to be not conducted, the first voltage signal provided by the first voltage signal line VGL cannot be transmitted to the second node N2, the signal of the first node N1 controls the first terminal and the second terminal of the second control circuit 202 to be conducted, and the second voltage signal provided by the second voltage signal line VGH may be transmitted to the second node N2. Therefore, the signal of the first node N1 controls the first terminal and the second terminal of the second control circuit 202 to be conducted, and the second voltage signal, the logic high-level signal, provided by the second voltage signal line VGH may be transmitted to the second node N2 so that the first terminal and the second terminal of the second output circuit 402 are not conducted, and the logic high-level second voltage signal provided by the second voltage signal line VGH cannot be transmitted to the output signal terminal OUT. In this case, when the signal of the third node N3 controls the first control circuit 201 to be turned off, and the first terminal and the second terminal of the first control circuit 201 are not conducted, the signal of the third node N3 may control the first terminal and the second terminal of the first output circuit 401 to be conducted, and the logic low-level first voltage signal provided by the first voltage signal line VGL can be transmitted to the output signal terminal OUT so that the output signal of the output signal terminal OUT in the shift register 01 is the logic low-level first voltage signal.

In this embodiment, it is set that the first control circuit 201 and the second control circuit 202 are not turned on at the same time so that when the first control circuit 201 is turned on and the second control circuit 202 is turned off, the output signal of the output signal terminal OUT is the logic high-level second voltage signal, and when the first control circuit 201 is turned off and the second control circuit 202 is turned on, the output signal of the output signal terminal OUT is the logic low-level first voltage signal. Therefore, with the first control circuit 201 and the second control circuit 202 simple in structure, the output signal of the output signal terminal OUT in each stage of shift register 01 of the driver circuit 00 can include the logic low-level signal and the logic high-level signal separately, and the output signal of the output signal terminal OUT is transmitted as the control signal to the pixel circuit P1 of the pixel unit P in the display region AA, thereby driving and controlling the pixel circuit P1. In this manner, the light emission display effect of the pixel units P in the display panel 000 can be ensured.

It is to be understood that an example in which the first node N1 and the third node N3 are connected through the first adjustment circuit 301 is used in FIG. 4 for description in this embodiment. In a specific implementation, when the first node N1 and the third node N3 are directly connected (as shown in FIG. 5 which is a schematic diagram of another circuit connection of a shift register in FIG. 1), the control circuit 20 may also include the first control circuit 201 and the second control circuit 202 as long as the first control circuit 201 and the second control circuit 202 are not turned on at the same time in this embodiment.

Figure 5:
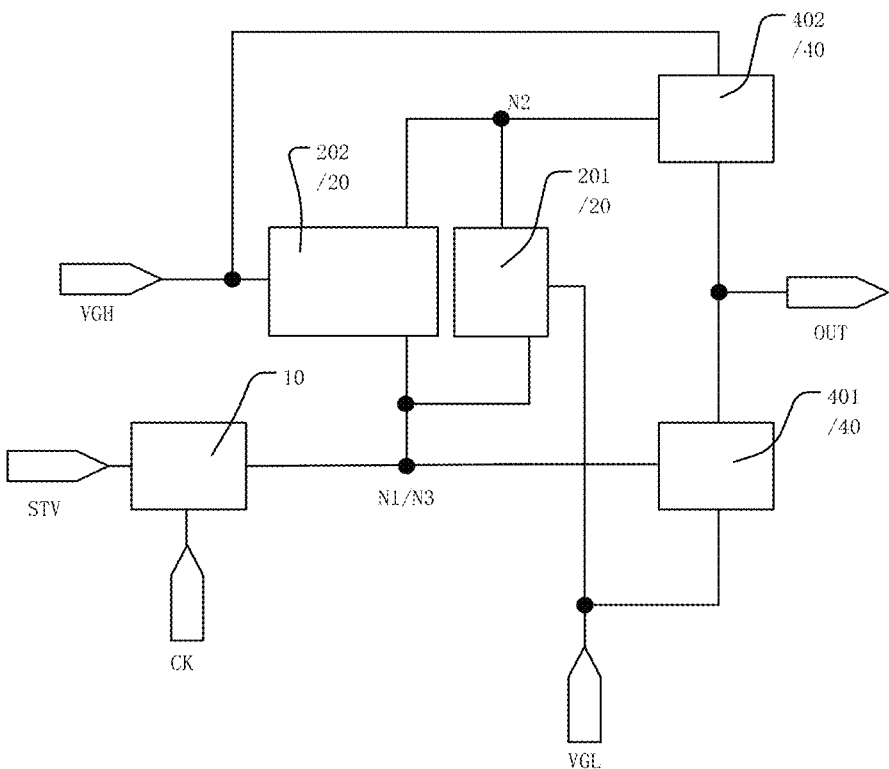
FIG. 5 is a schematic diagram of another module connection of a shift register in FIG. 1.
Figure 6:
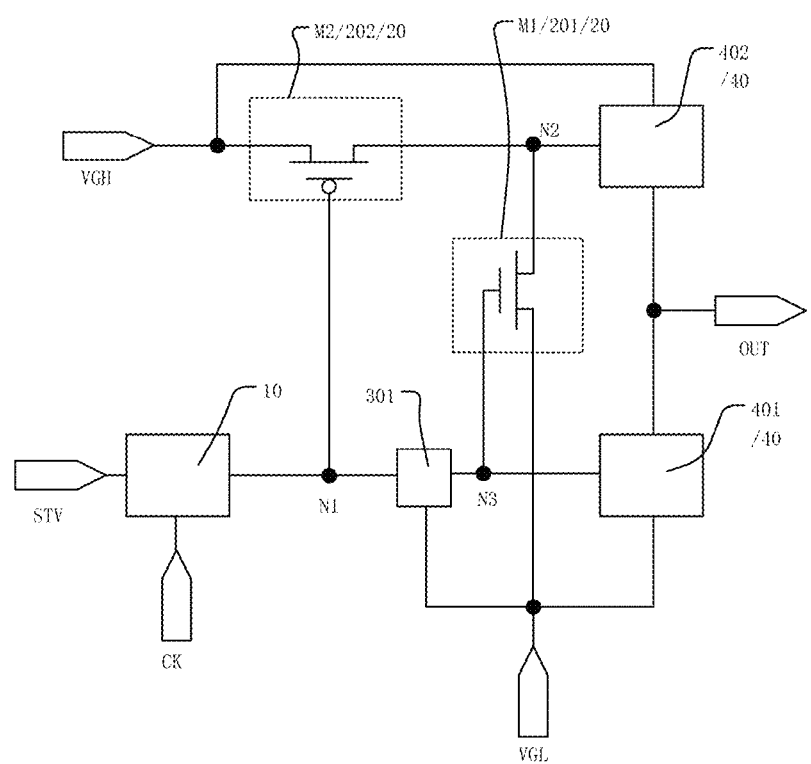
FIG. 6 is a structure diagram of a circuit connection of the shift register in FIG. 4.
Figure 7:
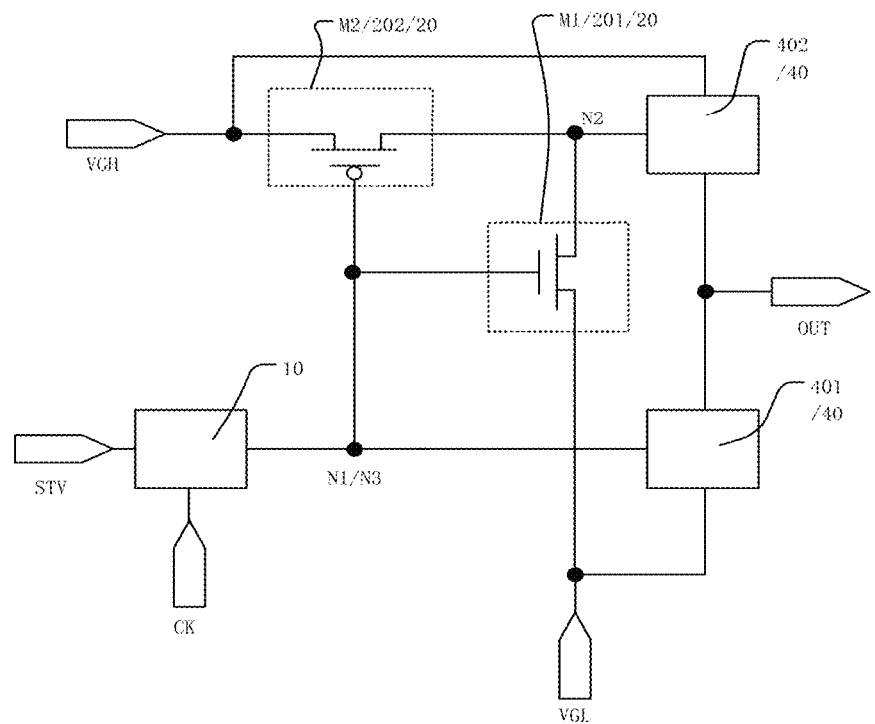
FIG. 7 is a structure diagram of a circuit connection of the shift register in FIG. 5.

Optionally, as shown in FIGS. 1, 4, 5, 6, and 7, FIG. 6 is a structure diagram of a circuit connection of the shift register in FIG. 4, and FIG. 7 is a structure diagram of a circuit connection of the shift register in FIG. 5 (where the first node N1 and the third node N3 are connected through the first adjustment circuit 301 in FIG. 6, and the first node N1 and the third node N3 are directly connected in FIG. 7). In this embodiment, the first control circuit 201 includes a first transistor M1, and the second control circuit 202 includes a second transistor M2.

A first terminal of the first transistor M1 (which may be a drain of the first transistor M1) is connected to the first voltage signal line VGL, a second terminal of the first transistor M1 (which may be a source of the first transistor M1) is connected to the second node N2, and a control terminal of the first transistor M1 (which may be a gate of the first transistor M1) is connected to the third node N3.

Alternatively, a first terminal of the second transistor M2 (which may be a source of the second transistor M2) is connected to the second voltage signal line VGH, a second terminal of the second transistor M2 (which may be a drain of the second transistor M2) is connected to the second node N2, and a control terminal of the second transistor M2 (which may be a gate of the second transistor M2) is connected to the first node N1.

Alternatively, the first terminal of the first transistor M1 (which may be the drain of the first transistor M1) is connected to the first voltage signal line VGL, the second terminal of the first transistor M1 (which may be the source of the first transistor M1) is connected to the second node N2, and the control terminal of the first transistor M1 (which may be the gate of the first transistor M1) is connected to the third node N3; and the first terminal of the second transistor M2 (which may be the source of the second transistor M2) is connected to the second voltage signal line VGH, the second terminal of the second transistor M2 (which may be the drain of the second transistor M2) is connected to the second node N2, and the control terminal of the second transistor M2 (which may be the gate of the second transistor M2) is connected to the first node N1.

This embodiment illustrates that the control circuit 20 includes only two transistors, which are the first transistor M1 included in the first control circuit 201 and the second transistor M2 included in the second control circuit 202, separately so that the number of transistors included in the control circuit 20 in the circuit of the shift register 01 is greatly reduced. When the driver circuit 00 including the multiple cascaded shift registers 01 in this embodiment is manufactured in the non-display region NA of the display panel 000, since the number of transistors included in the control circuit 20 is greatly reduced, a total number of transistors included in the driver circuit 00 is greatly reduced so that a space occupied by the driver circuit 00 in the non-display region NA can be greatly reduced, facilitating a further decrease of a bezel in width and achieving a narrower bezel of the display panel 000.

During the operation of the control circuit 20 in this embodiment, when the signal of the third node N3 controls the first transistor M1 to be turned on, the signal of the first node N1 controls the second transistor M2 to be turned off; or when the signal of the third node N3 controls the first transistor M1 to be turned off, the signal of the first node N1 controls the second transistor M2 to be turned on so that the first transistor M1 and the second transistor M2 can be turned on at different occasions instead of being turned on at the same time. When the output signal terminal OUT needs to output the second voltage signal with a potential at logic high level, it may be set that the first transistor M1 is turned on and the second transistor M2 is turned off. In this case, the first voltage signal is transmitted to the second node N2 due to the first transistor M1 being on, the signal of the second node N2 controls the second output circuit 402 to be turned on, and the second voltage signal is transmitted to the output signal terminal OUT through the second output circuit 402. When the output signal terminal OUT needs to output the first voltage signal with a potential at logic low level at logic low-level, it may be set that the second transistor M2 is turned on and the first transistor M1 is turned off. In this case, the second voltage signal is transmitted to the second node N2 through the second transistor M2 being on, the signal of the second node N2 controls the second output circuit 402 to be turned off, the signal of the third node N3 may control the first output circuit 401 to be turned on though the signal of the third node N3 controls the first transistor M1 to be turned off, and the first voltage signal is transmitted to the output signal terminal OUT through the first output circuit 401.

The circuit structure of the control circuit 20 including two transistors in this embodiment enables the output signal of the output signal terminal OUT in each stage of shift register 01 of the driver circuit 00 to include the logic low-level signal and the logic high-level signal separately, and the output signal of the output signal terminal OUT is transmitted as the control signal to the pixel circuit P1 of the pixel unit P in the display region AA, thereby driving and controlling the pixel circuit P1, greatly reducing the number of transistors in the control circuit 20, and ensuring the narrower bezel of the display panel 000.

Figure 8:
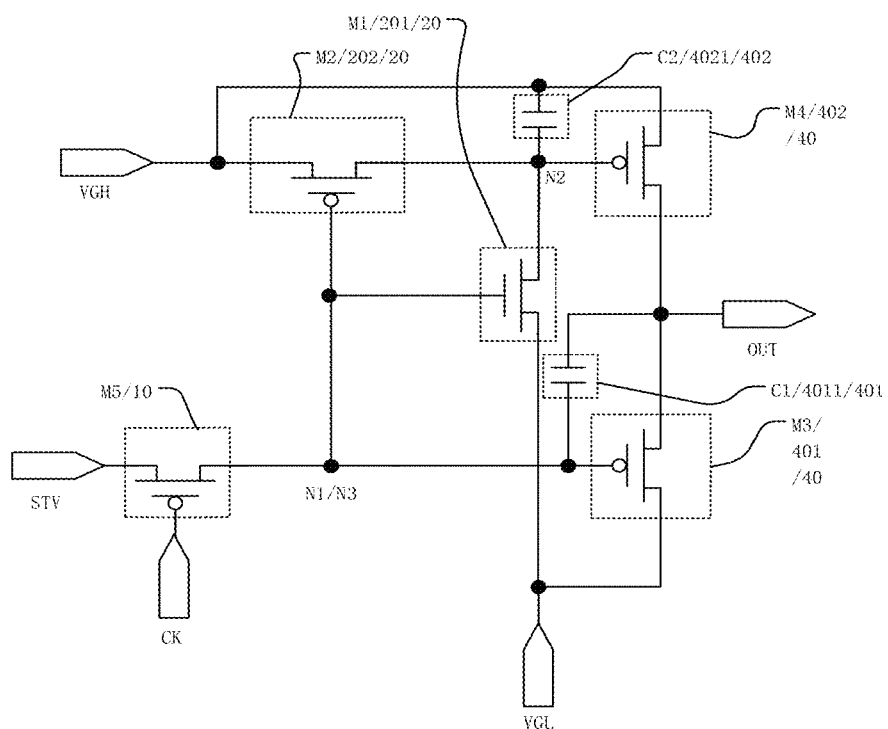
FIG. 8 is a structure diagram of another circuit connection of the shift register in FIG. 5.
Figure 9:
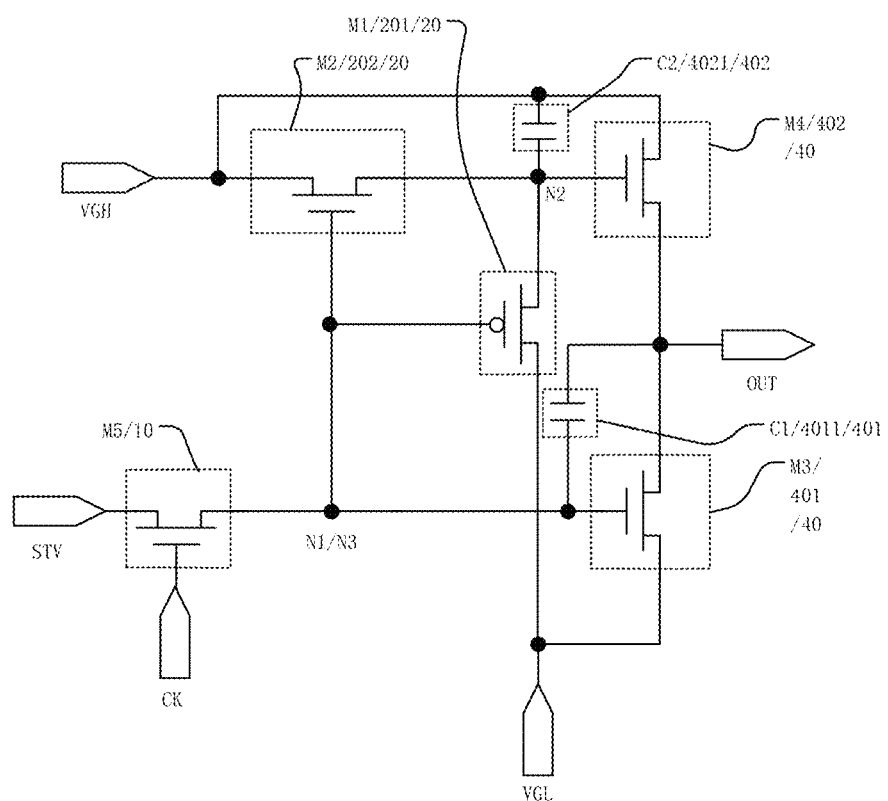
FIG. 9 is a structure diagram of another circuit connection of the shift register in FIG. 5.

Optionally, as shown in FIGS. 1, 5, 7, 8, and 9, FIG. 8 is a structure diagram of another circuit connection of the shift register in FIG. 5, and FIG. 9 is a structure diagram of another circuit connection of the shift register in FIG. 5. In this embodiment, the first control circuit 201 includes the first transistor M1, the second control circuit 202 includes the second transistor M2, the first output circuit 401 includes a third transistor M3, and the second output circuit 402 includes a fourth transistor M4; and the input circuit 10 may include a fifth transistor M5, and the first node N1 and the third node N3 may be directly connected.

In this embodiment, the first transistor M1 and the second transistor M2 have different types of channel regions. That is, the first transistor M1 is an n-type channel transistor, and the second transistor M2 is a p-type channel transistor (as shown in FIG. 8); or the first transistor M1 is a p-type channel transistor, and the second transistor M2 is an n-type channel transistor (as shown in FIG. 9). In this case, other transistors such as the third transistor M3, the fourth transistor M4, and the fifth transistor M5 in the shift register 01 may be of the same type as the second transistor M2.

In the circuit structure of the shift register 01 provided in this embodiment, the first terminal of the first transistor M1 (which may be the drain of the first transistor M1) is connected to the first voltage signal line VGL, the second terminal of the first transistor M1 (which may be the source of the first transistor M1) is connected to the second node N2, and the control terminal of the first transistor M1 (which may be the gate of the first transistor M1) is connected to the third node N3. The first terminal of the second transistor M2 (which may be the source of the second transistor M2) is connected to the second voltage signal line VGH, the second terminal of the second transistor M2 (which may be the drain of the second transistor M2) is connected to the second node N2, and the control terminal of the second transistor M2 is connected to the first node N1. A first terminal of the third transistor M3 (which may be a drain of the third transistor M3) is connected to the first voltage signal line VGL, a second terminal of the third transistor M3 (which may be a source of the third transistor M3) is connected to the output signal terminal OUT, and a control terminal of the third transistor M3 (which may be a gate of the third transistor M3) is connected to the third node N3. A first terminal of the fourth transistor M4 (which may be a source of the fourth transistor M4) is connected to the second voltage signal line VGH, a second terminal of the fourth transistor M4 (which may be a drain of the fourth transistor M4) is connected to the output signal terminal OUT, and a control terminal of the fourth transistor M4 (which may be a gate of the fourth transistor M4) is connected to the second node N2. A first terminal of the fifth transistor M5 (which may be a source of the fifth transistor M5) is connected to the input signal terminal STV, a second terminal of the fifth transistor M5 (which may be a drain of the fifth transistor M5) is connected to the first node N1, and a control terminal of the fifth transistor M5 (which may be a gate of the fifth transistor M5) is connected to the first clock signal line CK.

Further, the first output circuit 401 includes a first latch circuit 4011 connected between the third node N3 and the output signal terminal OUT, and the first latch circuit 4011 includes a first capacitor C1, where a first plate of the first capacitor C1 is connected to the third node N3, and a second plate of the first capacitor C1 is connected to the output signal terminal OUT; and/or the second output circuit 402 includes a second latch circuit 4021 connected between the second node N2 and the second voltage signal line VGH, and the second latch circuit 4021 includes a second capacitor C2, where a first plate of the second capacitor C2 is connected to the second node N2, and a second plate of the second capacitor C2 is connected to the second voltage signal line VGH. The first latch circuit 4011 including the first capacitor C1 and the second latch circuit 4021 including the second capacitor C2 in this embodiment may implement functions of latching a voltage and stabilizing a potential.

Figure 10:
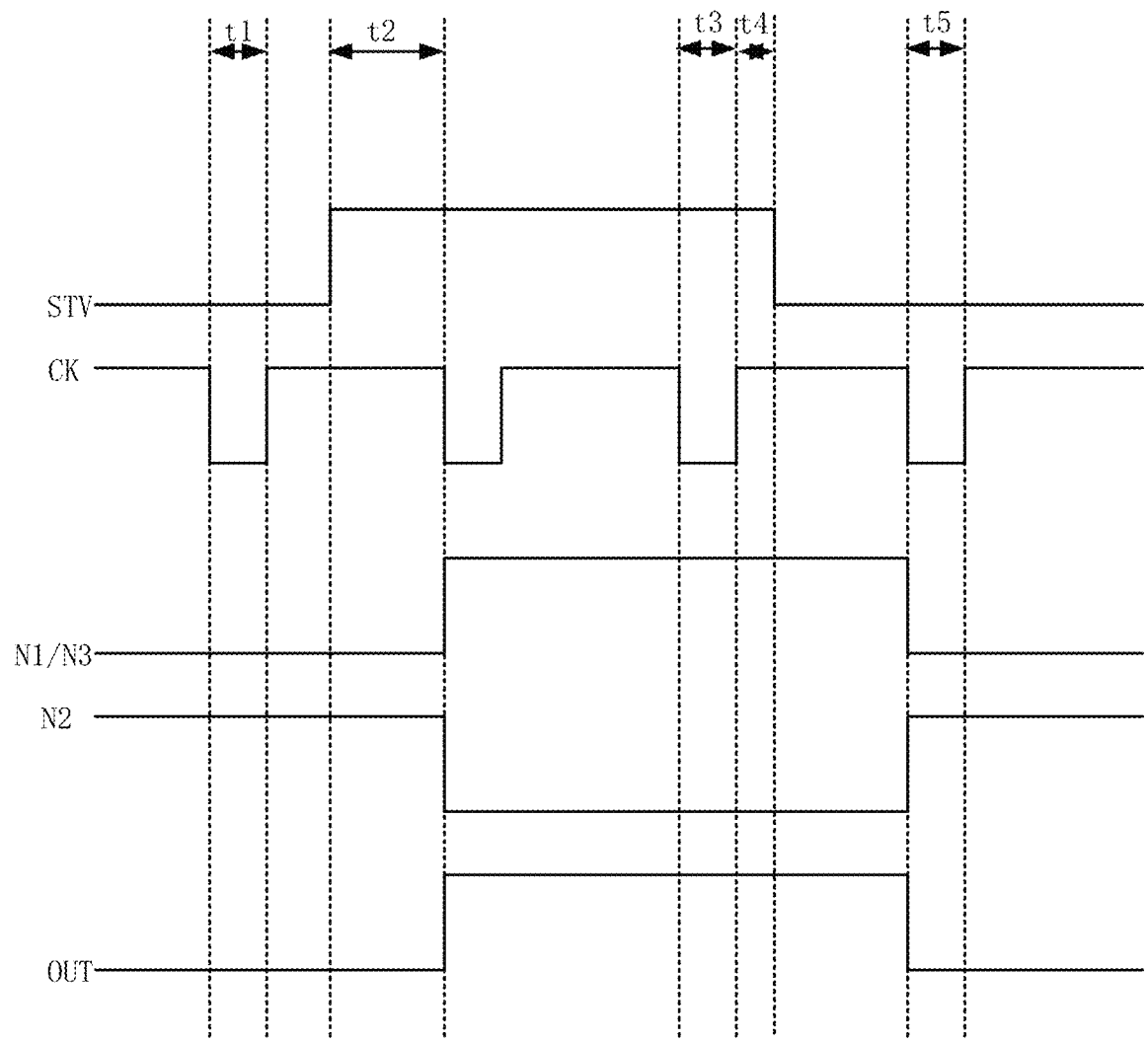
FIG. 10 is a timing graph of a circuit of the shift register in FIG. 8.

Optionally, reference is made to FIGS. 8 and 10. FIG. 10 is a timing graph of a circuit of the shift register in FIG. 8. The circuit structure of the shift register 01 shown in FIG. 8 is used as an example to describe the operation of the shift register 01.

Figure 11:
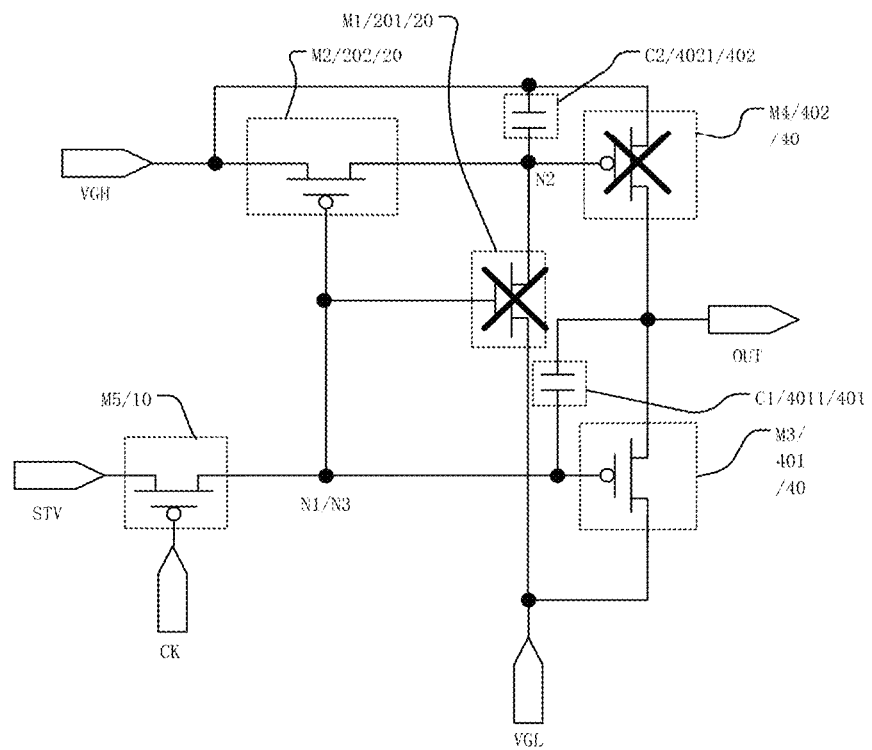
FIG. 11 is a diagram of on states of transistors in the circuit structure in FIG. 8 in a first time period.

In a first time period t1, as shown in FIGS. 10 and 11 (FIG. 11 is a diagram of on states of transistors in the circuit structure in FIG. 8 in a first time period (in the figure, "x" on a transistor indicates that the transistor is off, and no sign indicates that the transistor is on)), the input signal of the input signal terminal STV is at a logic low level, and the first clock signal provided by the first clock signal line CK is at a logic low level so that the fifth transistor M5 is turned on, the first node N1 and the third node N3 both have the logic low-level signal, the second transistor M2 is turned on, the third transistor M3 is turned on, and the first transistor M1 is turned off, the logic high-level second voltage signal transmitted by the second voltage signal line VGH is transmitted to the second node N2, the fourth transistor M4 is turned off, and the logic low-level first voltage signal transmitted by the first voltage signal line VGL is transmitted to the output signal terminal OUT so that the output signal of the output signal terminal OUT is the logic low-level signal.

Figure 12:
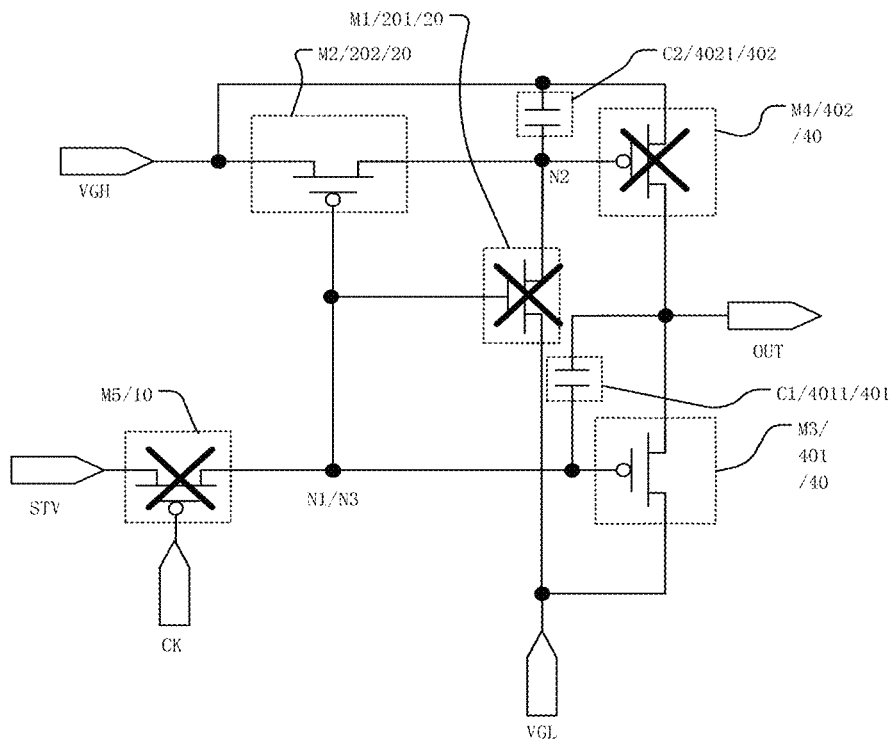
FIG. 12 is a diagram of on states of transistors in the circuit structure in FIG. 8 in a second time period.

In a second time period t2, as shown in FIGS. 10 and 12 (FIG. 12 is a diagram of on states of transistors in the circuit structure in FIG. 8 in a second time period (in the figure, "x" on a transistor indicates that the transistor is off, and no sign indicates that the transistor is on)), the input signal of the input signal terminal STV is at a logic high level, and the first clock signal provided by the first clock signal line CK is at a logic high level so that the fifth transistor M5 is turned off, the first node N1 and the third node N3 still maintain the logic low-level signal due to the voltage latching function of the first capacitor C1, the second transistor M2 is still turned on, the third transistor M3 is still turned on, and the first transistor M1 is still turned off, the logic high-level second voltage signal transmitted by the second voltage signal line VGH is transmitted to the second node N2, the fourth transistor M4 remains off, and the logic low-level first voltage signal transmitted by the first voltage signal line VGL is transmitted to the output signal terminal OUT so that the output signal of the output signal terminal OUT is still the logic low-level signal. The second capacitor C2 may stabilize the potential of the second node N2 to be the logic high-level signal, thereby ensuring that the fourth transistor M4 remains off and preventing the logic high-level second voltage signal from being transmitted to the output signal terminal OUT and affecting the outputted logic low-level signal.

Figure 13:
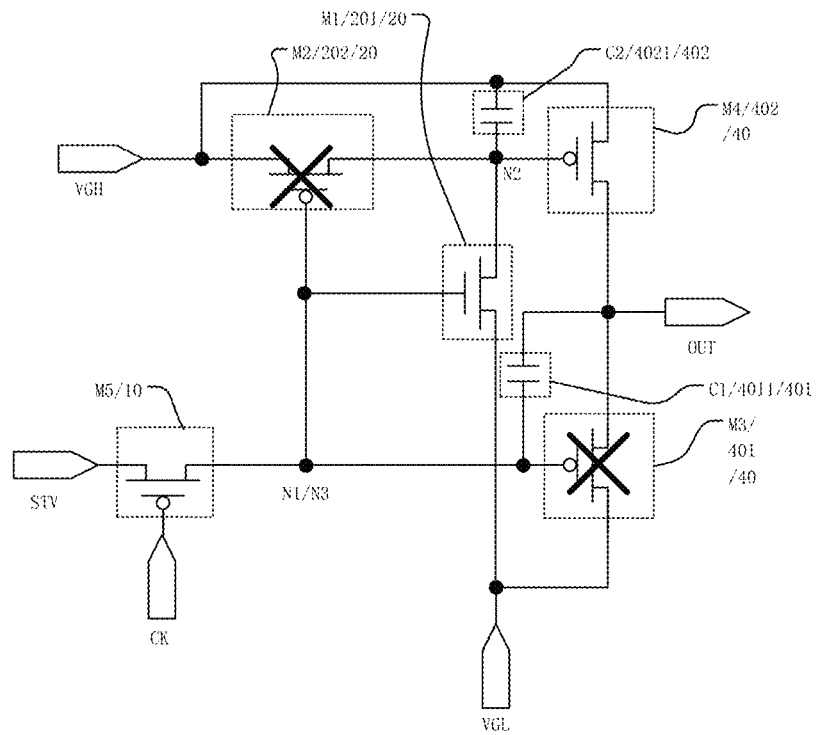
FIG. 13 is a diagram of on states of transistors in the circuit structure in FIG. 8 in a third time period.

In a third time period t3, as shown in FIGS. 10 and 13 (FIG. 13 is a diagram of on states of transistors in the circuit structure in FIG. 8 in a third time period (in the figure, "x" on a transistor indicates that the transistor is off, and no sign indicates that the transistor is on)), the input signal of the input signal terminal STV is at a logic high level, and the first clock signal provided by the first clock signal line CK is at a logic low level so that the fifth transistor M5 is turned on, the first node N1 and the third node N3 both have the logic high-level signal, the second transistor M2 is turned off, the third transistor M3 is turned off, and the first transistor M1 is turned on, the logic low-level first voltage signal transmitted by the first voltage signal line VGL is transmitted to the second node N2, the fourth transistor M4 is turned on, and the logic high-level second voltage signal transmitted by the second voltage signal line VGH is transmitted to the output signal terminal OUT so that the output signal of the output signal terminal OUT is the logic high-level signal.

Figure 14:
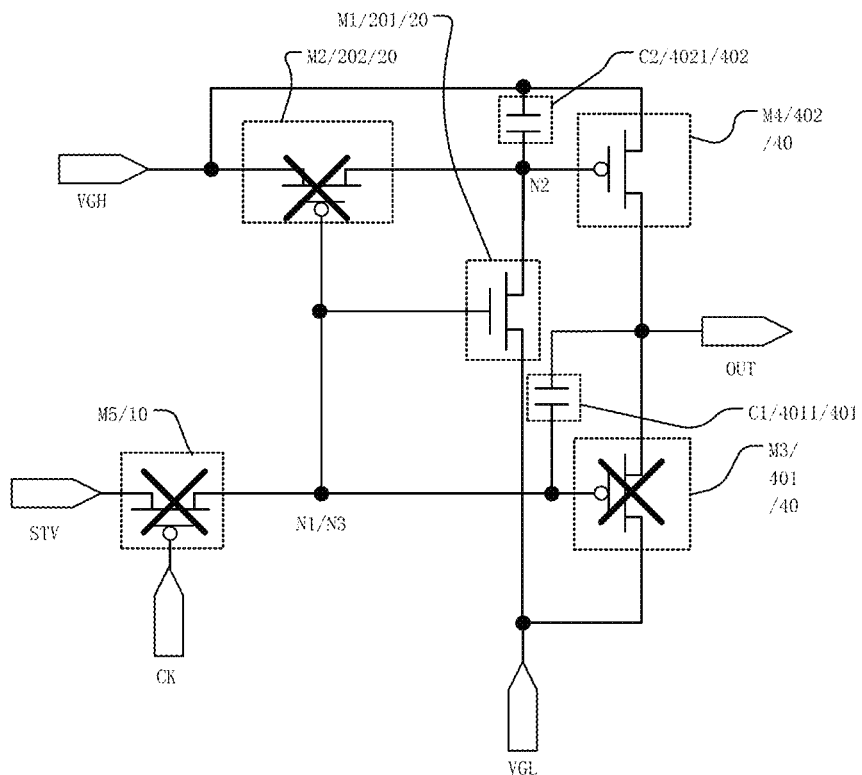
FIG. 14 is a diagram of on states of transistors in the circuit structure in FIG. 8 in a fourth time period.

In a fourth time period t4, as shown in FIGS. 10 and 14 (FIG. 14 is a diagram of on states of transistors in the circuit structure in FIG. 8 in a fourth time period (in the figure, "x" on a transistor indicates that the transistor is off, and no sign indicates that the transistor is on)), the input signal of the input signal terminal STV is at a logic high level, and the first clock signal provided by the first clock signal line CK is at a logic high level so that the fifth transistor M5 is turned off, the first node N1 and the third node N3 still maintain the logic high-level signal due to the voltage latching function of the first capacitor C1, the second transistor M2 remains off, the third transistor M3 remains off, and the first transistor M1 remains on, the logic low-level first voltage signal transmitted by the first voltage signal line VGL is transmitted to the second node N2, the fourth transistor M4 is turned on, and the logic high-level second voltage signal transmitted by the second voltage signal line VGH is transmitted to the output signal terminal OUT so that the output signal of the output signal terminal OUT is still the logic high-level signal.

In a fifth time period t5, as shown in FIGS. 10 and 11 (for a diagram of on states of transistors in the circuit structure in FIG. 8 in the fifth time period, reference may be made to FIG. 11), the input signal of the input signal terminal STV is at a logic low level, and the first clock signal provided by the first clock signal line CK is at a logic low level so that the fifth transistor M5 is turned on, the input signal of the input signal terminal STV is written to the first node N1, the first node N1 and the third node N3 both have the logic low-level signal, the second transistor M2 is turned on, the third transistor M3 is turned on, and the first transistor M1 is turned off, the logic high-level second voltage signal transmitted by the second voltage signal line VGH is transmitted to the second node N2, the fourth transistor M4 is turned off, and the logic low-level first voltage signal transmitted by the first voltage signal line VGL is transmitted to the output signal terminal OUT so that the output signal of the output signal terminal OUT is the logic low-level signal.

Figure 15:
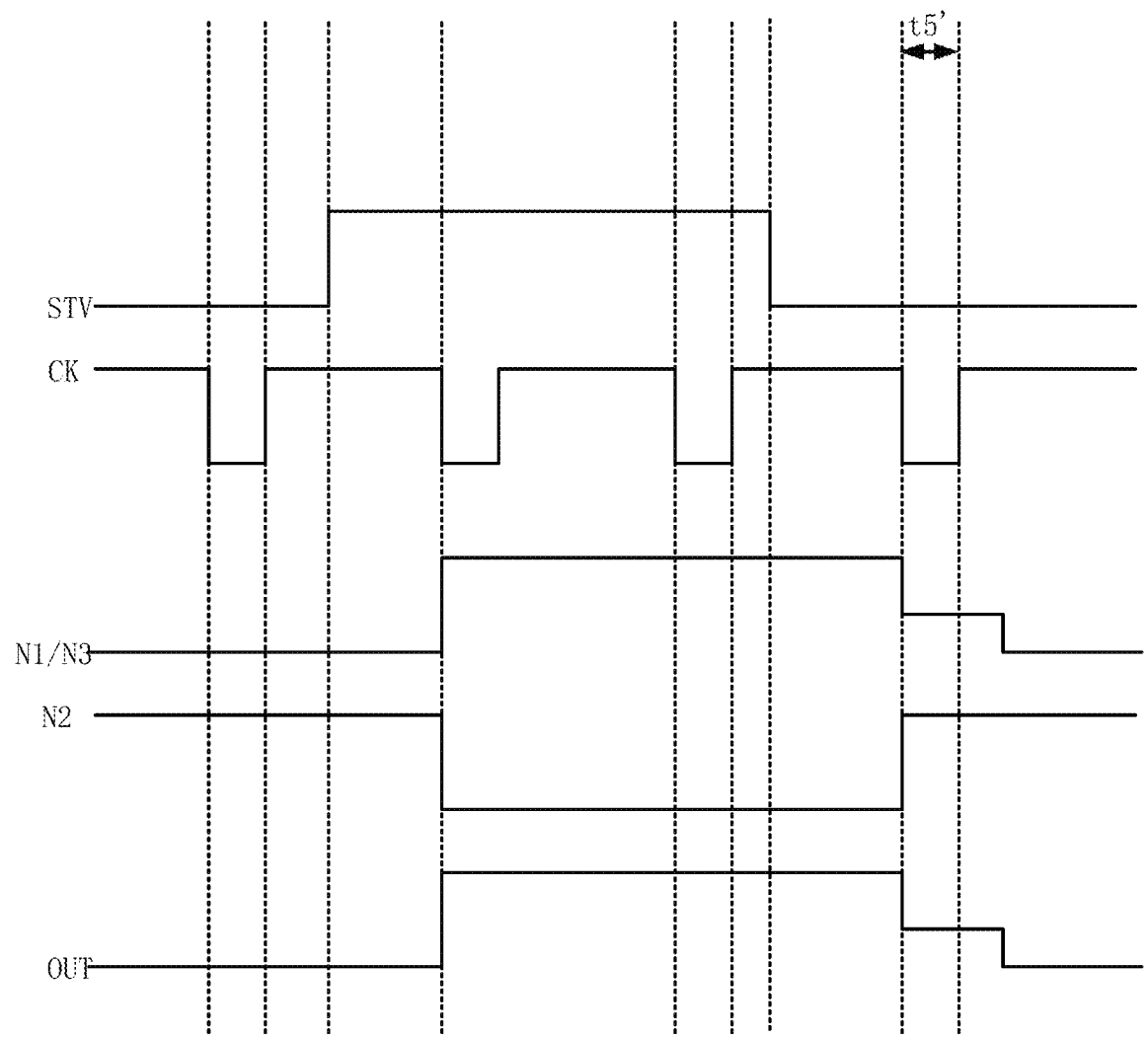
FIG. 15 is a timing graph when a first capacitor is not disposed between a third node and an output signal terminal in the related art.

In the related art, if the first capacitor C1 is not disposed between the third node N3 and the output signal terminal OUT, when the input signal of the input signal terminal STV jumps from the logic high level to the logic low level and the first clock signal provided by the first clock signal line CK is at the logic low level, the third node N3 is written to as low as $V_{VGL}+|Vth|$, where Vth denotes a threshold voltage of the third transistor M3, and $V_{VGL}$ denotes a voltage of the logic low-level first voltage signal transmitted by the first voltage signal line VGL, the third transistor M3 enters a saturated working region, the third transistor M3 is turned on, and the output signal terminal OUT is written low. When the output signal terminal OUT is written to as low as $V_{N3}+|Vth|$ (that is, $V_{VGL}+2|Vth|$), a working state of the third transistor M3 changes from a saturated region to a cutoff region (a condition for a p-type transistor to enter the cutoff region is Vg−Vs>Vth, when a potential of the output signal terminal OUT, that is, a source potential Vs of the third transistor M3, is written to as low as $V_{VGL}+2|Vth|$, a gate potential Vg of the third transistor M3−Vs>Vth, and the third transistor M3 enters the cutoff region) so that the potential of the output signal terminal OUT cannot be written lower. The potential of the output signal terminal OUT is probably maintained at $V_{VGL}+2|Vth|$, resulting in tailing, that is, a step of a waveform of the output signal of the output signal terminal OUT. Thus, the output signal of the shift register 01 is unstable. As shown by a fifth time period t5' in FIG. 15 (FIG. 15 is a timing graph when a first capacitor is not disposed between a third node and an output signal terminal in the related art), if the first capacitor C1 is not disposed between the third node N3 and the output signal terminal OUT, when the input signal of the input signal terminal STV jumps from the logic high level to the logic low level and the first clock signal provided by the first clock signal line CK is at the logic low level, a lag phenomenon exists in the waveform of the output signal of the output signal terminal OUT.

To solve the problem, in the circuit structure of this embodiment, the first capacitor C1 is disposed between the third node N3 and the output signal terminal OUT. When the input signal of the input signal terminal STV jumps from the logic high level to the logic low level and the first clock signal provided by the first clock signal line CK is at the logic low level, the potential of the output signal of the output signal terminal OUT is lowered. Due to a coupling function of the first capacitor C1, the potential of the output signal of the output signal terminal OUT becomes low, and the first capacitor C1 may couple the third node N3 towards a negative potential so that the potential of the third node N3 is lower than $V_{VGL}−|Vth|$ after being coupled. As the potential of the output signal of the output signal terminal OUT is lowered, the third transistor M3 cannot satisfy the condition for entering the cutoff region, thereby ensuring the conduction stability of the third transistor M3. Therefore, in the fifth time period t5, the first voltage signal from the first voltage signal line VGL is directly and stably transmitted to the output signal terminal OUT through the third transistor M3, and the potential of the output signal of the output signal terminal OUT may be directly lowered to the logic low-level first voltage signal so that the problem of lag phenomenon of the waveform of the output signal of the output signal terminal OUT when the input signal of the input signal terminal STV jumps from the logic high level to the logic low level and the first clock signal provided by the first clock signal line CK is at the logic low level can be avoided (as shown in FIG. 10, the waveform of the output signal of the output signal terminal OUT is directly lowered in the fifth time period t5 without the problem of lag phenomenon), and the output signal of the shift register 01 is more stable, which is conducive to further ensuring a display effect of the display panel 000.

The circuit structure of the shift register 01 provided in this embodiment can not only ensure a shift register function of the shift register 01 to provide the control signal for the pixel circuit P1 in the display region AA but also simplify the circuit so that the number of transistors in the driver circuit 00 is reduced as much as possible, which is more conducive to the design of a narrow bezel. Moreover, the design of the first capacitor C1 of the first latch circuit makes the output signal of the shift register 01 more stable, which solves the problem of lag phenomenon of the output signal and is conducive to further ensuring the display effect of the display panel 000.

Figure 16:
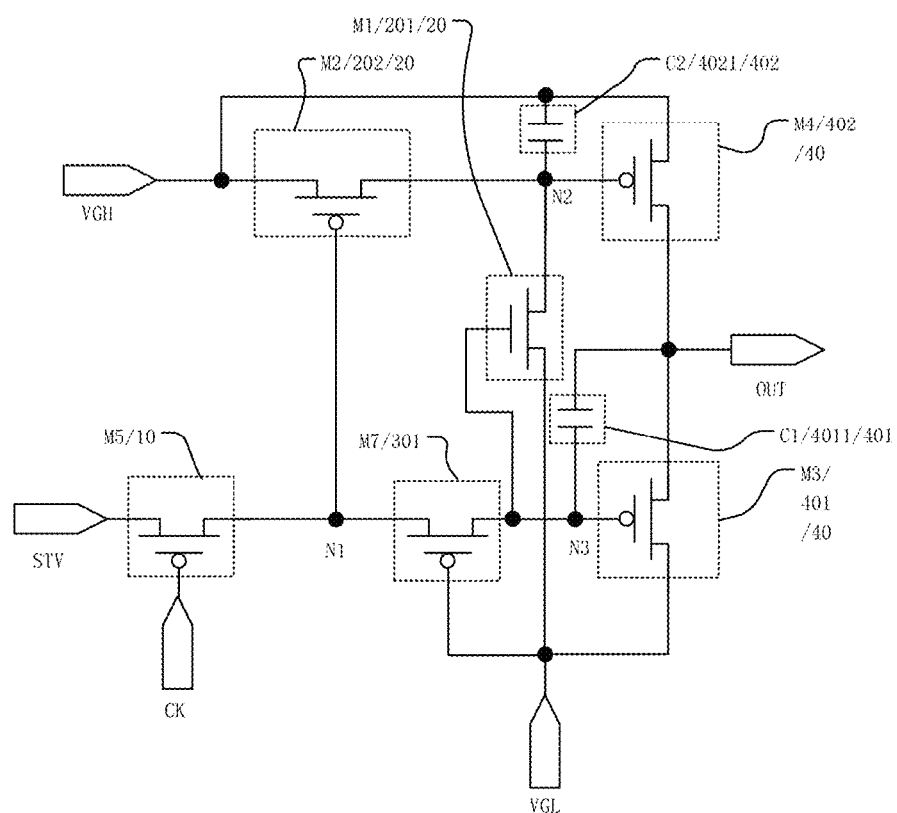
FIG. 16 is a structure diagram of another circuit connection of the shift register in FIG. 4.
Figure 17:
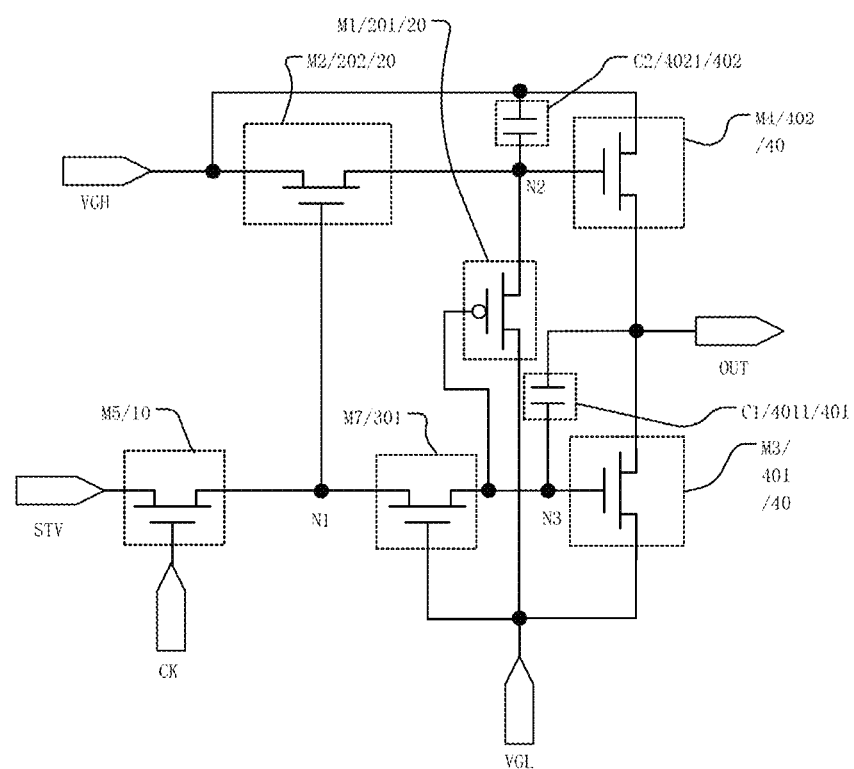
FIG. 17 is a structure diagram of another circuit connection of the shift register in FIG. 4.

Optionally, as shown in FIGS. 1, 4, 6, 16, and 17, FIG. 16 is a structure diagram of another circuit connection of the shift register in FIG. 4, and FIG. 17 is a structure diagram of another circuit connection of the shift register in FIG. 4. In this embodiment, the first control circuit 201 includes the first transistor M1, the second control circuit 202 includes the second transistor M2, the first output circuit 401 includes the third transistor M3, and the second output circuit 402 includes the fourth transistor M4; and the input circuit 10 may include the fifth transistor M5, and the first node N1 and the third node N3 may be connected through the first adjustment circuit 301. The first adjustment circuit 301 may include a seventh transistor M7. The first node N1 and the third node N3 are connected through the first adjustment circuit 301, and the first adjustment circuit 301 is connected to at least the first node N1, the third node N3, and the first voltage signal line VGL. The first adjustment circuit 301 receives at least the signal of the first node N1 and the first voltage signal provided by the first voltage signal line VGL and controls the signal of the third node N3.

In this embodiment, the first transistor M1 and the second transistor M2 have different types of channel regions. That is, the first transistor M1 is the n-type channel transistor, and the second transistor M2 is the p-type channel transistor (as shown in FIG. 16); or the first transistor M1 is the p-type channel transistor, and the second transistor M2 is the n-type channel transistor (as shown in FIG. 17). In this case, other transistors such as the third transistor M3, the fourth transistor M4, the fifth transistor M5, and the seventh transistor M7 in the shift register 01 may be of the same type as the second transistor M2.

In the circuit structure of the shift register 01 provided in this embodiment, a first terminal of the seventh transistor M7 (which may be a source of the seventh transistor M7) is connected to the first node N1, a second terminal of the seventh transistor M7 (which may be a drain of the seventh transistor M7) is connected to the third node N3, and a control terminal of the seventh transistor M7 (which may be a gate of the seventh transistor M7) is connected to the first voltage signal line VGL. The seventh transistor M7 receives at least the signal of the first node N1 and the first voltage signal provided by the first voltage signal line VGL and controls the signal of the third node N3.

Optionally, reference is made to FIGS. 16 and 10. For a timing graph of a circuit of the shift register in FIG. 16, reference may be made to FIG. 10. The circuit structure of the shift register 01 shown in FIG. 16 is used as an example to describe the operation of the shift register 01.

Figure 18:
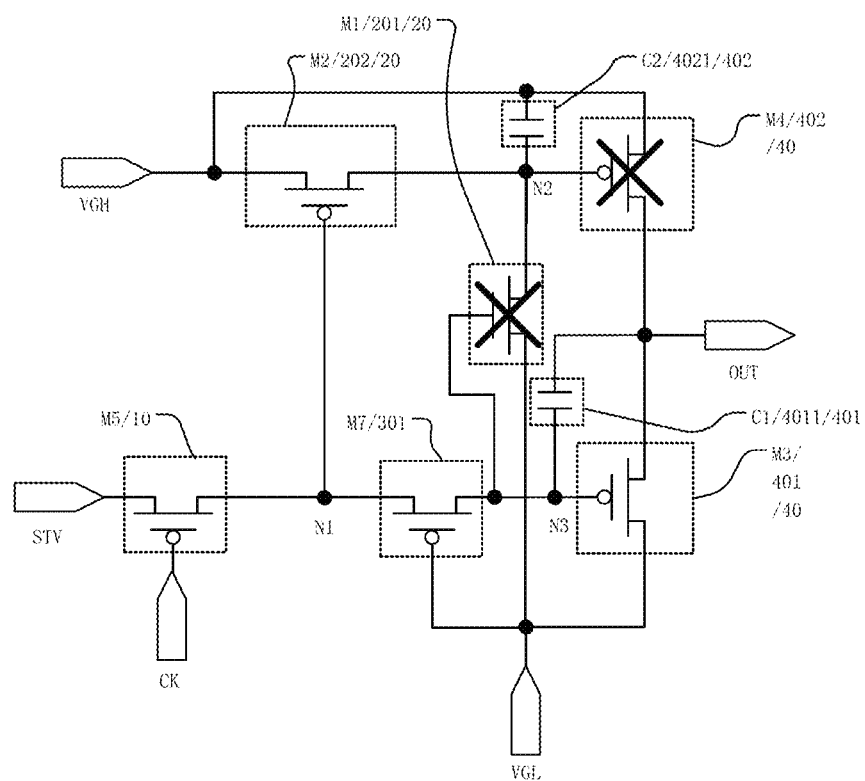
FIG. 18 is a diagram of on states of transistors in the circuit structure in FIG. 16 in a first time period.

In the first time period t1, as shown in FIGS. 10, 16, and 18 (FIG. 18 is a diagram of on states of transistors in the circuit structure in FIG. 16 in a first time period (in the figure, "x" on a transistor indicates that the transistor is off, and no sign indicates that the transistor is on)), the seventh transistor M7 remains on under the first voltage signal provided by the first voltage signal line VGL. The input signal of the input signal terminal STV is at the logic low level, and the first clock signal provided by the first clock signal line CK is at the logic low level so that the fifth transistor M5 is turned on, the first node N1 and the third node N3 both have the logic low-level signal, the second transistor M2 is turned on, the third transistor M3 is turned on, and the first transistor M1 is turned off, the logic high-level second voltage signal transmitted by the second voltage signal line VGH is transmitted to the second node N2, the fourth transistor M4 is turned off, and the logic low-level first voltage signal transmitted by the first voltage signal line VGL is transmitted to the output signal terminal OUT so that the output signal of the output signal terminal OUT is the logic low-level signal.

Figure 19:
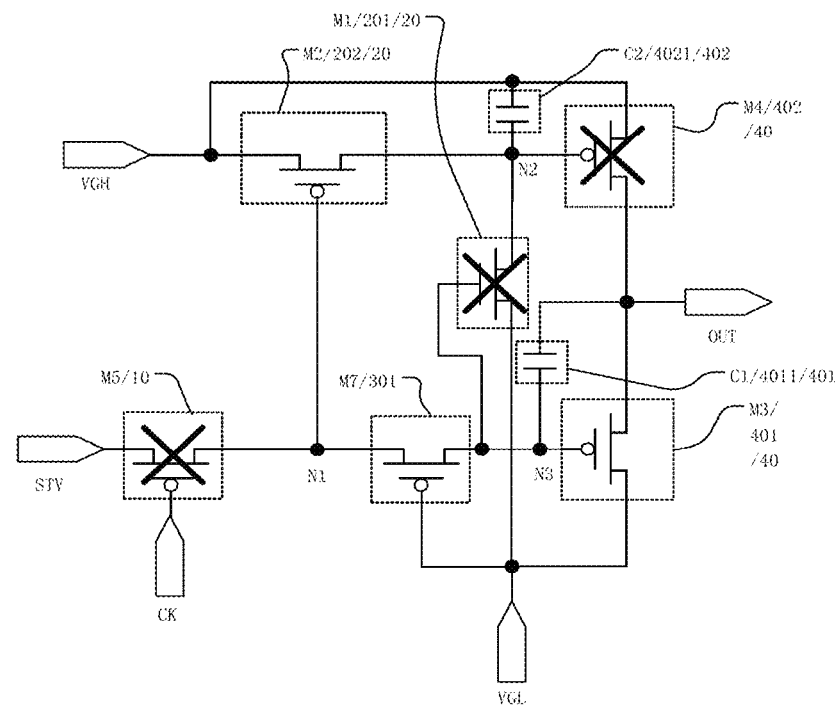
FIG. 19 is a diagram of on states of transistors in the circuit structure in FIG. 16 in a second time period.

In the second time period t2, as shown in FIGS. 10, 16, and 19 (FIG. 19 is a diagram of on states of transistors in the circuit structure in FIG. 16 in a second time period (in the figure, "x" on a transistor indicates that the transistor is off, and no sign indicates that the transistor is on)), the seventh transistor M7 remains on under the first voltage signal provided by the first voltage signal line VGL. The input signal of the input signal terminal STV is at the logic high level, and the first clock signal provided by the first clock signal line CK is at the logic high level so that the fifth transistor M5 is turned off, the third node N3 still maintains the logic low-level signal due to the voltage latching function of the first capacitor C1, the first node N1 still maintains the logic low-level signal due to the seventh transistor M7 being on, the second transistor M2 is still turned on, the third transistor M3 is still turned on, and the first transistor M1 is still turned off, the logic high-level second voltage signal transmitted by the second voltage signal line VGH is transmitted to the second node N2, the fourth transistor M4 remains off, and the logic low-level first voltage signal transmitted by the first voltage signal line VGL is transmitted to the output signal terminal OUT so that the output signal of the output signal terminal OUT is still the logic low-level signal. The second capacitor C2 stabilizes the potential of the second node N2 to be the logic high-level signal, thereby ensuring that the fourth transistor M4 remains off and preventing the logic high-level second voltage signal from being transmitted to the output signal terminal OUT and affecting the outputted logic low-level signal. Moreover, the seventh transistor M7 is disposed in this embodiment so that the potential of the third node N3 can be as low as possible. The potential of the first node N1 is likely to be as low as the first voltage signal. However, to ensure that the third transistor M3 is completely on, the potential of the third node N3 needs to be lowered to be much lower than the first voltage signal of the drain of the third transistor M3. Therefore, the seventh transistor M7 of the first adjustment circuit 301 is disposed in this embodiment so that a potential at logic low level of the third node N3 is not affected by the potential of the first node N1, and the potential at logic low level of the third node N3 can be lowered as much as possible. Thus, a conduction effect of the third transistor M3 is ensured so that the third transistor M3 is completely on, and the output signal of the output signal terminal OUT remains to be the first voltage signal, the logic low-level signal.

Figure 20:
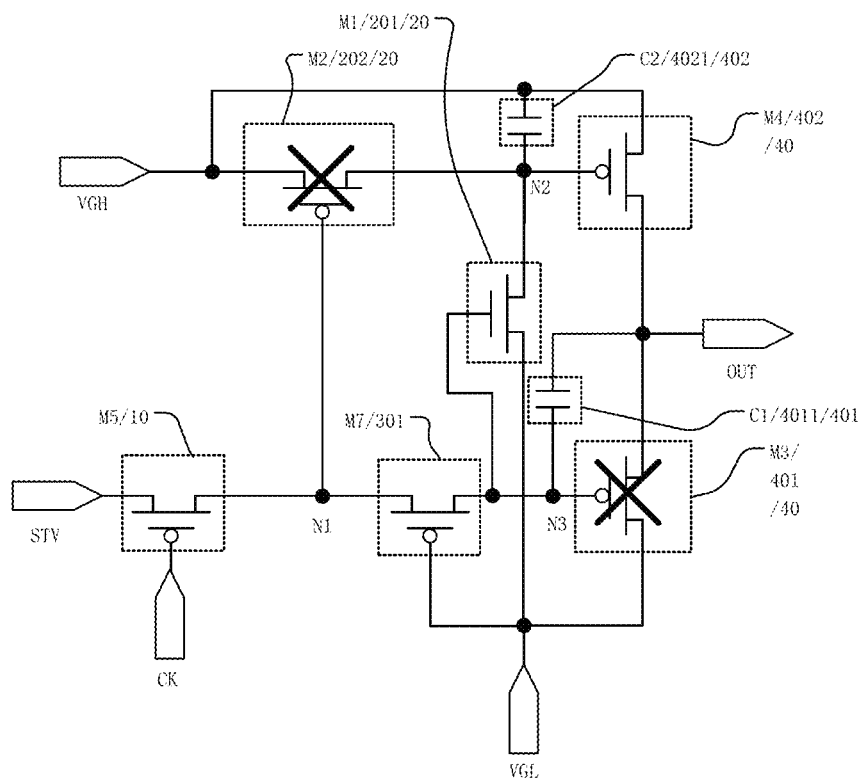
FIG. 20 is a diagram of on states of transistors in the circuit structure in FIG. 16 in a third time period.

In the third time period t3, as shown in FIGS. 10, 16, and 20 (FIG. 20 is a diagram of on states of transistors in the circuit structure in FIG. 16 in a third time period (in the figure, "x" on a transistor indicates that the transistor is off, and no sign indicates that the transistor is on)), the seventh transistor M7 remains on under the first voltage signal provided by the first voltage signal line VGL. The input signal of the input signal terminal STV is at the logic high level, and the first clock signal provided by the first clock signal line CK is at the logic low level so that the fifth transistor M5 is turned on, the first node N1 and the third node N3 both have the logic high-level signal, the second transistor M2 is turned off, the third transistor M3 is turned off, and the first transistor M1 is turned on, the logic low-level first voltage signal transmitted by the first voltage signal line VGL is transmitted to the second node N2, the fourth transistor M4 is turned on, and the logic high-level second voltage signal transmitted by the second voltage signal line VGH is transmitted to the output signal terminal OUT so that the output signal of the output signal terminal OUT is the logic high-level signal.

Figure 21:
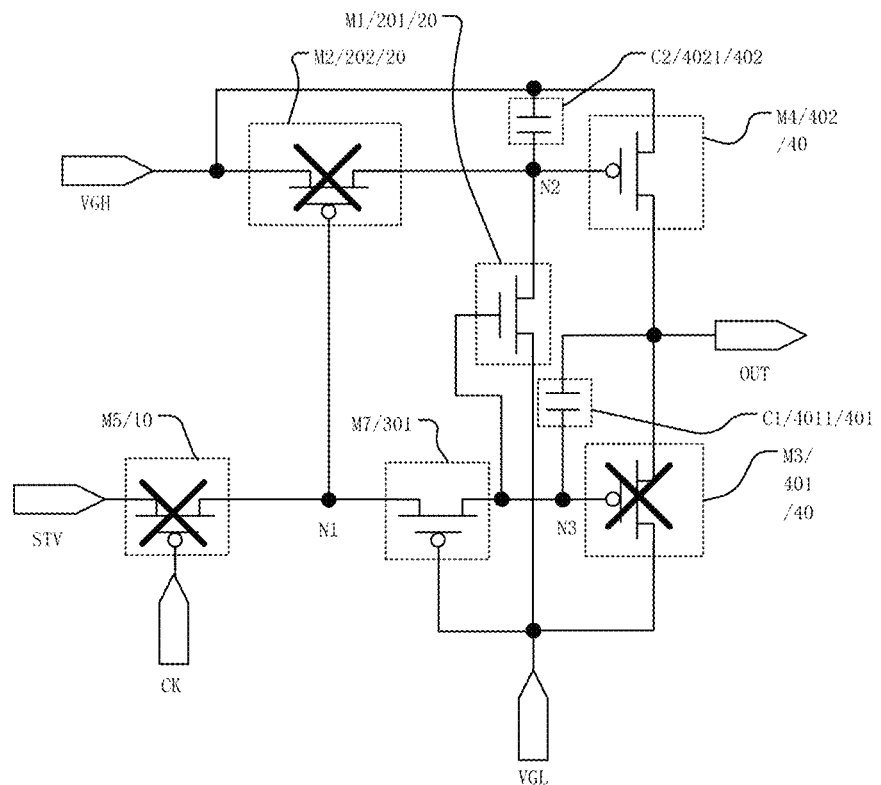
FIG. 21 is a diagram of on states of transistors in the circuit structure in FIG. 16 in a fourth time period.

In the fourth time period t4, as shown in FIGS. 10, 16, and 21 (FIG. 21 is a diagram of on states of transistors in the circuit structure in FIG. 16 in a fourth time period (in the figure, "x" on a transistor indicates that the transistor is off, and no sign indicates that the transistor is on)), the seventh transistor M7 remains on under the first voltage signal provided by the first voltage signal line VGL. The input signal of the input signal terminal STV is at the logic high level, and the first clock signal provided by the first clock signal line CK is at the logic high level so that the fifth transistor M5 is turned off, the first node N1 and the third node N3 still maintain the logic high-level signal due to the voltage latching function of the first capacitor C1, the second transistor M2 remains off, the third transistor M3 remains off, and the first transistor M1 remains on, the logic low-level first voltage signal transmitted by the first voltage signal line VGL is transmitted to the second node N2, the fourth transistor M4 is turned on, and the logic high-level second voltage signal transmitted by the second voltage signal line VGH is transmitted to the output signal terminal OUT so that the output signal of the output signal terminal OUT is still the logic high-level signal.

In the fifth time period t5, as shown in FIGS. 10 and 18 (for a diagram of on states of transistors in the circuit structure in FIG. 16 in the fifth time period, reference may be made to FIG. 18), the seventh transistor M7 remains on under the first voltage signal provided by the first voltage signal line VGL. The input signal of the input signal terminal STV is at the logic low level, and the first clock signal provided by the first clock signal line CK is at the logic low level so that the fifth transistor M5 is turned on, the input signal of the input signal terminal STV is written to the third node N3, the first node N1 and the third node N3 both have the logic low-level signal, the second transistor M2 is turned on, the third transistor M3 is turned on, and the first transistor M1 is turned off, the logic high-level second voltage signal transmitted by the second voltage signal line VGH is transmitted to the second node N2, the fourth transistor M4 is turned off, and the logic low-level first voltage signal transmitted by the first voltage signal line VGL is transmitted to the output signal terminal OUT so that the output signal of the output signal terminal OUT is the logic low-level signal.

In the circuit structure of this embodiment, the first capacitor C1 is disposed between the third node N3 and the output signal terminal OUT. When the input signal of the input signal terminal STV jumps from the logic high level to the logic low level and the first clock signal provided by the first clock signal line CK is at the logic low level, the potential of the output signal of the output signal terminal OUT is lowered. Due to the coupling function of the first capacitor C1, the potential of the output signal of the output signal terminal OUT becomes low, and the first capacitor C1 may couple the third node N3 towards a negative potential so that the potential of the third node N3 is lower than $V_{VGL}-|Vth|$, and the third transistor M3 cannot satisfy the condition for entering the cutoff region, thereby ensuring the conduction stability of the third transistor M3. Therefore, in the fifth time period t5, the first voltage signal from the first voltage signal line VGL is directly and stably transmitted to the output signal terminal OUT through the third transistor M3, and the potential of the output signal of the output signal terminal OUT may be directly lowered to the logic low-level first voltage signal so that the problem of lag phenomenon of the waveform of the output signal of the output signal terminal OUT when the input signal of the input signal terminal STV jumps from the logic high level to the logic low level and the first clock signal provided by the first clock signal line CK is at the logic low level can be avoided (as shown in FIG. 10, the waveform of the output signal of the output signal terminal OUT is directly lowered in the fifth time period t5 without the problem of lag phenomenon), and the output signal of the shift register 01 is more stable, which is conducive to further ensuring the display effect of the display panel 000.

The circuit structure of the shift register 01 provided in this embodiment can not only ensure the shift register function of the shift register 01 to provide the control signal for the pixel circuit in the display region AA but also simplify the circuit so that the number of transistors in the driver circuit 00 is reduced as much as possible, which is more conducive to the design of a narrow bezel. Moreover, the design of the first capacitor C1 of the first latch circuit can make the output signal of the shift register 01 more stable, which is conducive to further ensuring the display effect of the display panel 000.

Optionally, in order that the first transistor M1 and the second transistor M2 in this embodiment are not turned on at the same time, when the output signal terminal OUT needs to output the second voltage signal with the potential at logic high level, it may be set that the first transistor M1 is turned on and the second transistor M2 is turned off. When the output signal terminal OUT needs to output the first voltage signal with the potential at logic low level, it may be set that the second transistor M2 is turned on and the first transistor M1 is turned off. The control circuit 20 includes the first transistor M1 and the second transistor M2 with different types of circuit structures so that the output signal of the output signal terminal OUT in each stage of shift register 01 of the driver circuit 00 can include the logic low-level signal and the logic high-level signal separately, and the output signal of the output signal terminal OUT is transmitted as the control signal to the pixel circuit P1 of the pixel unit P in the display region AA, thereby driving and controlling the pixel circuit P1, greatly reducing the number of transistors in the control circuit 20, and ensuring the narrower bezel of the display panel 000.

In this embodiment, it is set that the first transistor M1 and the second transistor M2 are of different types. The first transistor M1 and the second transistor M2 are different n-type and p-type transistors separately. Besides, it is also possible that an active layer of the first transistor M1 includes silicon, and an active layer of the second transistor M2 includes an oxide semiconductor; or the active layer of the first transistor M1 includes the oxide semiconductor, and the active layer of the second transistor M2 includes silicon. That is, it is set that the active layer of the first transistor M1 and the active layer of the second transistor M2 are made of different materials.

The active layer of one of the first transistor M1 and the second transistor M2 includes silicon and the active layer of the other of the first transistor M1 and the second transistor M2 includes the oxide semiconductor. That is, one of the first transistor M1 and the second transistor M2 is a silicon transistor, where silicon may be polysilicon deposited at a low temperature, that is, low-temperature polysilicon (LTPS). The other of the first transistor M1 and the second transistor M2 is an oxide semiconductor transistor, where an oxide semiconductor material is, for example, amorphous indium gallium zinc oxide (IGZO). Since the other transistors in the circuit structure of the shift register 01 are of the same type as the second transistor M2, it may be set in this embodiment that the first transistor M1 is an n-type IGZO transistor, and the second transistor M2 and the other transistors in the circuit structure are all p-type LTPS transistors so that most of the transistors in the circuit structure can be configured to be silicon transistors easier to manufacture, which is conducive to improving manufacturing efficiency. Moreover, most of the transistors in the circuit structure are configured to be the silicon transistors easier to manufacture. Since the silicon transistor has a faster carrier migration rate than the oxide semiconductor transistor, and the silicon transistor is less sensitive to a hydrogen element, water, and oxygen in an external environment than the oxide semiconductor transistor, signal transmission stability of the overall circuit structure can be well ensured. In this embodiment, the respective features and advantages of the silicon transistor and the oxide semiconductor transistor are utilized, thereby ensuring the stability and normal operation of the transistors, facilitating an improvement of the display quality of the display panel 000, and achieving a better display effect. Thus, the product is more competitive.

Figure 22:
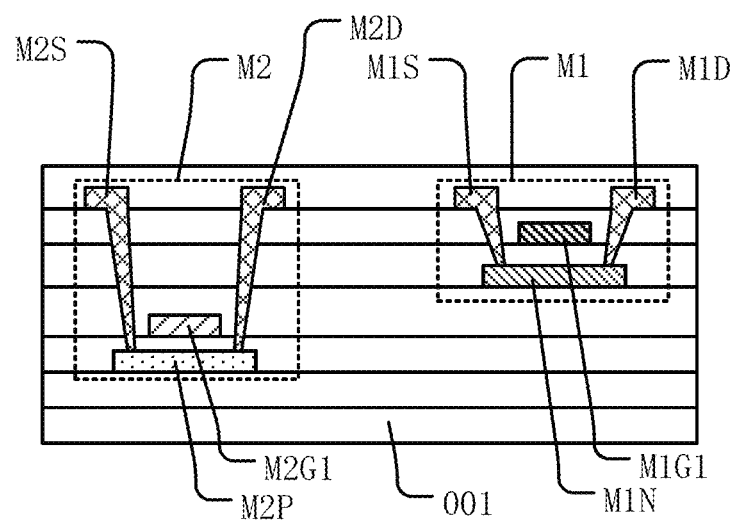
FIG. 22 is a partial sectional view illustrating that a first transistor and a second transistor in FIGS. 8 and 16 are manufactured on a base substrate.

In some optional embodiments, reference is made to FIGS. 1, 8, 16, and FIG. 22. FIG. 22 is a partial sectional view illustrating that a first transistor and a second transistor in FIGS. 8 and 16 are manufactured on a base substrate. In this embodiment, the display panel 000 includes a base substrate 001 on which the driver circuit 00 is formed.

The first transistor M1 includes a first gate M1G1, a first active layer M1N, a first source M1S, and a second drain M1D.

The second transistor M2 includes a second gate M2G1, a second active layer M2P, a second source M2S, and a second drain M2D.

The first active layer M1N includes silicon, and the second active layer M2P includes the oxide semiconductor (that is, the first transistor M1 may be an n-type silicon transistor, and the second transistor M2 may be a p-type oxide semiconductor transistor). Alternatively, the first active layer M1N includes the oxide semiconductor, and the second active layer M2P includes silicon (that is, the first transistor M1 may be an n-type oxide semiconductor transistor, and the second transistor M2 may be a p-type silicon transistor). In this embodiment, FIG. 22 illustrates an example in which the first transistor M1 may be the n-type oxide semiconductor transistor, and the second transistor M2 may be the p-type silicon transistor. When the first active layer M1N and the second active layer M2P are made of different materials, the first active layer M1N and the second active layer M2P are disposed in different films. The first active layer M1N may be disposed on a side of the second active layer M2P facing away from the base substrate 001.

Figure 23:
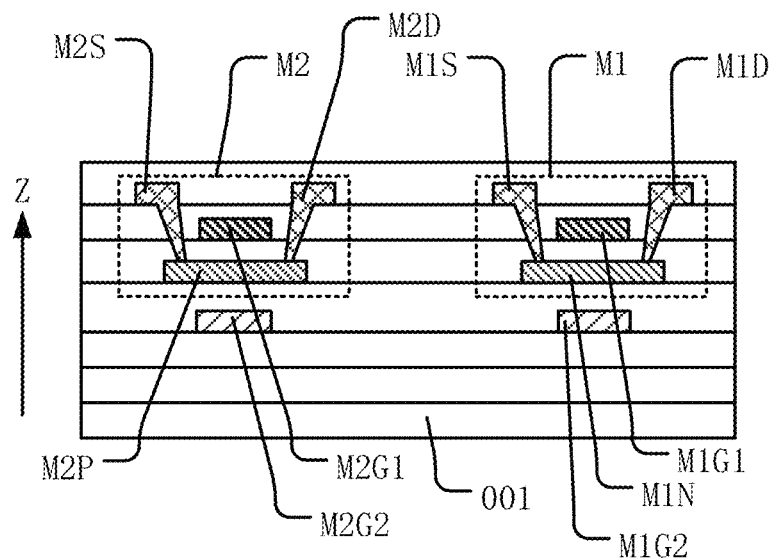
FIG. 23 is another partial sectional view illustrating that a first transistor and a second transistor in FIGS. 8 and 16 are manufactured on a base substrate.

Optionally, reference is made to FIGS. 1, 8, 16, and FIG. 23. FIG. 23 is another partial sectional view illustrating that a first transistor and a second transistor in FIGS. 8 and 16 are manufactured on a base substrate. In this embodiment, the display panel 000 includes the base substrate 001 on which the driver circuit 00 is formed.

The first transistor M1 further includes a third gate M1G2, the first gate M1G1 and the third gate M1G2 are disposed on two sides of the first active layer MIN separately, and the first active layer MIN includes the oxide semiconductor.

Alternatively, the second transistor M2 further includes a fourth gate M2G2, the second gate M2G1 and the fourth gate M2G2 are disposed on two sides of the second active layer M2P separately, and the second active layer M2P includes the oxide semiconductor.

This embodiment illustrates that in the driver circuit 00 of the display panel 000, at least one of the first transistor M1 and the second transistor M2 included in the control circuit 20 is an n-type transistor and the other of the first transistor M1 and the second transistor M2 is a p-type transistor; however, the first active layer MIN of the first transistor M1 includes the oxide semiconductor, and the second active layer M2P of the second transistor M2 includes the oxide semiconductor, that is, the first transistor M1 and the second transistor M2 are each the oxide semiconductor transistor. In this case, each of the first transistor M1 and the second transistor M2 may be a double-gate transistor. The first transistor M1 further includes the third gate M1G2, and the first gate M1G1 and the third gate M1G2 are disposed on the two sides of the first active layer MIN separately along a direction Z perpendicular to a plane where the base substrate 001 is located; and the second transistor M2 further includes the fourth gate M2G2, and the second gate M2G1 and the fourth gate M2G2 are disposed on the two sides of the second active layer M2P separately along the direction Z perpendicular to the plane where the base substrate 001 is located.

In this embodiment, it is set that each of the first transistor M1 and the second transistor M2 is the oxide semiconductor transistor with a double-gate structure, and the oxide semiconductor in the active layer may be indium gallium zinc oxide. Induced charges generated due to a potential between two gates of the oxide semiconductor transistor with the double-gate structure may extend to the active layer of indium gallium zinc oxide, and the overall region of the active layer of indium gallium zinc oxide in a thickness direction thereof can increase a carrier concentration in the first transistor M1 and the second transistor M2 with the double-gate structure (since two gates of a double-gate transistor overlap both upper and lower surfaces of an active portion of the double-gate transistor), thereby effectively increasing the carrier mobility of the first transistor M1 and the second transistor M2 and facilitating an improvement of a drive capability of the first transistor M1 and the second transistor M2. The first transistor M1 includes the first gate M1G1 and the third gate M1G2. Optionally, the third gate M1G2 may be disposed on a side of the first active layer MIN facing the base substrate 001. The second transistor M2 includes the second gate M2G1 and the fourth gate M2G2. Optionally, the fourth gate M2G2 may be disposed on a side of the second active layer M2P facing the base substrate 001. The first gate M1G1 of the first transistor M1 is a primary gate of the first transistor M1, and the third gate M1G2 is a secondary gate of the first transistor M1. The first gate M1G1 of the first transistor M1 may be connected to the third node N3 so that the signal of the third node N3 controls the first transistor M1 to be turned on or off. The third gate M1G2 of the first transistor M1 may be connected to a fixed potential to improve the stability of the oxide semiconductor transistor and may also protect the first active layer MIN. Similarly, the second gate M2G1 of the second transistor M2 is a primary gate of the second transistor M2, and the fourth gate M2G2 is a secondary gate of the second transistor M2. The second gate M2G1 of the second transistor M2 may be connected to the first node N1 so that the signal of the first node N1 controls the second transistor M2 to be turned on or off. The fourth gate M2G2 of the second transistor M2 may be connected to a fixed potential to improve the stability of the oxide semiconductor transistor and may also protect the second active layer M2P.

It is to be understood that only the materials and structures of the first transistor M1 and the second transistor M2 included in the control circuit 20 are described in this embodiment. In some other optional embodiments, the transistors other than the first transistor M1 and the second transistor M2 and included in the driver circuit 00 may be set with reference to the preceding structures and materials. The details are not repeated here in this embodiment and such transistors only need to satisfy that the circuit structure of the shift register 01 outputs the control signal to drive and control the pixel circuit in the display region AA.

Figure 24:
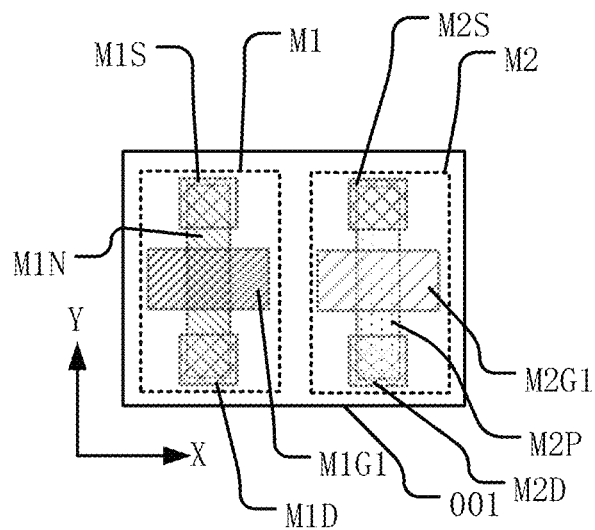
FIG. 24 is a partial plan view illustrating that a first transistor and a second transistor in FIGS. 8 and 16 are manufactured on a base substrate.

In some optional embodiments, reference is made to FIGS. 1, 8, 16, and 24. FIG. 24 is a partial plan view illustrating that a first transistor and a second transistor in FIGS. 8 and 16 are manufactured on a base substrate (it is to be understood that to clearly illustrate the structure of this embodiment, transparency filling is performed in FIG. 24). In this embodiment, multiple stages of shift registers 01 of the driver circuit 00 in the non-display region NA extend along a first direction Y; and the first transistor M1 and the second transistor M2 are arranged along a second direction X, where the first direction Y intersects with the second direction X. Optionally, an example in which the first direction Y and the second direction X are perpendicular to each other is used for illustration in the drawings of this embodiment. The second direction X in this embodiment may be understood as a direction in which one of a scan control line or a light emission control line electrically connected to the pixel circuit P1 in the display region AA extends.

When the circuit structure of the shift register 01 in this embodiment includes the first transistor M1 and the second transistor M2 of different types, it may be set that the first transistor M1 and the second transistor M2 are arranged along the second direction X different from an arrangement direction of the multiple stages of shift registers 01 so that a space occupied by the circuit structures of the shift registers 01 in the first direction Y can be reduced.

Figure 25:
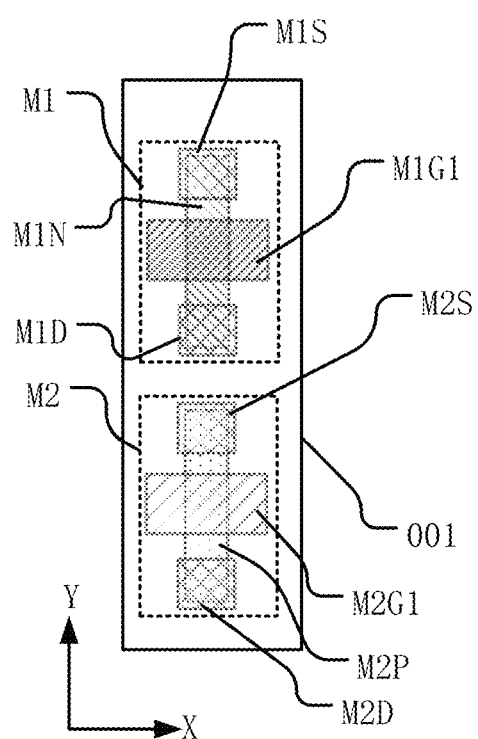
FIG. 25 is another partial plan view illustrating that a first transistor and a second transistor in FIGS. 8 and 16 are manufactured on a base substrate.

Optionally, reference is made to FIGS. 1, 8, 16, and 25. FIG. 25 is another partial plan view illustrating that a first transistor and a second transistor in FIGS. 8 and 16 are manufactured on a base substrate (it is to be understood that to clearly illustrate the structure of this embodiment, transparency filling is performed in FIG. 25). In this embodiment, the multiple stages of shift registers 01 of the driver circuit 00 in the non-display region NA extend along the first direction Y.

The first transistor M1 and the second transistor M2 are arranged along the first direction Y.

This embodiment illustrates that when the driver circuit 00 is disposed in the non-display region NA of the display panel 000 and the circuit structure of the shift register 01 in the driver circuit 00 includes the first transistor M1 and the second transistor M2 of different types, regardless of whether the first active layer M1N of the first transistor M1 and the second active layer M2P of the second transistor M2 are made of the same material, it may be set that in the circuit structure of the same shift register 01, the first transistor M1 and the second transistor M2 are arranged along the arrangement direction of the multiple stages of shift registers 01, that is, the first direction Y so that a space occupied in the second direction X by the circuit structures of the shift registers 01 manufactured on the base substrate 001 can be reduced as much as possible, thereby facilitating a decrease of the width of the non-display region NA in the second direction X and achieving the design of the narrower bezel.

Figure 26:
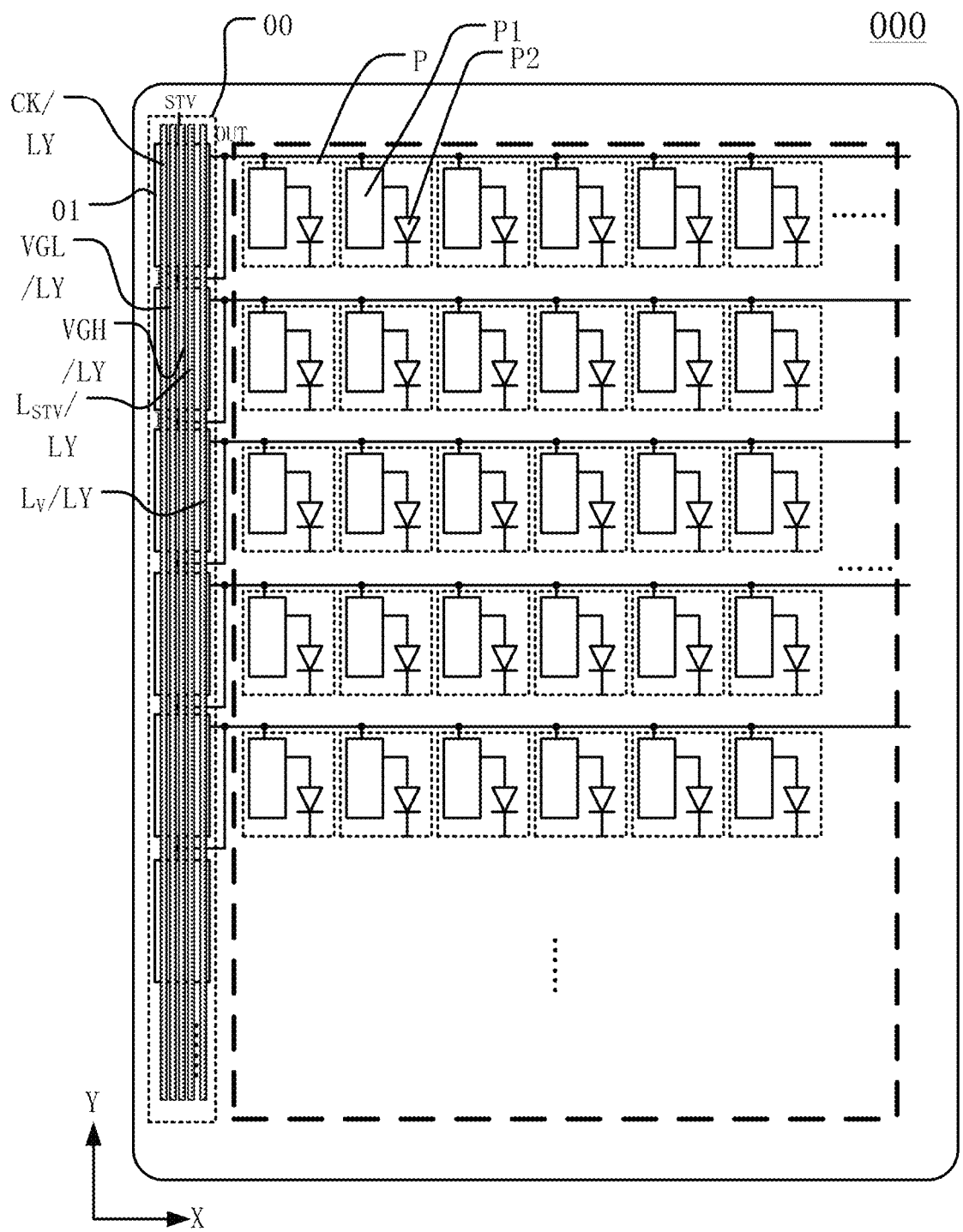
FIG. 26 is another plan view of a display panel according to an embodiment of the present disclosure.
Figure 27:
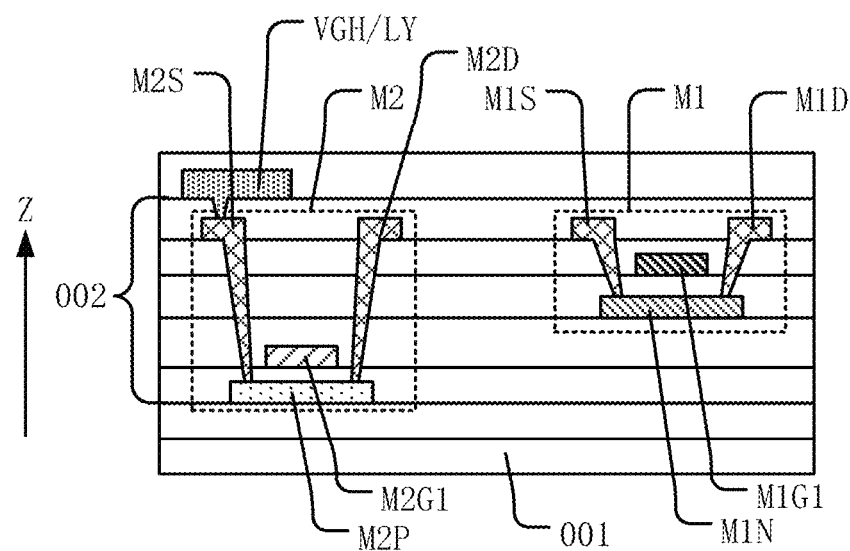
FIG. 27 is a partial sectional view illustrating that a first transistor and a second transistor in FIGS. 26, 8, and 16 are manufactured on a base substrate.

In some optional embodiments, reference is made to FIGS. 8, 16, 26, and 27. FIG. 26 is another plan view of a display panel according to an embodiment of the present disclosure. For the circuit structure of a shift register in FIG. 26, reference may be made to FIGS. 8 and 16. FIG. 27 is a partial sectional view illustrating that a first transistor and a second transistor in FIGS. 26, 8, and 16 are manufactured on a base substrate. The display panel 000 provided in this embodiment includes the base substrate 001 on which the driver circuit 00 is formed.

The display panel 000 further includes an initial input signal line $L_{STV}$ and/or a power signal line $L_V$, where the initial input signal line $L_{STV}$ is configured to provide an initial input signal for the driver circuit 00, that is, the initial input signal line $L_{STV}$ may be connected to the input signal terminal STV of the first-stage shift register 01; and/or the power signal line $L_V$ is configured to provide a power signal for light-emitting elements P2 of the display panel 000.

At least one of the initial input signal line $L_{STV}$, the first clock signal line CK, the first voltage signal line VGL, the second voltage signal line VGH, or the power signal line $L_V$ is a preset signal line LY, and the preset signal line LY is disposed on a side of a film where transistors of the driver circuit 00 are located facing away from the base substrate 001. As shown in FIG. 27, the second source M2S of the second transistor M2 in the driver circuit 00 is connected to the second voltage signal line VGH, the second voltage signal line VGH may serve as the preset signal line LY, and the preset signal line LY (the second voltage signal line VGH) is disposed on the side of the film where the transistors of the driver circuit 00 are located facing away from the base substrate 001.

This embodiment illustrates that a film structure of the display panel 000 may include the base substrate 001 which may serve as a carrier substrate for manufacturing other structures of the display panel 000. At least a transistor array layer 002 may be included on the base substrate 001, and the transistor array layer 002 may be used for manufacturing structures such as the transistors in the driver circuit 00.

The display panel 000 in this embodiment is further provided with the initial input signal line $L_{STV}$ and/or the power signal line $L_V$, where the initial input signal line $L_{STV}$ is configured to provide the initial input signal for the driver circuit 00, that is, the initial input signal line $L_{STV}$ may be connected to the input signal terminal STV of the first-stage shift register 01 to provide the initial shift signal for the driver circuit 00. The power signal line $L_V$ may be understood as a power bus in the non-display region NA of the display panel 000 and is configured to provide the power signal for the light-emitting elements P2 of the pixel units P in the display region AA of the display panel 000.

In this embodiment, it is set that at least one of signal lines in the non-display region NA, such as the initial input signal line $L_{STV}$, the first clock signal line CK, the first voltage signal line VGL, and the second voltage signal line VGH connected to the driver circuit 00, and the power signal line $L_V$ electrically connected to the light-emitting elements P2 of the pixel units P, is named the preset signal line LY, and along the direction Z perpendicular to the plane where the base substrate 001 is located, the preset signal line LY is disposed on the side of the film where the transistors of the driver circuit 00 are located (that is, the transistor array layer 002) facing away from the base substrate 001 so that a film where the preset signal line LY is located is another conductive film outside the transistor array layer 002, thereby preventing the preset signal line LY in the non-display region NA from being manufactured with a film of the transistor array layer 002. Thus, the preset signal line LY in the non-display region NA can be prevented from occupying the width of the non-display region NA in the second direction X, thereby facilitating further narrowing of the bezel.

It is to be understood that the transistor array layer 002, that is, the film where structures such as the transistors in the driver circuit 00 are located, is not specifically limited in this embodiment, and the transistor array layer 002 may include multiple conductive layers, multiple insulating layers, and active layers for manufacturing structures such as gates, sources and drains, and active portions of the transistors.

Figure 28:
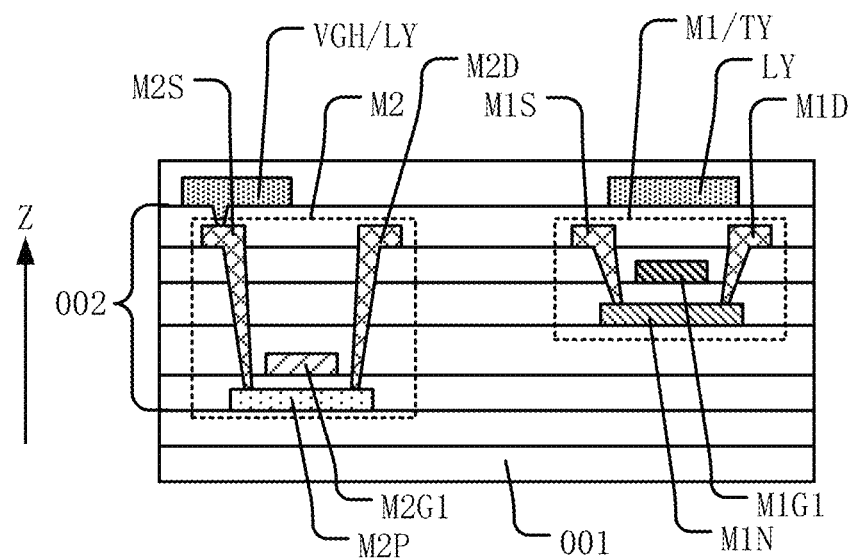
FIG. 28 is another partial sectional view illustrating that a first transistor and a second transistor in FIGS. 26, 8, and 16 are manufactured on a base substrate.

Optionally, reference is made to FIGS. 8, 16, 26, and 28. FIG. 28 is another partial sectional view illustrating that a first transistor and a second transistor in FIGS. 26, 8, and 16 are manufactured on a base substrate. In this embodiment, in the direction Z perpendicular to the plane where the base substrate 001 is located, the preset signal line LY overlaps at least one of the first transistor M1 or the second transistor M2. Further, the n-type channel transistor of the first transistor M1 and the second transistor M2 is a preset transistor TY; and in the direction perpendicular to the plane where the base substrate 001 is located, the preset signal line LY overlaps the preset transistor TY, the n-type channel transistor. For example, in FIG. 28, the first transistor M1 is the n-type channel transistor, and in the direction perpendicular to the plane where the base substrate 001 is located, the preset signal line LY overlaps the preset transistor TY, the n-type channel transistor. The preset signal line LY may be at least one of the signal lines in the non-display region NA, such as the initial input signal line $L_{STV}$, the first clock signal line CK, the first voltage signal line VGL, and the second voltage signal line VGH connected to the driver circuit 00, and the power signal line $L_V$ electrically connected to the light-emitting elements P2 of the pixel units P, which is not limited in this embodiment.

This embodiment illustrates that when the control circuit 20 in the driver circuit 00 includes the first transistor M1 and the second transistor M2 of different types, at least one of the first transistor M1 or the second transistor M2 is the n-type oxide semiconductor transistor, that is, the active layer of at least one of the first transistor M1 or the second transistor M2 is the oxide semiconductor. Since the n-type oxide semiconductor transistor is relatively sensitive to the hydrogen element, water, and oxygen in the external environment, it is set in this embodiment that in the direction Z perpendicular to the plane where the base substrate 001 is located, the preset signal line LY overlaps at least one of the first transistor M1 or the second transistor M2 so that the preset signal line LY shields the n-type oxide semiconductor transistor which is at least one of the first transistor M1 or the second transistor M2, which can not only narrow the bezel but also protect the preset transistor TY, the n-type channel transistor.

Figure 29:
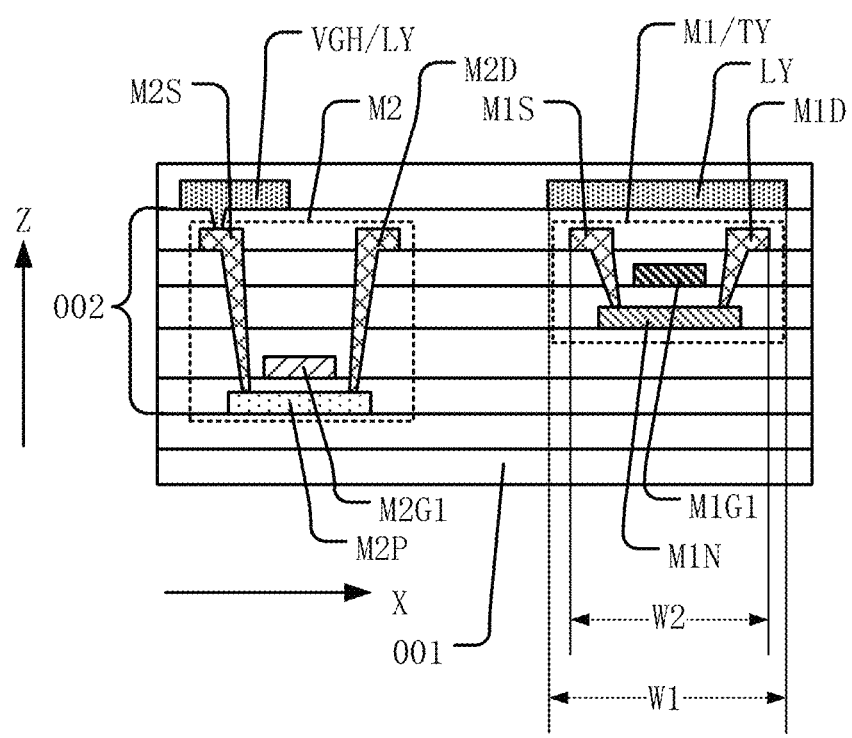
FIG. 29 is another partial sectional view illustrating that a first transistor and a second transistor in FIGS. 26, 8, and 16 are manufactured on a base substrate.

Optionally, reference is made to FIGS. 8, 16, 26, and 29. FIG. 29 is another partial sectional view illustrating that a first transistor and a second transistor in FIGS. 26, 8, and 16 are manufactured on a base substrate. In this embodiment, the multiple stages of shift registers 01 of the driver circuit 00 extend and are arranged along the first direction Y.

The width of the preset signal line LY along the second direction X is W1, and the width of the preset transistor TY along the second direction X is W2, where the first direction Y intersects with the second direction X. An example in which the first direction Y and the second direction X are perpendicular to each other is used for illustration in the drawings of this embodiment. The width W1 of the preset signal line LY along the second direction X is greater than the width W2 of the preset transistor TY along the second direction X so that the width W1 of the preset signal line LY along the second direction X can be as wide as possible, which is conducive to reducing the resistance of the preset signal line LY and can improve the shielding and protection effect of the preset signal line LY on the preset transistor TY.

Figure 30:
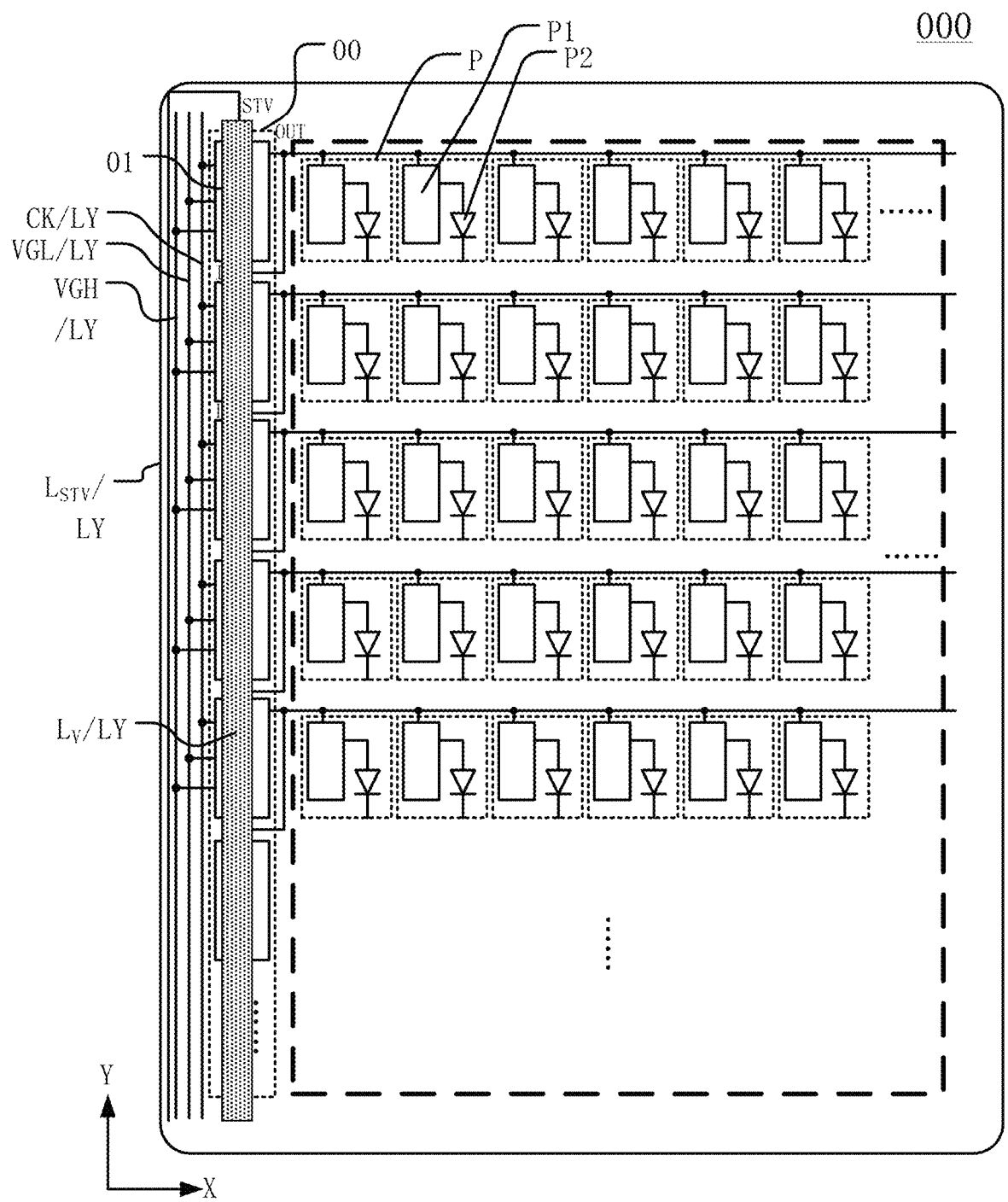
FIG. 30 is another plan view of a display panel according to an embodiment of the present disclosure.

Further, reference is made to FIGS. 8, 16, 29, and 30. FIG. 30 is another plan view of a display panel according to an embodiment of the present disclosure. In this embodiment, the preset signal line LY may be a wire whose width in the second direction X is not exactly the same. For example, if the space allows, the preset signal line LY may be as wide as possible in the second direction X, and in a limited space, the width of the preset signal line LY in the second direction X may be reduced to avoid other conductive structures. It is set in this embodiment that the preset signal line LY completely covers the preset transistor TY at least in the second direction X so that the width W1 of the preset signal line LY is as wide as possible at least in a region where the preset transistor TY is located to completely cover the preset transistor TY, thereby ensuring the protection effect on the preset transistor TY, the n-type channel transistor. Moreover, the preset signal line LY is widened as much as possible so that the resistance of the preset signal line LY can be reduced, thereby facilitating signal transmission stability.

Figure 31:
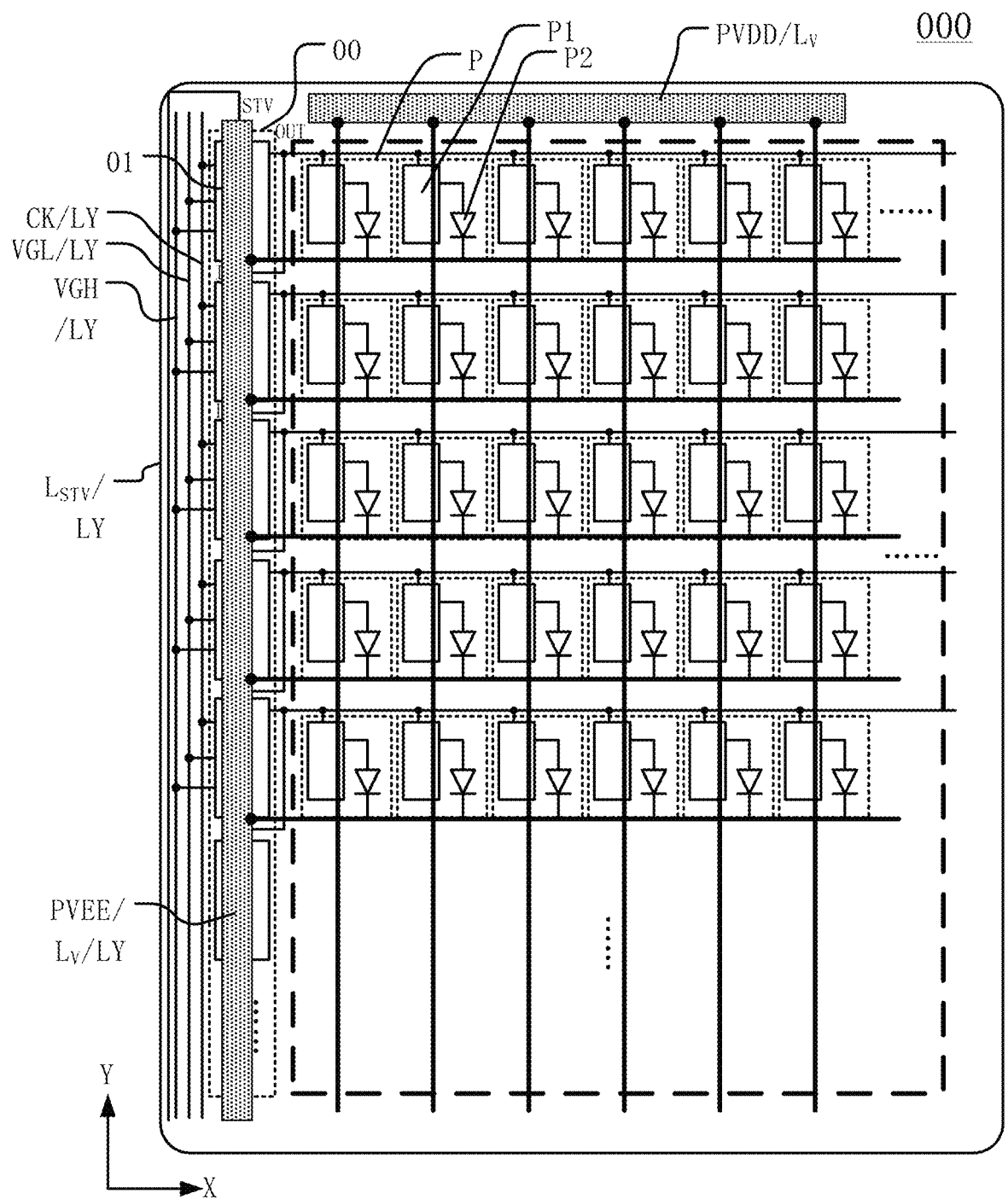
FIG. 31 is another plan view of a display panel according to an embodiment of the present disclosure.
Figure 32:
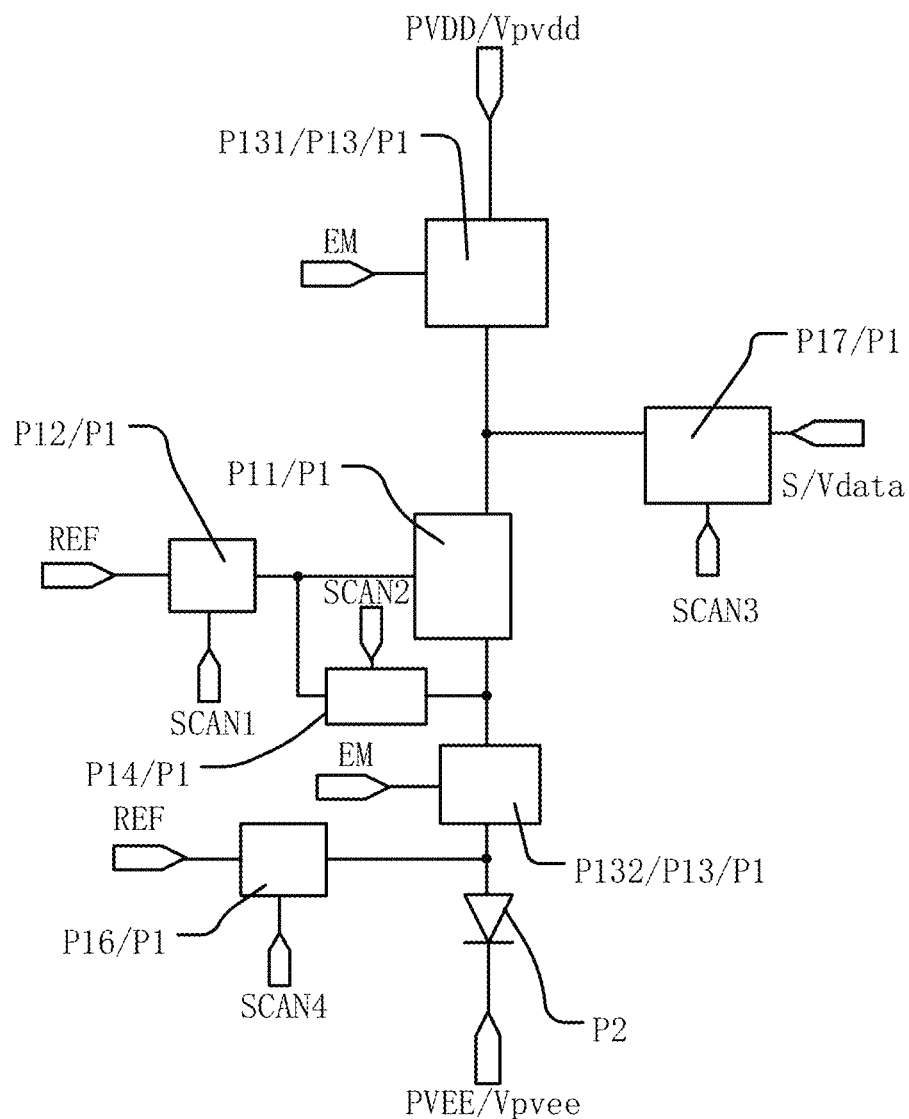

In some optional embodiments, reference is made to FIGS. 8, 16, 31, and 32. FIG. 31 is another plan view of a display panel according to an embodiment of the present disclosure. FIG. 32 is a schematic diagram of an electrical connection structure of a pixel unit in FIG. 31. It is to be understood that the connection structure of the pixel circuit P1 of the pixel unit P in FIG. 32 in this embodiment is merely an example, and in a specific implementation, the electrical connection structure of the pixel circuit P1 includes, but is not limited to, such connection structure. The pixel unit P of the display panel 000 includes the pixel circuit P1, and the pixel circuit P1 includes a drive circuit P11, a reset circuit P12, a light emission control circuit P13, and a compensation circuit P14. Optionally, the pixel circuit P1 may further include an anode initialization circuit P16 and a data write circuit P17. In some other optional embodiments, the pixel circuit P1 may further include a bias circuit (not shown in the drawings). The reset circuit P12 is connected to a control terminal of the drive circuit P11 and configured to provide a reset signal REF for the drive circuit P11. The light emission control circuit P13 may include a first light emission control circuit P131 and a second light emission control circuit P132, where the first light emission control circuit P131 is connected between a first power signal line PVDD and a first terminal of the drive circuit P11, and the second light emission control circuit P132 is connected between a second terminal of the drive circuit P11 and the light-emitting element P2 of the display panel 000. The compensation circuit P14 is connected between the second terminal of the drive circuit P11 and the control terminal of the drive circuit P11. The reset circuit P12 and the compensation circuit P14 may include n-type oxide semiconductor transistors, and the other circuits may include p-type silicon transistors. The working principle of the pixel circuit P1 is not described in detail in this embodiment and may specifically be understood with reference to the working principle of the display panel 000 in the related art.

It is set in this embodiment that the pixel circuit P1 includes a preset circuit PY, where the preset circuit is at least one of the reset circuit P12, the light emission control circuit P13, or the compensation circuit P14. That is, the driver circuit 00 in the non-display region NA is configured to provide the control signal for the preset circuit PY. When the preset circuit is at least one of the reset circuit P12, the light emission control circuit P13, or the compensation circuit P14, the driver circuit 00 is configured to provide a scan control signal (for example, a scan control signal SCAN1 connected to a control terminal of the reset circuit P12 or a scan control signal SCAN2 connected to a control terminal of the compensation circuit P14 in FIG. 32) for the preset circuit PY (for example, the reset circuit P12 or the compensation circuit P14) or provide a light emission control signal (for example, a light emission control signal EM connected to a control terminal of the light emission control circuit P13 in FIG. 32) for the preset circuit PY (for example, the light emission control circuit P13). The driver circuit 00 provides a drive signal required for controlling the pixel circuit P1 to control the preset circuit PY in the pixel circuit P1 to be turned on or off, and the pixel circuit P1 controls the light-emitting element P2 to emit light.

It is to be understood that if the space of the display panel 000 allows, it may also be set that the preset circuit PY is any one of the anode initialization circuits P16, the data write circuit P17, or the bias circuit (for example, a scan control signal SCAN4 connected to a control terminal of the anode initialization circuit P16 or a scan control signal SCAN3 connected to a control terminal of the data write circuit P17 in FIG. 32). The preset circuit PY is not specifically limited in this embodiment and only needs to satisfy that the driver circuit 00 can provide a required drive control signal for the pixel circuit P1 in the display region AA so that the pixel circuit P1 controls the light-emitting element P2 to emit light, thereby implementing the display function of the display panel 000.

In this embodiment, the pixel unit P receives a first power signal Vpvdd and a second power signal Vpvee, where the first power signal Vpvdd has a greater voltage value than the second power signal Vpvee; and the first power signal line PVDD provides the first power signal Vpvdd, and a second power signal line PVEE provides the second power signal Vpvee. The power signal line $L_Y$ in the non-display region NA is configured to transmit the second power signal Vpvee, the first power signal Vpvdd may be an anode voltage signal, and the second power signal Vpvee may be a cathode voltage signal. That is, the preset signal line LY disposed in the non-display region NA and overlapping the preset transistor TY may be the second power signal line PVEE. Specifically, the second power signal line PVEE in the non-display region NA is a second power bus, and the second power bus for transmitting the second power signal Vpvee is generally manufactured in the non-display region NA, the bezel region. The driver circuit 00 is also generally disposed in the non-display region NA. To sufficiently save the area of the bezel, it may be set that at least part of the second power signal line PVEE used as the second power bus and in the non-display region NA overlaps the driver circuit 00 so that the bezel of the panel can be saved, and display with the narrow bezel can be achieved.

In the display panel 000 provided in this embodiment, the driver circuit 00 provides the drive signal for the pixel circuit P1, and the pixel circuit P1 provides the drive current for the light-emitting element P2 of the display panel 000. The first power signal line PVDD is connected to the pixel circuit P1, and the pixel circuit P1 is connected to an anode of the light-emitting element P2 to transmit the first power signal Vpvdd to the anode of the light-emitting element P2, and the second power signal line PVEE is connected to a cathode of the light-emitting element P2 to transmit the second power signal Vpvee to the cathode of the light-emitting element P2, so as to drive the light-emitting element P2 to emit light. The second power signal line PVEE in the non-display region NA is used as the preset signal line LY, and the second power signal line PVEE at least partially overlaps the driver circuit 00 so that an area occupied by the bezel region can be effectively reduced, thereby reducing the width of the bezel of the display panel 000.

Figure 33:
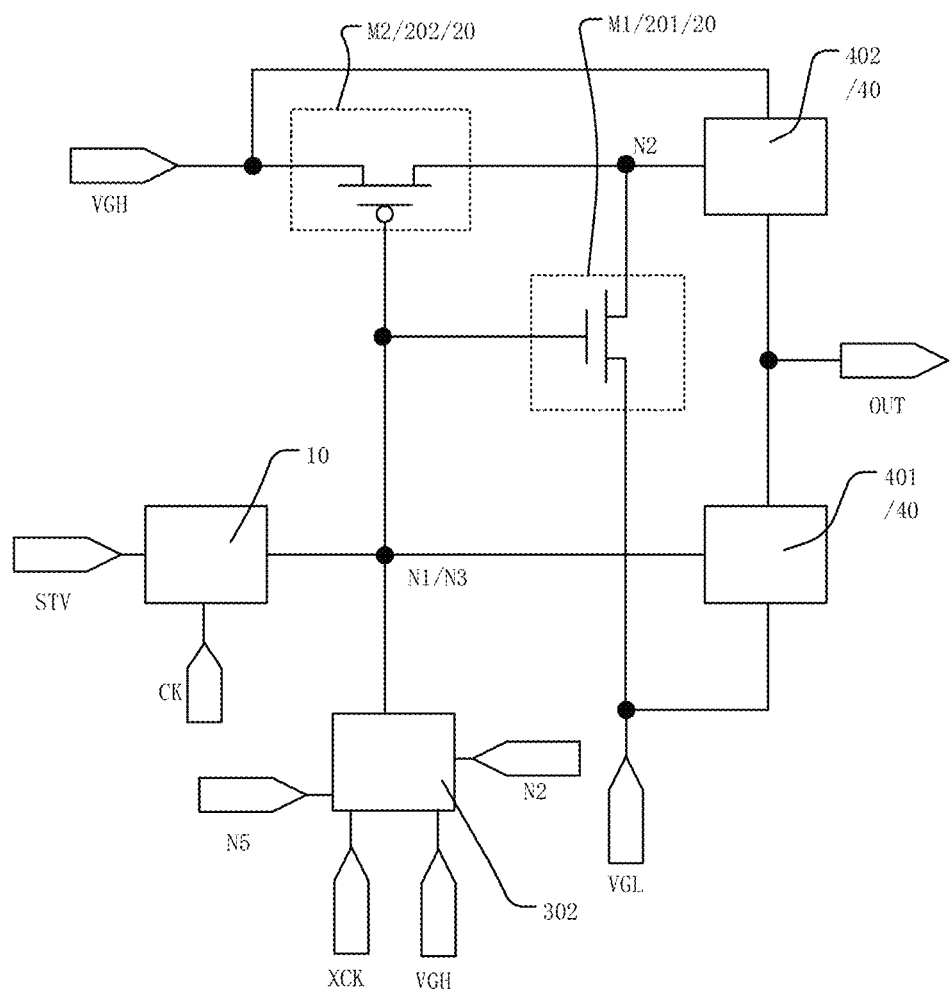
FIG. 33 is a schematic diagram of another module connection of a shift register in FIG. 1.
Figure 34:
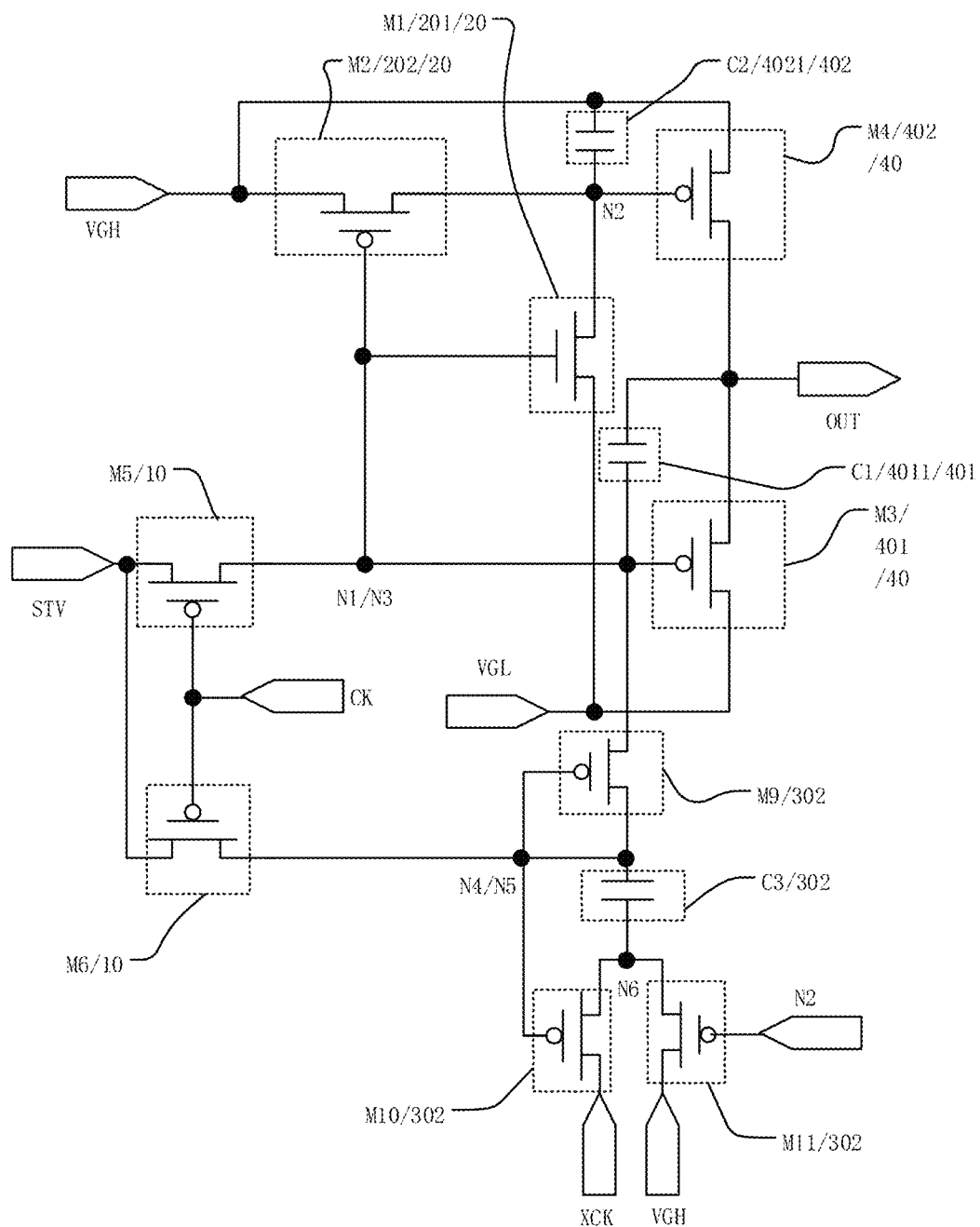
FIG. 34 is a structure diagram of a circuit connection of the shift register in FIG. 33.
Figure 35:
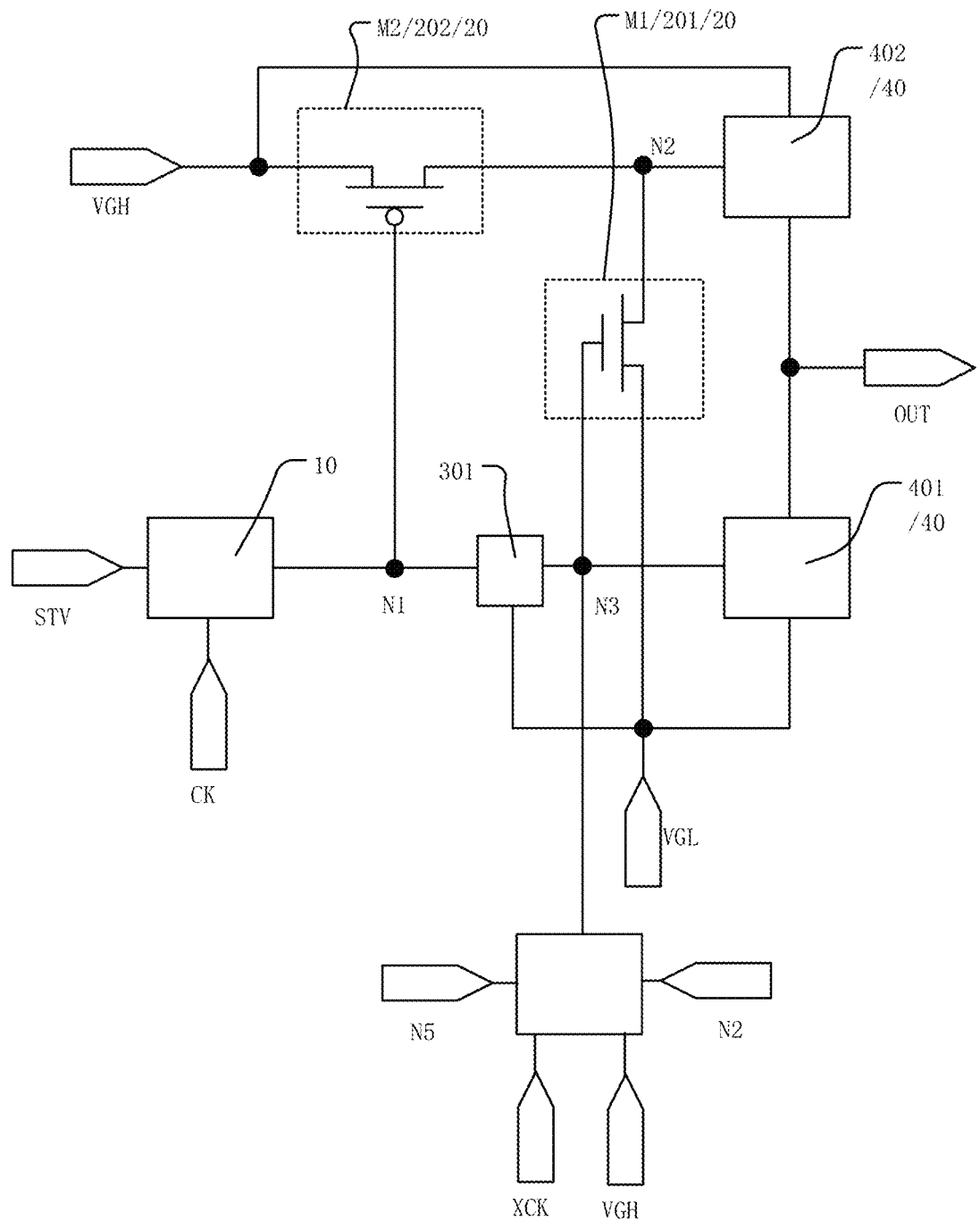
FIG. 35 is a schematic diagram of another module connection of a shift register in FIG. 1.
Figure 36:
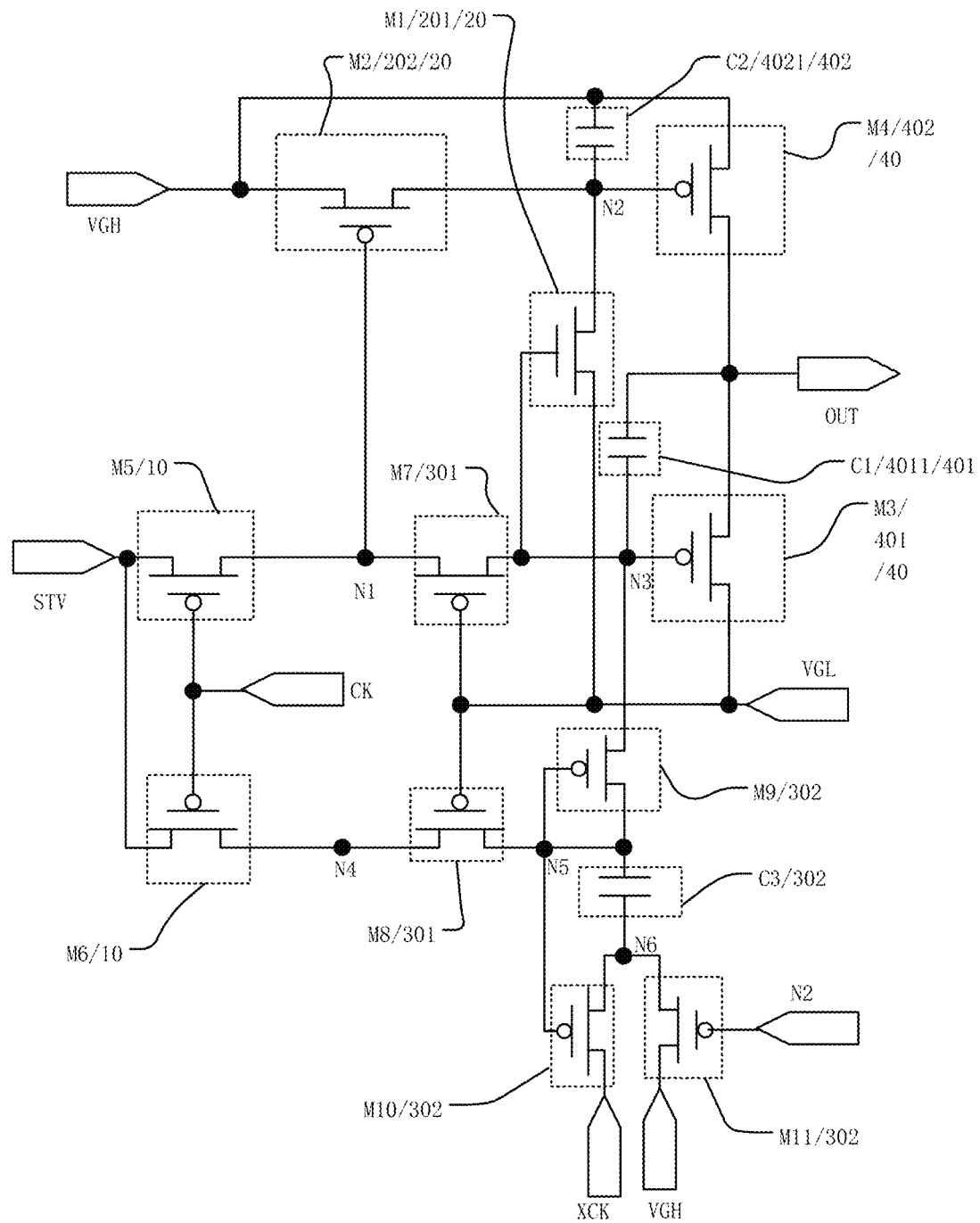
FIG. 36 is a structure diagram of a circuit connection of the shift register in FIG. 35.

In some optional embodiments, reference is made to FIGS. 1, 33, 34, 35, and 36. FIG. 33 is a schematic diagram of another circuit connection of a shift register in FIG. 1. FIG. 34 is a structure diagram of a circuit connection of the shift register in FIG. 33. FIG. 35 is a schematic diagram of another circuit connection of a shift register in FIG. 1. FIG. 36 is a structure diagram of a circuit connection of the shift register in FIG. 35. The first node N1 and the third node N3 are directly connected in FIGS. 33 and 34. The first node N1 and the third node N3 are connected through the first adjustment circuit 301 in FIGS. 35 and 36.

As shown in FIGS. 1, 33, and 35, the shift register 01 further includes a second adjustment circuit 302. The second adjustment circuit 302 is connected to at least a fifth node N5 and the third node N3, and the second adjustment circuit 302 is further connected to the second voltage signal line VGH, a second clock signal line XCK, and the second node N2. A second clock signal provided by the second clock signal line XCK is opposite to the first clock signal provided by the first clock signal line CK. The second adjustment circuit 302 is configured to further optimize the potential of the third node N3 under the signal control of the second voltage signal line VGH, the second clock signal line XCK, the second node N2, and the fifth node N5 so that the potential of the third node N3 can ensure that the first output circuit 401 is completely on, and the first voltage signal can be directly transmitted to the output signal terminal OUT, thereby avoiding the problem of lag phenomenon due to a failure of the output signal of the output signal terminal OUT to directly change to the first voltage signal since the first output circuit 401 is insufficiently on and facilitating the optimization of the stability of the output signal of the output signal terminal OUT.

Specifically, as shown in FIGS. 33 and 34, the input circuit 10 includes the fifth transistor M5 and a sixth transistor M6. The first terminal of the fifth transistor M5 is connected to the input signal terminal STV, the second terminal of the fifth transistor M5 is connected to the first node N1, and the control terminal of the fifth transistor M5 is connected to the first clock signal line CK. A first terminal of the sixth transistor M6 is connected to the input signal terminal STV, a second terminal of the sixth transistor M6 is connected to a fourth node N4, and a control terminal of the sixth transistor M6 is connected to the first clock signal line CK. The fifth transistor M5 and the sixth transistor M6 of the input circuit 10 form parallel structures controlled by the same first clock signal line CK so that the potential transmitted by the input circuit 10 to the first node N1 can be more stable, facilitating an improvement of the driving stability of the whole circuit of the shift register.

The second adjustment circuit 302 includes a ninth transistor M9, a tenth transistor M10, an eleventh transistor M11, and a third capacitor C3. A first terminal and a control terminal of the ninth transistor M9 are connected to the fifth node N5 (where the fourth node N4 and the fifth node N5 are directly connected), and a second terminal of the ninth transistor M9 is connected to the third node N3. A first terminal of the tenth transistor M10 is connected to the second clock signal line XCK, a second terminal of the tenth transistor M10 is connected to a sixth node N6, and a control terminal of the tenth transistor M10 is connected to the fifth node N5 (that is, the fourth node N4). A first terminal of the eleventh transistor M11 is connected to the second voltage signal line VGH, a second terminal of the eleventh transistor M11 is connected to the sixth node N6, and a control terminal of the eleventh transistor M11 is connected to the second node N2. A first plate of the third capacitor C3 is connected to the fifth node N5 (that is, the fourth node N4), and a second plate of the third capacitor C3 is connected to the sixth node N6.

As shown in FIGS. 35 and 36, the input circuit 10 includes the fifth transistor M5 and the sixth transistor M6. The first terminal of the fifth transistor M5 is connected to the input signal terminal STV, the second terminal of the fifth transistor M5 is connected to the first node N1, and the control terminal of the fifth transistor M5 is connected to the first clock signal line CK. The first terminal of the sixth transistor M6 is connected to the input signal terminal STV, the second terminal of the sixth transistor M6 is connected to the fourth node N4, and the control terminal of the sixth transistor M6 is connected to the first clock signal line CK. The fifth transistor M5 and the sixth transistor M6 of the input circuit 10 form the parallel structures controlled by the same first clock signal line CK so that the potential transmitted by the input circuit 10 to the first node N1 and the fourth node N4 can be more stable, facilitating an improvement of the driving stability of the whole circuit of the shift register.

The first adjustment circuit 301 includes the seventh transistor M7 and an eighth transistor M8. The first terminal of the seventh transistor M7 (which may be the source of the seventh transistor M7) is connected to the first node N1, the second terminal of the seventh transistor M7 (which may be the drain of the seventh transistor M7) is connected to the third node N3, and the control terminal of the seventh transistor M7 (which may be the gate of the seventh transistor M7) is connected to the first voltage signal line VGL. The seventh transistor M7 receives at least the signal of the first node N1 and the first voltage signal provided by the first voltage signal line VGL and controls the signal of the third node N3. A first terminal of the eighth transistor M8 is connected to the fourth node N4, a second terminal of the eighth transistor M8 is connected to the fifth node N5, and a control terminal of the eighth transistor M8 is connected to the first voltage signal line VGL. The eighth transistor M8 receives at least a signal of the fourth node N4 and the first voltage signal provided by the first voltage signal line VGL and controls a signal of the fifth node N5. The seventh transistor M7 and the eighth transistor M8 of the first adjustment circuit 301 form parallel structures controlled by the same first voltage signal line VGL so that the potential transmitted by the first adjustment circuit 301 to the third node N3 and the fifth node N5 can be more stable, facilitating an improvement of the driving stability of the whole circuit of the shift register.

The second adjustment circuit 302 includes the ninth transistor M9, the tenth transistor M10, the eleventh transistor M11, and the third capacitor C3. The first terminal and the control terminal of the ninth transistor M9 are connected to the fifth node N5 (where the fourth node N4 and the fifth node N5 are connected through the eighth transistor M8), and the second terminal of the ninth transistor M9 is connected to the third node N3. The first terminal of the tenth transistor M10 is connected to the second clock signal line XCK, the second terminal of the tenth transistor M10 is connected to the sixth node N6, and the control terminal of the tenth transistor M10 is connected to the fifth node N5. The first terminal of the eleventh transistor M11 is connected to the second voltage signal line VGH, the second terminal of the eleventh transistor M11 is connected to the sixth node N6, and the control terminal of the eleventh transistor M11 is connected to the second node N2. The first plate of the third capacitor C3 is connected to the fifth node N5, and the second plate of the third capacitor C3 is connected to the sixth node N6.

The second adjustment circuit 302 is disposed in this embodiment. When the second clock signal provided by the second clock signal line XCK is the logic low-level signal, the fifth node N5 controls the first terminal and the second terminal of the tenth transistor M10 to be conducted, and the sixth node N6, that is, the second plate of the third capacitor C3, is coupled to the logic low-level signal, the first plate (the fifth node N5) of the third capacitor C3 is coupled to the logic low-level signal, and the signal of the fifth node N5 controls the first terminal and the second terminal of the ninth transistor M9 to be conducted to control the potential of the third node N3 to be lowered. Therefore, the connection structure of the transistors and the third capacitor C3 included in the second adjustment circuit 302 in this embodiment can further optimize the potential of the third node N3 so that the potential of the third node N3 is as low as possible, thereby ensuring that the third transistor M3 is completely on. The logic low-level first voltage signal can be directly outputted from the output signal terminal OUT, thereby improving the phenomenon of tailing.

Figure 37:
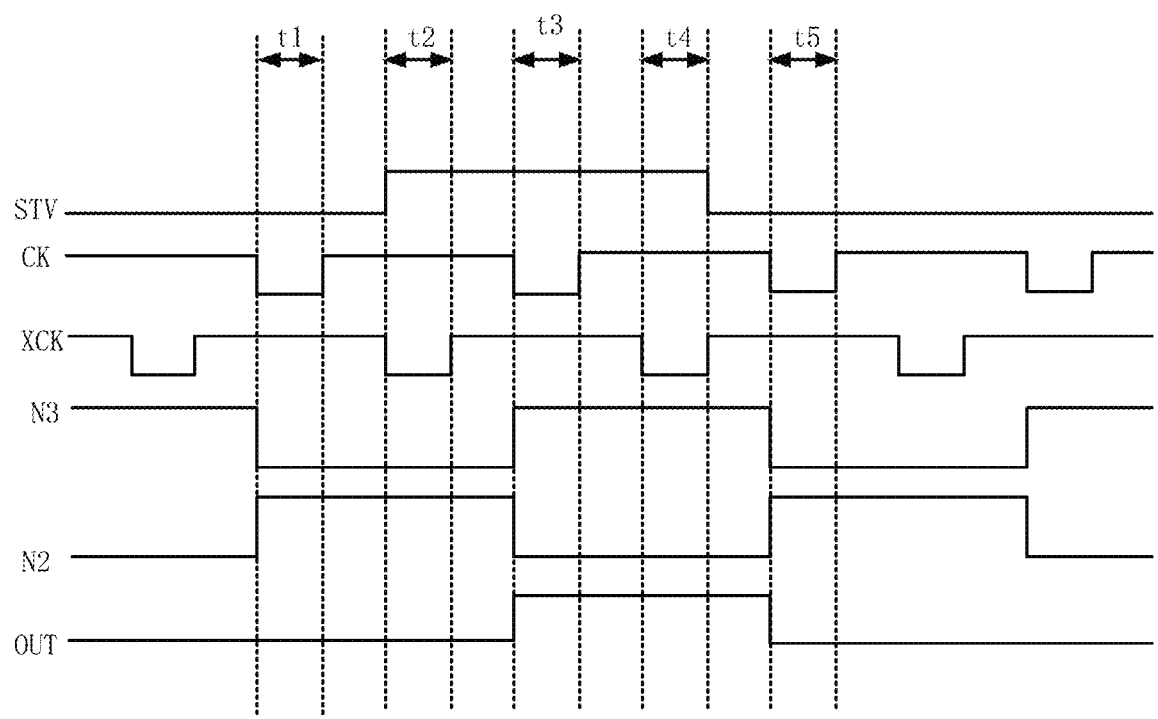
FIG. 37 is a timing graph of a circuit of the shift register in FIG. 36.

Optionally, reference is made to FIGS. 36 and 37. FIG. 37 is a timing graph of a circuit of the shift register in FIG. 36. The circuit structure of the shift register 01 shown in FIG. 36 is used as an example to describe the operation of the shift register 01.

Figure 38:
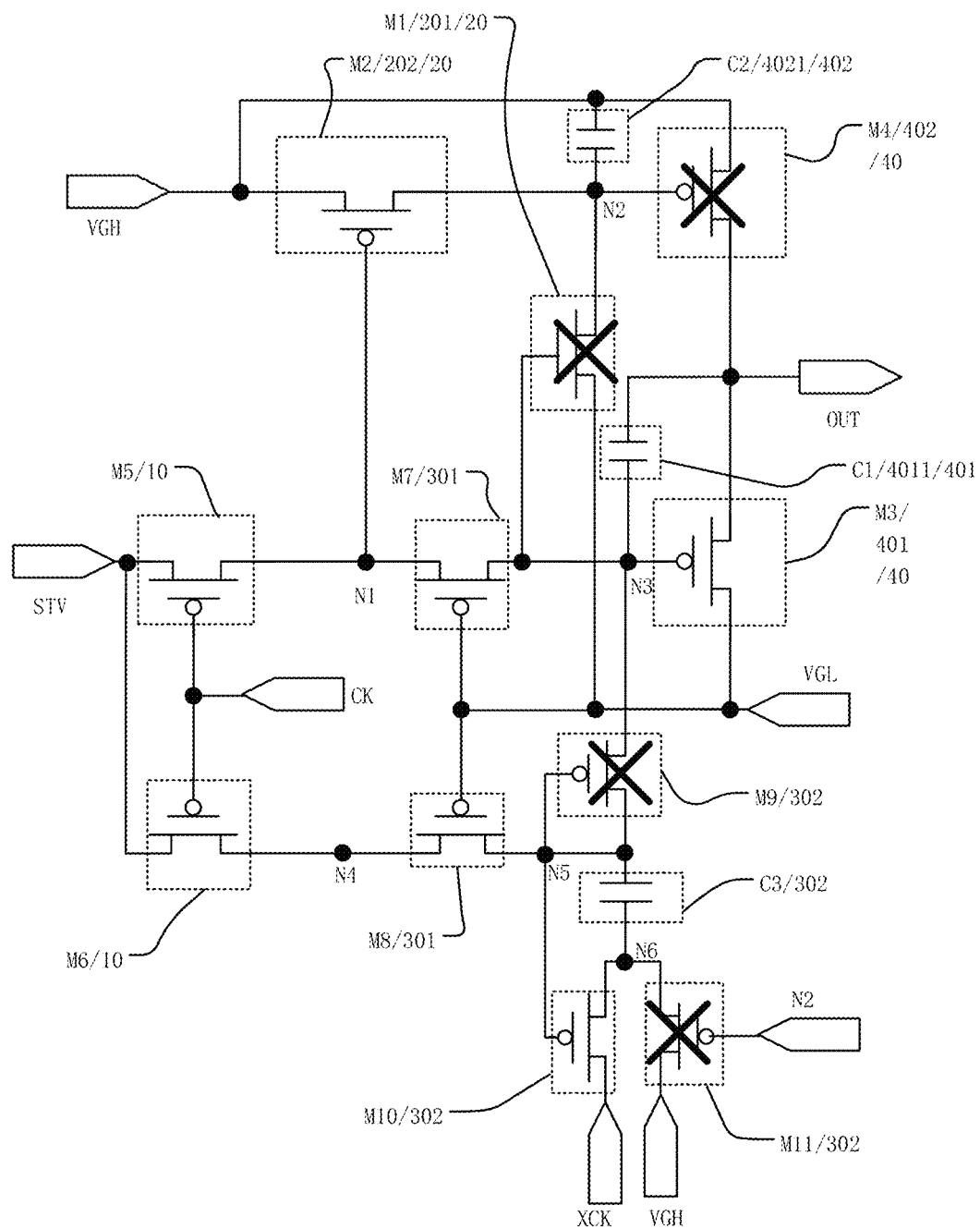
FIG. 38 is a diagram of on states of transistors in the circuit structure in FIG. 36 in a first time period.

In the first time period t1, as shown in FIGS. 37 and 38 (FIG. 38 is a diagram of on states of transistors in the circuit structure in FIG. 36 in a first time period (in the figure, "x" on a transistor indicates that the transistor is off, and no sign indicates that the transistor is on)), the seventh transistor M7 and the eighth transistor M8 remain on under the first voltage signal provided by the first voltage signal line VGL. The input signal of the input signal terminal STV is at the logic low level, the first clock signal provided by the first clock signal line CK is at the logic low level, and the second clock signal provided by the second clock signal line XCK is at the logic high level so that the fifth transistor M5 and the sixth transistor M6 are turned on, the first node N1 and the fourth node N4 both have the logic low level, the third node N3 and the fifth node N5 both have the logic low level, the second transistor M2 is turned on, the third transistor M3 is turned on, and the first transistor M1 is turned off, the logic high-level second voltage signal transmitted by the second voltage signal line VGH is transmitted to the second node N2, the fourth transistor M4 is turned off, and the logic low-level first voltage signal transmitted by the first voltage signal line VGL is transmitted to the output signal terminal OUT so that the output signal of the output signal terminal OUT is the logic low-level signal. In this case, since the second node N2 has a potential at logic high level, the eleventh transistor M11 is turned off. The fifth node N5 has a potential at logic low level due to an effect of the fourth node N4 so that the tenth transistor M10 is turned on. When the second clock signal at the logic high level is transmitted to the sixth node N6 through the tenth transistor M10, a potential of the fifth node N5 is increased due to a coupling function of the third capacitor C3, the ninth transistor M9 is turned off, and the potential of the third node N3 is not affected by the potential of the fifth node N5 so that the potential of the third node N3 remains low, the third transistor M3 remains on, and thus the output signal of the output signal terminal OUT remains to be the logic low-level signal.

Figure 39:
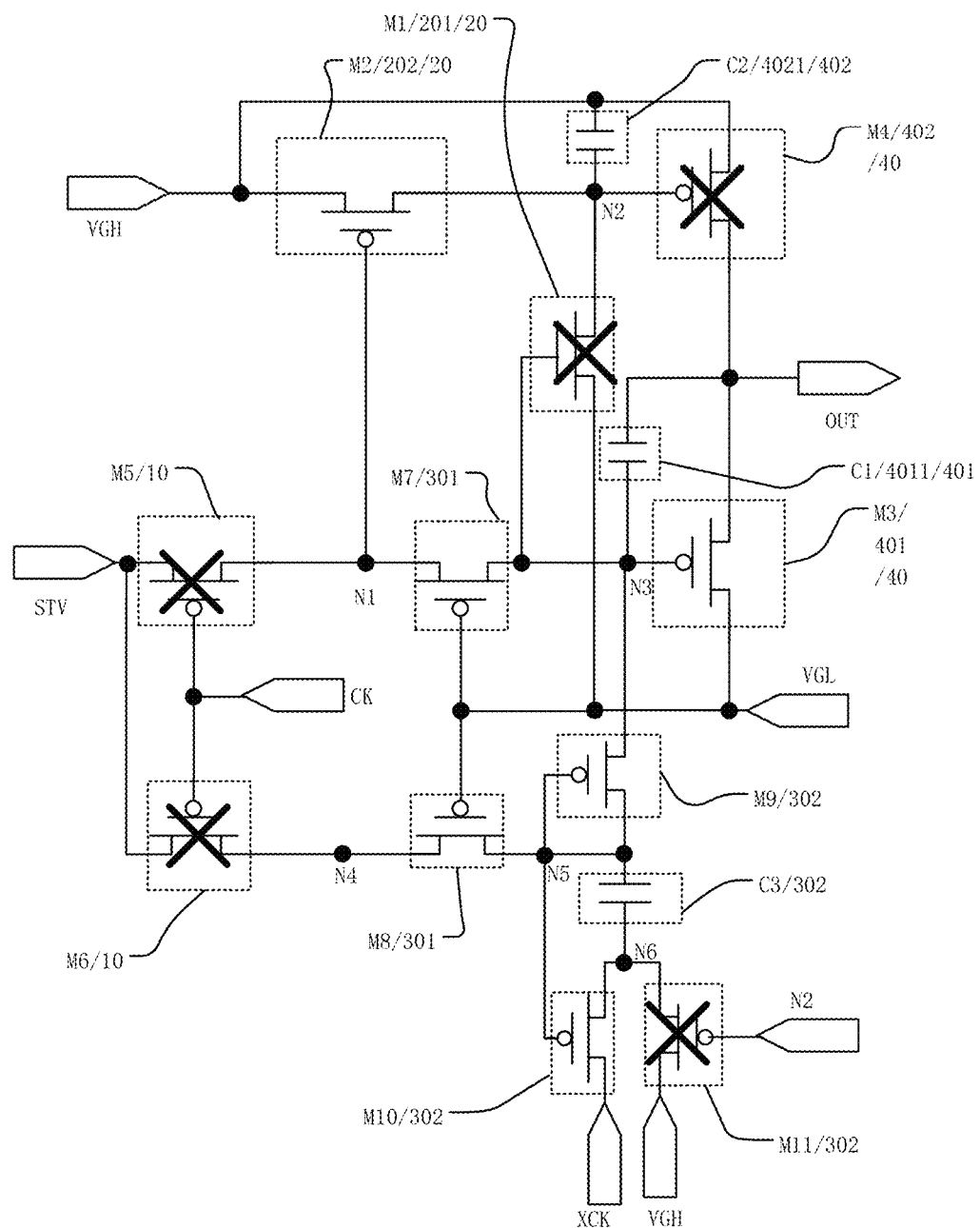
FIG. 39 is a diagram of on states of transistors in the circuit structure in FIG. 36 in a second time period.

In the second time period t2, as shown in FIGS. 37 and 39 (FIG. 39 is a diagram of on states of transistors in the circuit structure in FIG. 36 in a second time period (in the figure, "x" on a transistor indicates that the transistor is off, and no sign indicates that the transistor is on)), the seventh transistor M7 and the eighth transistor M8 remain on under the first voltage signal provided by the first voltage signal line VGL. The input signal of the input signal terminal STV is at the logic high level, the first clock signal provided by the first clock signal line CK is at the logic high level, and the second clock signal provided by the second clock signal line XCK is at the logic low level so that the fifth transistor M5 and the sixth transistor M6 are turned off, the first node N1 and the fourth node N4 still maintain the logic low-level signal due to the seventh transistor M7 and the eighth transistor M8 being on, the second transistor M2 is turned on and the first transistor M1 is turned off, the third node N3 has a potential at logic low level, the transistor M3 remains on, and the logic low-level first voltage signal transmitted by the first voltage signal line VGL is transmitted to the output signal terminal OUT so that the output signal of the output signal terminal OUT is the logic low-level signal. Since the second transistor M2 remains on, the logic high-level second voltage signal transmitted by the second voltage signal line VGH is transmitted to the second node N2, the fourth transistor M4 is still turned off, and the second capacitor C2 may stabilize the potential of the second node N2 to be the logic high-level signal, thereby ensuring that the fourth transistor M4 remains off and preventing the logic high-level second voltage signal from being transmitted to the output signal terminal OUT and affecting the outputted logic low-level signal. In this case, since the second node N2 has a potential at logic high level, the eleventh transistor M11 is still turned off. The fifth node N5 has a potential at logic low level due to the effect of the fourth node N4 so that the tenth transistor M10 is turned on. When the second clock signal at the logic low level is transmitted to the sixth node N6 through the tenth transistor M10, the potential of the fifth node N5 is lowered due to the coupling function of the third capacitor C3, the ninth transistor M9 is turned on, and the potential of the third node N3 is affected by the second clock signal at the logic low level and at the fifth node N5 so that the potential of the third node N3 remains low, the third transistor M3 remains on, and thus the output signal of the output signal terminal OUT remains to be the logic low-level signal. Moreover, the seventh transistor M7 and the eighth transistor M8 are disposed in this embodiment so that the potential of the third node N3 can be as low as possible. The potential at logic low level of the third node N3 is not affected by the potential of the first node N1, and the potential at logic low level of the third node N3 can be lowered as much as possible. Thus, the conduction effect of the third transistor M3 is ensured so that the third transistor M3 is completely on, and the output signal of the output signal terminal OUT remains to be the first voltage signal, the logic low-level signal.

Figure 40:
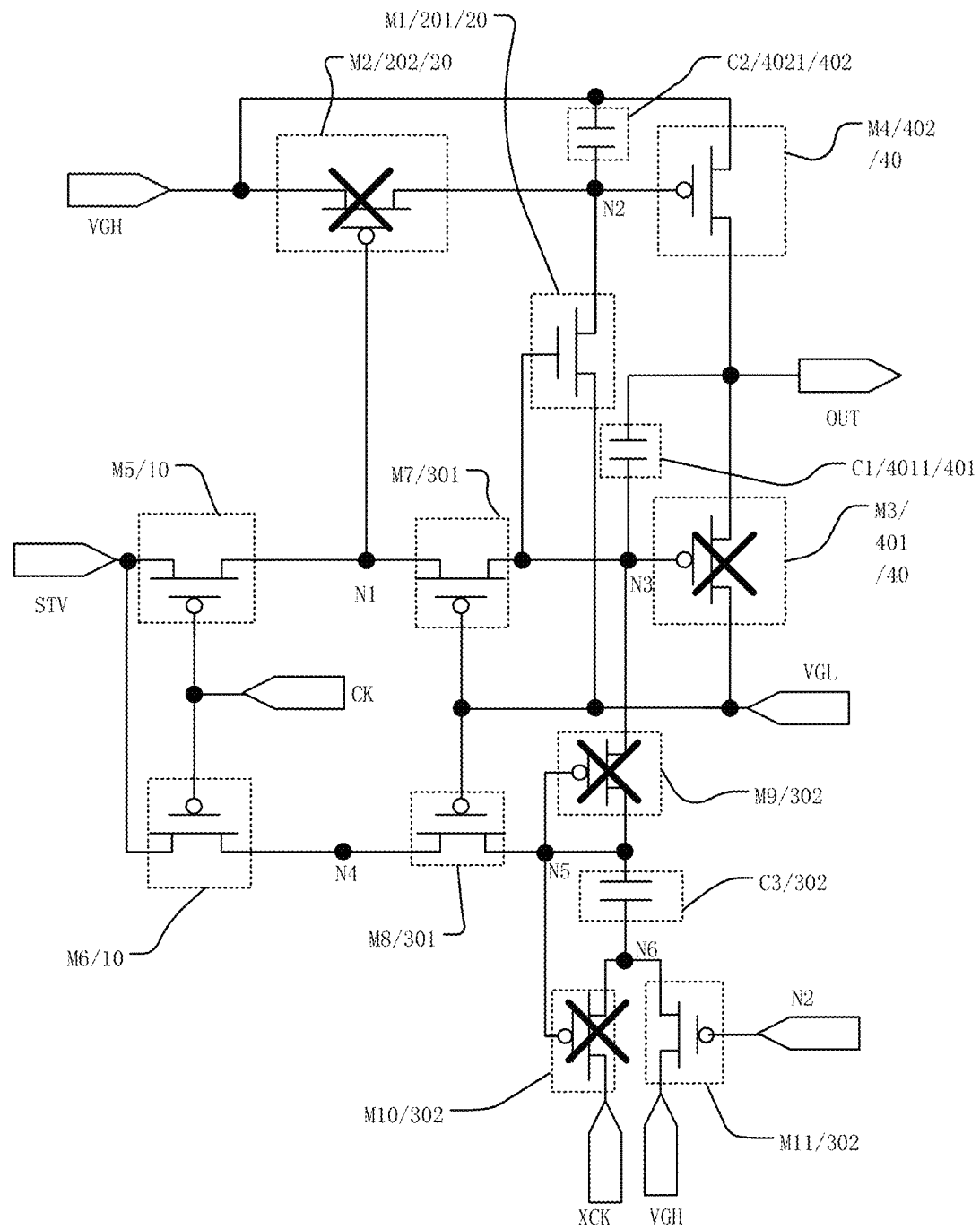
FIG. 40 is a diagram of on states of transistors in the circuit structure in FIG. 36 in a third time period.

In the third time period t3, as shown in FIGS. 37 and 40 (FIG. 40 is a diagram of on states of transistors in the circuit structure in FIG. 36 in a third time period (in the figure, "x" on a transistor indicates that the transistor is off, and no sign indicates that the transistor is on)), the seventh transistor M7 and the eighth transistor M8 remain on under the first voltage signal provided by the first voltage signal line VGL. The input signal of the input signal terminal STV is at the logic high level, the first clock signal provided by the first clock signal line CK is at the logic low level, and the second clock signal provided by the second clock signal line XCK is at the logic high level so that the fifth transistor M5 and the sixth transistor M6 are turned on, the first node N1 and the fourth node N4 have the logic high-level signal under the control of the input signal at the logic high level, the second transistor M2 is turned off and the first transistor M1 is turned on, the third node N3 and the fifth node N5 have the logic high level, the third transistor M3 is turned off, and the logic low-level first voltage signal transmitted by the first voltage signal line VGL cannot be transmitted to the output signal terminal OUT. Since the first transistor M1 is turned on, the logic low-level first voltage signal from the first voltage signal line VGL is transmitted to the second node N2, the second node N2 has a potential at logic low level, the fourth transistor M4 is turned on, and the logic high-level second voltage signal transmitted by the second voltage signal line VGH is transmitted to the output signal terminal OUT so that the output signal of the output signal terminal OUT is the logic high-level signal. In this case, since the fifth node N5 has the logic high level, the ninth transistor M9 and the tenth transistor M10 are turned off. The second node N2 has a potential at logic low level so that the eleventh transistor M11 is turned on, the logic high-level second voltage signal transmitted by the second voltage signal line VGH is transmitted to the sixth node N6, the fifth node N5 maintains a potential at logic high level due to the coupling function of the third capacitor C3, the ninth transistor M9 remains off, the third node N3 maintains a signal with a potential at logic high level, and the third transistor M3 remains off so that the logic high-level signal outputted from the output signal terminal OUT is not affected by the first voltage signal.

Figure 41:
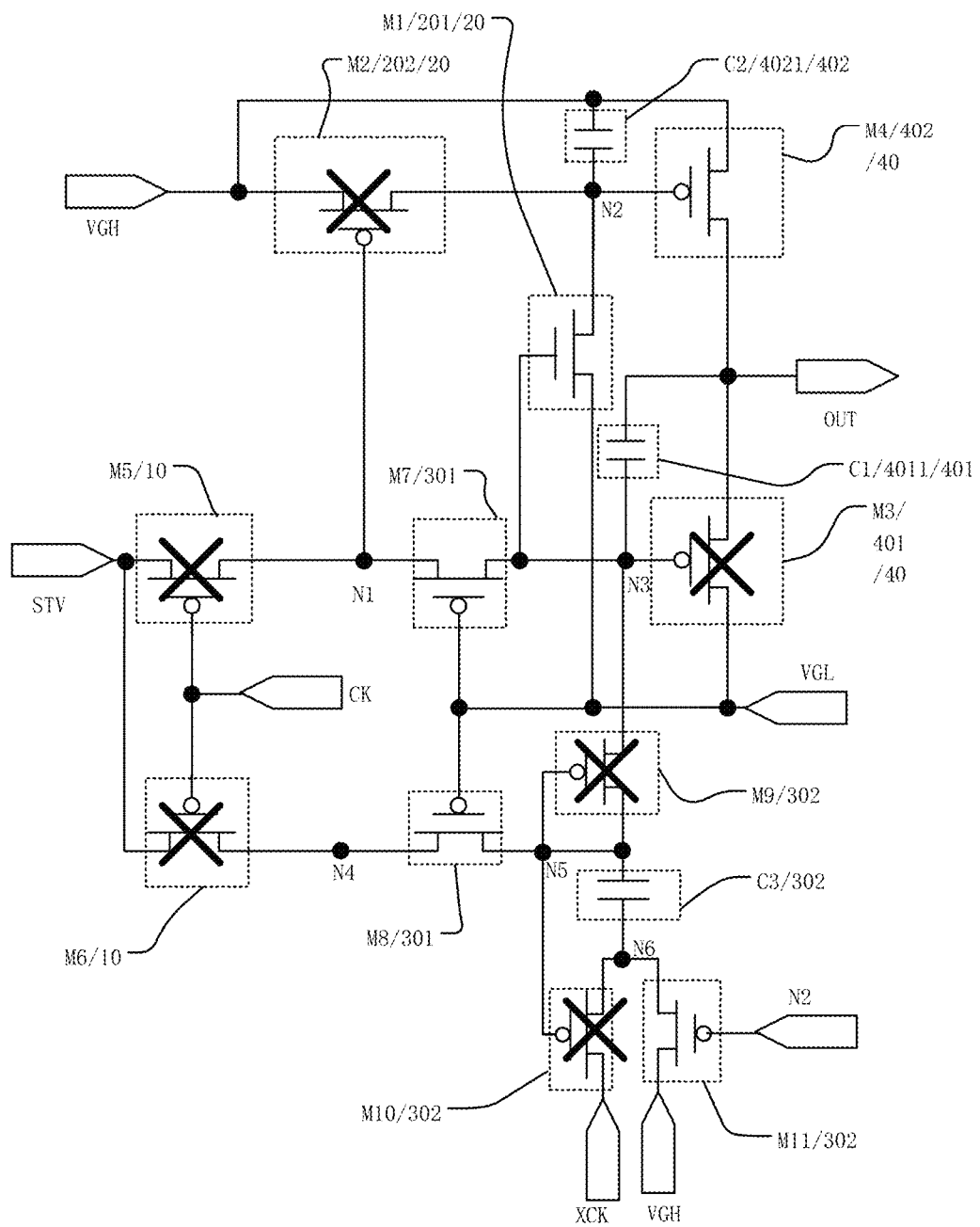
FIG. 41 is a diagram of on states of transistors in the circuit structure in FIG. 36 in a fourth time period.

In the fourth time period t4, as shown in FIGS. 37 and 41 (FIG. 41 is a diagram of on states of transistors in the circuit structure in FIG. 36 in a fourth time period (in the figure, "x" on a transistor indicates that the transistor is off, and no sign indicates that the transistor is on)), the seventh transistor M7 and the eighth transistor M8 remain on under the first voltage signal provided by the first voltage signal line VGL. The input signal of the input signal terminal STV is at the logic high level, the first clock signal provided by the first clock signal line CK is at the logic high level, and the second clock signal provided by the second clock signal line XCK is at the logic low level so that the fifth transistor M5 and the sixth transistor M6 are turned off, the first node N1 and the fourth node N4 maintain the logic high-level signal due to the seventh transistor M7 and the eighth transistor M8 being on, the second transistor M2 is turned off and the first transistor M1 is turned on, the third node N3 still maintains the logic high-level signal due to the voltage latching function of the first capacitor C1, the third node N3 and the fifth node N5 have the logic high level, the transistor M3 is turned off, and the logic low-level first voltage signal transmitted by the first voltage signal line VGL cannot be transmitted to the output signal terminal OUT. Since the first transistor M1 is turned on, the logic low-level first voltage signal from the first voltage signal line VGL is transmitted to the second node N2, the second node N2 has a potential at logic low level, the fourth transistor M4 is turned on, and the logic high-level second voltage signal transmitted by the second voltage signal line VGH is transmitted to the output signal terminal OUT so that the output signal of the output signal terminal OUT is the logic high-level signal.

In the fifth time period t5, as shown in FIGS. 37 and 38 (for a diagram of on states of transistors in the circuit structure in FIG. 36 in the fifth time period, reference may be made to FIG. 38), the seventh transistor M7 and the eighth transistor M8 remain on under the first voltage signal provided by the first voltage signal line VGL. The input signal of the input signal terminal STV is at the logic low level, the first clock signal provided by the first clock signal line CK is at the logic low level, and the second clock signal provided by the second clock signal line XCK is at the logic high level so that the fifth transistor M5 and the sixth transistor M6 are turned on, the first node N1 and the fourth node N4 have the logic low-level signal, the second transistor M2 is turned on and the first transistor M1 is turned off, the third node N3 and the fifth node N5 have the logic low level, the third transistor M3 is turned on, and the logic low-level first voltage signal transmitted by the first voltage signal line VGL is transmitted to the output signal terminal OUT. Since the second transistor M2 is turned on, the logic high-level second voltage signal from the second voltage signal line VGH is transmitted to the second node N2, the second node N2 has a potential at logic high level, the fourth transistor M4 is turned off, and the logic high-level second voltage signal transmitted by the second voltage signal line VGH cannot be transmitted to the output signal terminal OUT.

In this case, since the second node N2 has a potential at logic high level, the eleventh transistor M11 is turned off. The fifth node N5 has the potential at logic low level due to the effect of the fourth node N4 so that the tenth transistor M10 is turned on. When the second clock signal at the logic high level is transmitted to the sixth node N6 through the tenth transistor M10, the potential of the fifth node N5 is increased due to the coupling function of the third capacitor C3, the ninth transistor M9 is turned off, and the potential of the third node N3 is not affected by the potential of the fifth node N5 so that the potential of the third node N3 remains at logic low level, the third transistor M3 remains on, and thus the output signal of the output signal terminal OUT remains to be the logic low-level signal.

As shown in FIGS. 36 and 37, in the circuit structure of the shift register 01 in this embodiment, the first capacitor C1 is disposed between the third node N3 and the output signal terminal OUT. When the input signal of the input signal terminal STV jumps from the logic high level to the logic low level, the first clock signal provided by the first clock signal line CK is at the logic low level, and the second clock signal provided by the second clock signal line XCK is at the logic high level in the fifth time period t5, the potential of the output signal of the output signal terminal OUT is lowered. Due to the coupling function of the first capacitor C1, the potential of the output signal of the output signal terminal OUT becomes low, and the first capacitor C1 may couple the third node N3 towards a negative potential so that the potential of the third node N3 is lower than $V_{VGL}-|Vth|$ as much as possible, thereby ensuring the conduction stability of the third transistor M3. The first voltage signal from the first voltage signal line VGL is directly transmitted to the output signal terminal OUT through the third transistor M3, and the potential of the output signal of the output signal terminal OUT is directly lowered to the logic low-level first voltage signal so that the problem of lag phenomenon of the waveform of the output signal of the output signal terminal OUT in the fifth time period t5 can be avoided, and the output signal of the shift register 01 is more stable, which is conducive to further ensuring the display effect of the display panel 000.

The circuit structure of the shift register 01 provided in this embodiment can not only ensure the shift register function of the shift register 01 to provide the control signal for the pixel circuit in the display region AA but also simplify the circuit so that the number of transistors in the driver circuit 00 is reduced as much as possible, which is more conducive to the design of the narrow bezel. Moreover, the design of the first capacitor C1 of the first latch circuit 4011 and multiple transistors and the third capacitor C3 in the second adjustment circuit 302 makes the output signal of the shift register 01 more stable, which solves the problem of lag phenomenon of the output signal of the shift register 01 and is conducive to further ensuring the display effect of the display panel 000.

Figure 42:
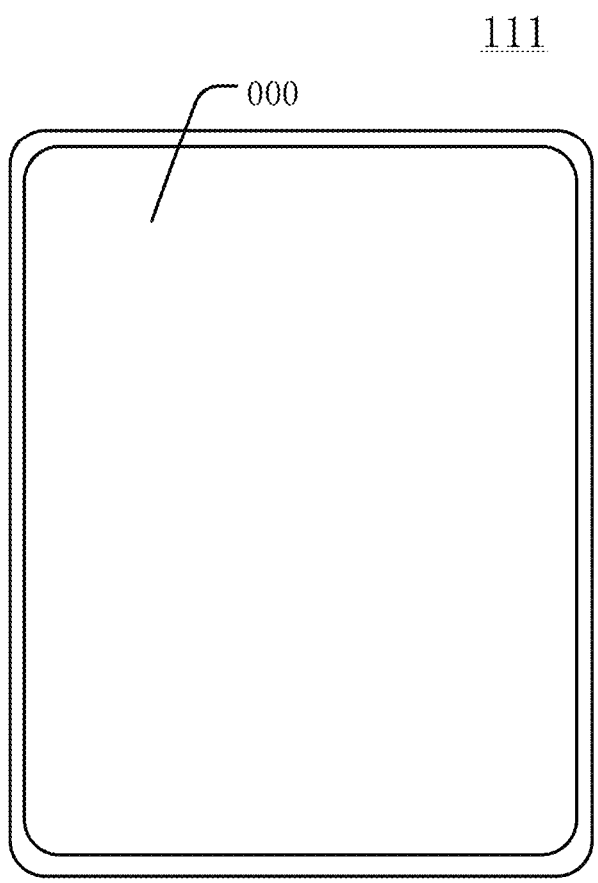
FIG. 42 is a plan view of a display device according to an embodiment of the present disclosure.

In some optional embodiments, referring to FIG. 42 which is a plan view of a display device according to an embodiment of the present disclosure, a display device 111 provided in this embodiment includes the display panel 000 provided in the preceding embodiments of the present disclosure. In the embodiment of FIG. 42, the display device 111 is described by using a mobile phone as an example. It is to be understood that the display device 111 provided in the embodiment of the present disclosure may be a computer, a television, an in-vehicle display device, and another display device 111 with a display function, which is not specifically limited in the present disclosure. The display device 111 provided in the embodiment of the present disclosure has the beneficial effects of the display panel 000 provided in the embodiments of the present disclosure. For details, reference may be made to the detailed description of the display panel 000 in the preceding embodiments. The details are not repeated here in this embodiment.

As can be seen from the preceding embodiments, the display panel and the display device provided in the present disclosure achieve at least the beneficial effects below.

The display panel provided in the present disclosure may include the display region and the non-display region, and the non-display region of the display panel includes the driver circuit electrically connected to the pixel circuits of the pixel units separately to provide the control signals for the pixel circuits so that the pixel units in the display region emit light in order, thereby implementing the display function of the display panel. The driver circuit includes the shift register including at least the input circuit, the control circuit, and the output circuit to implement the shift control function of the driver circuit. The input circuit transmits the initial shift signal, that is, the input signal, to each stage of shift register. Then, the first output circuit and the second output circuit are turned on at different occasions under the control of the control circuit so that the output signal of the output signal terminal in each stage of shift register of the driver circuit includes the logic low-level signal and the logic high-level signal separately, and the output signal of the output signal terminal is transmitted as the control signal to the pixel circuit of the pixel unit in the display region, thereby driving and controlling the pixel circuit. In this manner, the light emission display effect of the pixel units in the display panel can be ensured. Moreover, the first node and the third node of the shift register in the present disclosure may be directly connected or connected through the first adjustment circuit so that when the signal of the third node controls the first output circuit to be turned on, the potential of the third node is not affected by the potential of the first node, so as to ensure as much as possible that the first output circuit is completely on under the control of the signal of the third node. In this manner, the conduction effect of the first output circuit can be stabilized, ensuring that the first output circuit stably transmits the output signal to the output signal terminal.

Although some particular embodiments of the present disclosure have been described in detail by way of examples, it is to be understood by those skilled in the art that the preceding examples are for the purpose of description only and are not intended to limit the scope of the present disclosure. It is to be understood by those skilled in the art that modifications may be made to the preceding embodiments without departing from the scope and spirit of the present disclosure. The scope of the present disclosure is defined by the appended claims.

What is claimed is:

1. A display panel, comprising:
   a base substrate,
   a driver circuit comprising a shift register, wherein the driver circuit is formed on the base substrate, and
   at least one of an initial input signal line configured to provide an initial input signal for the driver circuit or a power signal line configured to provide a power signal for a light-emitting element of the display panel,
   wherein the shift register comprises: an input circuit connected to at least an input signal terminal, a first clock signal line, and a first node; a control circuit connected to at least a first voltage signal line, a second voltage signal line, the first node, a second node, and a third node, wherein the first node and the third node are directly connected or connected through a first adjustment circuit, wherein the control circuit comprises a first control circuit and a second control circuit; the first control circuit comprises a first transistor, and the second control circuit comprises a second transistor; and an output circuit comprising, wherein the output circuit comprises a first output circuit and a second output circuit, the first output circuit is connected to at least the first voltage signal line, the third node, and an output signal terminal, and the second output circuit is connected to at least the second voltage signal line, the second node, and the output signal terminal;
   wherein at least one of the initial input signal line, the first clock signal line, the first voltage signal line, the second voltage signal line, or the power signal line is a preset signal line, the preset signal line is disposed on a side of a film where transistors of the driver circuit are located facing away from the base substrate, an n-type channel transistor of the first transistor and the second transistor is a preset transistor, and in a direction perpendicular to the base substrate, the preset signal line overlaps the preset transistor.

2. The display panel according to claim 1, wherein the input circuit receives at least an input signal and a first clock signal and controls a signal of the first node;

the control circuit receives at least a first voltage signal, a second voltage signal, the signal of the first node, and a signal of the third node and controls a signal of the second node; and the first output circuit receives at least the first voltage signal and the signal of the third node and controls an output signal, and the second output circuit receives at least the second voltage signal and the signal of the second node and controls the output signal.

3. The display panel according to claim 2, wherein the first voltage signal is a logic low-level signal, and the second voltage signal is a logic high-level signal.

4. The display panel according to claim 1, wherein the first control circuit is connected to at least the first voltage signal line, the second node, and the third node; and the second control circuit is connected to at least the second voltage signal line, the first node, and the second node.

5. The display panel according to claim 4, wherein the first control circuit receives at least a first voltage signal and a signal of the third node and controls a signal of the second node; and the second control circuit receives at least a second voltage signal and a signal of the first node and controls the signal of the second node.

6. The display panel according to claim 4, wherein a control terminal of the first control circuit is connected to the third node, and a control terminal of the second control circuit is connected to the first node; wherein when the first control circuit is turned on under control of a signal of the third node, the second control circuit is turned off under control of a signal of the first node; or when the first control circuit is turned off under control of a signal of the third node, the second control circuit is turned on under control of a signal of the first node.

7. The display panel according to claim 4, wherein a first terminal of the first transistor is connected to the first voltage signal line, a second terminal of the first transistor is connected to the second node, and a control terminal of the first transistor is connected to the third node; and/or a first terminal of the second transistor is connected to the second voltage signal line, a second terminal of the second transistor is connected to the second node, and a control terminal of the second transistor is connected to the first node.

8. The display panel according to claim 7, wherein when a signal of the third node controls the first transistor to be turned on, a signal of the first node controls the second transistor to be turned off; or when a signal of the third node controls the first transistor to be turned off, a signal of the first node controls the second transistor to be turned on.

9. The display panel according to claim 7, wherein the first transistor and the second transistor have different types of channel regions.

10. The display panel according to claim 7, wherein the first transistor is an n-type channel transistor, and the second transistor is a p-type channel transistor; or the first transistor is a p-type channel transistor, and the second transistor is an n-type channel transistor.

11. The display panel according to claim 10, wherein an active layer of the first transistor comprises silicon, and an active layer of the second transistor comprises an oxide semiconductor; or an active layer of the first transistor comprises an oxide semiconductor, and an active layer of the second transistor comprises silicon.

12. The display panel according to claim 11, wherein the first transistor comprises a first gate, a first active layer, a first source, and a first drain;

the second transistor comprises a second gate, a second active layer, a second source, and a second drain; and the first active layer comprises silicon, and the second active layer comprises the oxide semiconductor; or the first active layer comprises the oxide semiconductor, and the second active layer comprises silicon.

13. The display panel according to claim 12, wherein the first transistor further comprises a third gate, the first gate and the third gate are disposed on two sides of the first active layer separately, and the first active layer comprises the oxide semiconductor; or the second transistor further comprises a fourth gate, the second gate and the fourth gate are disposed on two sides of the second active layer separately, and the second active layer comprises the oxide semiconductor.

14. The display panel according to claim 7, wherein a plurality of stages of shift registers of the driver circuit extend along a first direction; and the first transistor and the second transistor are arranged along the first direction.

15. The display panel according to claim 7, wherein a plurality of stages of shift registers of the driver circuit extend along a first direction; and the first transistor and the second transistor are arranged along a second direction, wherein the first direction intersects with the second direction.

16. The display panel according to claim 1, wherein in the direction perpendicular to the base substrate, the preset signal line overlaps at least one of the first transistor or the second transistor.

17. The display panel according to claim 1, wherein a plurality of stages of shift registers of the driver circuit extend along a first direction; and a width of the preset signal line along a second direction is W1, and a width of the preset transistor along the second direction is W2, wherein the first direction intersects with the second direction; and

W1>W2.

18. A display device, comprising a display panel, wherein the display panel comprises:

a base substrate, a driver circuit comprising a shift register, wherein the driver circuit is formed on the base substrate, and at least one of an initial input signal line configured to provide an initial input signal for the driver circuit or a power signal line configured to provide a power signal for a light-emitting element of the display panel, wherein the shift register comprises: an input circuit connected to at least an input signal terminal, a first clock signal line, and a first node; a control circuit connected to at least a first voltage signal line, a second voltage signal line, the first node, a second node, and a third node, wherein the first node and the third node are directly connected or connected through a first adjustment circuit, wherein the control circuit comprises a first control circuit and a second control circuit; the first control circuit comprises a first transistor, and the second control circuit comprises a second transistor; and an output circuit comprising, wherein the output circuit comprises a first output circuit and a second output circuit, the first output circuit is connected to at least the first voltage signal line, the third node, and an output signal terminal, and the second output circuit is connected to at least the second voltage signal line, the second node, and the output signal terminal;

wherein at least one of the initial input signal line, the first clock signal line, the first voltage signal line, the second voltage signal line, or the power signal line is a preset signal line, the preset signal line is disposed on a side of a film where transistors of the driver circuit are located facing away from the base substrate, an n-type channel transistor of the first transistor and the second transistor is a preset transistor, and in a direction perpendicular to the base substrate, the preset signal line overlaps the preset transistor.

* * * * *